United States Patent [19]

Clifton et al.

[11] 4,310,883
[45] Jan. 12, 1982

[54] METHOD AND APPARATUS FOR ASSIGNING DATA SETS TO VIRTUAL VOLUMES IN A MASS STORE

[75] Inventors: Robert D. Clifton, Longmont; Richard F. Phares, Boulder, both of Colo.

[73] Assignee: International Business Machines Corporation, Armonk, N.Y.

[21] Appl. No.: 120,582

[22] Filed: Feb. 11, 1980

Related U.S. Application Data

[63] Continuation of Ser. No. 877,435, Feb. 13, 1978, abandoned.

[51] Int. Cl.³ .......................... G06F 7/04; G06F 13/00
[52] U.S. Cl. ............................................. 364/200
[58] Field of Search ... 364/200 MS File, 900 MS File

[56] References Cited

U.S. PATENT DOCUMENTS

| Re. 26,919 | 6/1970 | Hagelbarger | 364/900 |
|---|---|---|---|
| 3,400,171 | 9/1968 | Amdahl et al. | 364/200 |
| 3,400,372 | 9/1968 | Beausoleil | 364/200 |
| 3,670,307 | 6/1972 | Arnold et al. | 364/200 |
| 3,694,813 | 9/1972 | Loh et al. | 364/200 |
| 3,831,197 | 8/1974 | Beach et al. | 360/71 |

OTHER PUBLICATIONS

"OS/VS2 Scheduler and Supervisor Logic", SY28-06-25-0, File No. S370-36, vol. 2 of 3, IBM, Feb. 1974 (in the file).
"Best Fit Algorithm for SQA Storage Management", IBM TDB, vol. 15, No. 1, May 1973, pp. 3638-3639.

Primary Examiner—Harvey E. Springborn
Attorney, Agent, or Firm—James A. Pershon; Herbert F. Somermeyer

[57] ABSTRACT

In a mass storage system having a multiplicity of storage volumes containing addressable data, the assignment of newly received data sets to the best storage volume is accomplished by determining the best match of the data set to the available volumes. Such selection enables maximum storage use of each volume. The best volume is one that provides memory space efficiency for the job at hand, and considers the volume life expectancy, the numbers of users, the shareability of the volume, and the status of the volume. First, all eligible volumes are listed. Then these volumes are sorted according to each volume's match and risk factors to the data set to be stored. The best fitting volumes are selected first for the actual data transfer and storage operation.

22 Claims, 17 Drawing Figures

METHOD AND APPARATUS FOR ASSIGNING DATA SETS TO VIRTUAL VOLUMES IN A MASS STORE

This is a continuation of application Ser. No. 877,435 filed Feb. 13, 1978, now abandoned.

BACKGROUND OF THE INVENTION

This invention relates generally to a storage management of a mass storage system and more specifically to the data and space management of virtual volumes in the storage facility.

FIELD OF THE INVENTION

A central problem in computer information management, especially in the installations with time sharing systems, is to provide enough direct access storage device data space to service the needs of the users at acceptable performance levels. The need is the result of rapidly expanding user data collection. This usually entails monitoring space usage in some way and archiving low use data set onto tapes or shelf packs at a high cost in terms of personnel and system use.

A prime purpose of the mass storage system is the management of storage hierarchy according to their activity characteristics. The most active data is kept on staging direct access storage devices. The less active data resides only on cartridges in the mass storage facility which serves as an archive storage. The staging and destaging of data occurs automatically in response to program demand. Adequate staging space is kept available by deleting data according to the least recently used algorithm. The mass storage system provides a system solution for making on-line direct access storage devices available for the most active data on a dynamic basis. The mass storage system provides space management support in the management of active versus inactive data, in the management of temporary work space, in the reduction of space allocation termination, and in the reclamation of unused space. By the present invention, the space management is further enhanced by the monitoring of the mass storage system volume space status and the control of fragmentation areas in the free space in each volume.

In the mass storage system, all of the data information is located on magnetic media contained within data cartridges. The data cartridges that contain useful data are always handled in pairs. This pair of data of cartridges are called a mass storage volume or just a volume for purposes of this application. The volumes are stored in the mass storage facility. Mass storage volumes that contain data with similar characteristics can be grouped and these groups are called mass storage volume groups.

The data in the mass storage facility is available for use by the host central processing unit. The central processing unit requests data according to a volume. The mass storage system locates the needed volume, mounts it, and notifies the operating system that the volume is available. The mass storage system knows exactly where all of the volumes it contains are located.

The mass storage system is a hierarchical system in which data is available at one of three levels. The data available to the central processing unit is either in the mass storage facility at the lowest level, on direct access storage device (DASD), or in the memory in the central processing unit. The mass storage system must move the data from its lowest level of storage, the data cartridges in the mass storage facility, to the next level of storage, the DASD devices, before a central processing unit can access the data. The movement of data from the mass storage facility to the DASD devices is called staging. When the operating system is finished with the data, data that has been created or modified is moved back into the mass storage facility. The movement of data from the DASD devices to the mass storage facility is called destaging. A mass storage system stages only the cylinders of the volumes that contain the data needed by the operating system.

To enhance the data processing, the mass storage system combines the better features of disk storage with the economy of tape storage. The storage capacity equals that of a large tape library. Data can be processed in a tape-like sequential manner or in the efficient direct access disk manner. Most important in an operating environment, the data is available to the processing systems without the delays associated with the finding of a tape reel, mounting it, and returning it to the tape library after use. The mass storage system is addressed in a so called "virtual direct access storage" mode as described in the U.S. Pat. No. 3,670,307 as implemented using the International Business Machines Corporation 3330 Disk Storage Virtual Volume Addressing Scheme. This scheme defines a logical address base as containing the data bytes of the storage capacity of one IBM 3330-type disk pack. During the time the data is being processed, it is on-line or a 3330 disk drive. When the data is not in use, it is stored on tape in a mass storage facility. A mount virtual volume message given to a mass storage controller initiates transfer of the data from the tape to the disk. The mass storage controller searches its tables, finds the location in the mass storage facility where a data cartridge containing that data is stored, finds space on an available disk drive, reads the data from the data cartridge, and writes it on the disk drive.

The disk packs to which the data is written are called "staging packs" and the process of copying the data from the data cartridges onto the disk pack is called "staging". Data must be staged before it can be processed by a host computer.

The process of writing the information onto the data cartridges in the mass storage facility from the disk is called "destaging". All of the original data is still on the data cartridge, writing the changed data back into the mass storage facility results in the data cartridge having a complete updated data set. Data set information stored in the disk storage that is not altered is never destaged.

The mass storage sysem responds to the program operating system of its host computers in the virtual direct access mode. That is, to the host computer, the mass storage system appears as a plurality of disk drives directly available to the host computer. The operating system of the host computer assigns a disk virtual volume to a system unit. When a virtual volume is mounted in the mass storage system, it is also assigned to a unit address. The virtual unit address is used to designate the logical address of each virtual volume and is used in staging data and in locating the data on a staging pack. The method by which the management of the space is accomplished in the virtual volumes is the subject of this invention.

The mass storage system provides space management support in several areas. First, support is provided in the management of active versus inactive data. Second, support is provided in the management of temporary work space and third in the reduction in space allocation termination. Fourth, the space management provides support in the reclamation of unused space in the volumes. Further, with the present invention, the space management support provides a monitoring of the mass storage system volume space status and the control of the free space fragmentation in the volumes stored in the mass storage facility.

There have been many alternative space management functions that have been developed over the years as reactions to problems rather than as a manner of routinely managing the resources. As a result of being problem driven, many of the former methods of managing the resources contained redundant functions or are mutually exclusive. Space management is closely allied to other areas of installation management concerns, such as scheduling, performance, and security. Foremost is that data collection, storage, and maintenance is too expensive in terms of performance to be indulged unless you need to use the data.

There is a need to place multiple data sets into the mass storage system in an efficient manner even though each data set could have differing characteristics in terms of life, frequency, and type of usage, and value. Thus, the management and placement of the data sets into the virtual volumes in a manner that makes the most efficient usage of the storage space remaining is an object of the present invention.

Space management comprises different elements. Cataloging, for instance, provides the operating system with the knowledge of the virtual volumes on which the data sets are stored. Cataloging concerns have always been accuracy, performance, and recovery. The cataloging list is generally in the data set main sequence and provides items such as volume serial, allocation data, control interval and record information.

The allocation of the data sets onto the virtual volumes is another area of storage management. The allocation of the data on the virtual volumes must make efficient use of the space available according to the information from the data sets to be stored. Before the present invention, volume maps were used to show the efficient use of space versus the space allocated. The map provided a data set report that included the records and block size, its position in the virtual volume, and the space in the virtual volume allocated to that data set. The mass storage system of the present invention permits the definition of a reserved space buffer for grouped virtual volumes. This reserved space formerly was never used. The volume grouping for the allocation of data sets helped in managing the space available and permitted more focusing of the data sets but did not permit the most efficient use of the individual virtual volumes.

Accordingly, it is the object of the present invention to provide an enhanced apparatus and method for managing the storage of data in storage systems.

DESCRIPTION OF THE PRIOR ART

The prior art is exemplified by an IBM Technical Disclosure Bulletin entitled "Best Fit Algorithm for SQA Storage Management" appearing at Volume 15, No. 1, May 1973 at pages 3638-9. This publication discloses a method of managing storage space for a system queue. The storage request places the data into a storage location according to the size of the storage location and the size of the data to be stored. The best fitting storage location is selected. This article discloses a single item for accomplishing the placement of data into storage and does not account for space allocation in a large number of volumes by checking a multiplicity of values as achieved by the present invention.

It is, therefore, an object of the present invention to provide a method for managing the storage of data that involves the checking of a multiplicity of values from a large number of storage volumes in a storage system.

In prior art mass storage systems, the management of the data stored in the lowest or library level of storage was by way of reports that showed the status of the mass storage volume inventory. The report showed the condition of each volume storage area. An operator searched the report looking for expired data sets on volumes which were then manually deleted and the volumes shuffled to regroup the volume group. The system in turn would randomly attempt to put new data set information onto volumes in which the old information was deleted. For instance, the system did not attempt to determine whether the expiration date of the remaining data sets in the volume was close. The search was by random sequence from one volume to the next until a fit was attained. The check as to placing the data set into storage was only to unmounted volumes. The only two things taken into consideration were: the space larger than required, and the volume expiration date beyond that of the data set to be stored. The best fit according to selected parameters such as the closest expiration date was not considered.

It is, therefore, another object of the present invention to provide apparatus and methods for the management of data sets that searches for a volume that best matches the data set information to be stored.

In the prior art systems, the search for storage space was by way of an allocation that had already selected a unit to which the volume is to be mounted with the communicator then picking an unmounted volume for allocation to that unit. The mass storage volume communicator searched in the volume group that the host CPU specified, picked all of the volumes out of that group, and started to select the volume for storage. The volumes were surveyed in order. If the system found a mounted volume, it would skip over that volume and go to the next volume. If it found a volume that did not have enough sufficient remaining space, it would skip over that volume and search the next volume. If the volume communicator found a volume that expired earlier than the expiration date of the data set, it skipped over that volume. The mass storage volume communicator searched until it found an unmounted volume that had enough space that did not expire before the expiration date of the data set, and the first volume that fit these conditions was selected for allocation of the data set.

Another object of the present invention, therefore, is to provide apparatus and methods that search all of the volumes in a group to find the volumes that are eligible for storing the data set information and then align these eligible volumes from best to worst according to selected criteria.

SUMMARY OF THE INVENTION

Apparatus and methods are provided for the selection of the best virtual volume or volumes for each non-specific allocation request by the host computer. Specific factors are taken into consideration once a virtual storage space is found to be eligible for consideration by the request. The factors are weighed as to their relative importance in the selection process. The selected volumes are then sorted to order the virtual volumes selected from best choice to worst choice.

The present invention senses that a volume is required for a data set storage of information. A special command is issued to interface with the storage system containing the virtual volume location. The request is placed on the storage volume control queue which in turn sends a request to a volume selection module where the actual selection process takes place. The selection process selects a storage volume according to the information describing the data set that is to be stored. The selection apparatus and process weighs the factors describing the data set and searches each virtual volume in a specific group for the best storage location for the data set under consideration. The best virtual volume in the group is selected and this information is transmitted to the control unit which then transmits the data set information into the selected virtual volume for storage.

It is, therefore, a primary object of the present invention to provide an apparatus and method for making more efficient use of virtual volumes in a library storage system.

The method and apparatus of the present invention assigns data sets or portions thereof to virtual volumes in a mass storage system in accordance with a sorting arrangement in predetermined virtual volume availability parameters such that the storage space in each virtual volume is used more efficiently. The allocation of space on the virtual volume is made in accordance with the apparatus and method that provides for the sorting of eligible virtual volume based upon the available virtual volumes, i.e., those not exclusively dedicated to another host computer, the lack of availability of a virtual volume because of the risk that the volume is already being used, and the expiration date of the data already in the volume and its comparison to the expiration date of the data set to be stored. Accordingly space is allocated on the best eligible virtual volume that most nearly matches the description parameters of the data sets already on the volume further considering the space remaining in the considered virtual volume and the size of the data set that is under consideration for store.

In a best mode of the invention, the procedures of the invention are initiated and monitored by programming in a system which controls the selection of a mass storage virtual volume. If a controlled request for a new data set storage area specifies a virtual volume unit type and does not specify a mass storage volume identification, the mass storage volume control selects the virtual volume for the new data set. Because no volume identification was specified for the new data set, this is called a non-specific volume request. The mass storage volume control always selects the mass storage volume from a volume group. The mass storage volume controller selects the volume from the group named in the request. If no group is specified in the request for the new data set, the central processing unit selects the volume from system storage volumes which are already mounted, that is, ready for acceptance of data set information storage. If the allocation routine cannot find space on these volumes, unmounted volumes in a special system group will be selected by the mass storage volume controller. If the new data set requested is not for partitioned or indexed organization, and the request did not have space specified, the mass storage volume controller supplies the space that is defined for the group by the space manager with the present invention. After selecting a mass storage volume, the mass storage volume controller updates the inventory data set to reflect the space used by the data set.

The apparatus for selecting the best volume from a volume group that best matches the requirement for the storage of data set comprises a means for storing an indication of the status of each of the volumes in the mass storage facility together with a means for comparing the requirements of the data set to each of the volumes in a group selected for availability of the storage of information. The best volume selection means arranges the volumes from best fit to worst fit to select the volume required that best matches the requirements of the data set for the most efficient use of the volume storage available. The best volume records are placed in a selected volume register means where they are transferred to a mass storage controller means for controlling the transfer of the data set information to the selected volumes.

It is, therefore, a primary objective of this invention to provide an enhanced means for management of storage in a mass storage system.

The process steps for accomplishing a volume selection includes the steps of requesting a volume for storing a data set. An acceptable volume group is obtained and the volume records are examined from the volume group for all eligible volumes. The eligible volumes are ordered next from best volume to worst volume according to their desirability. The data set is then placed into the storage area of the volume that is eligible for storage and best meets the requirements of the data set.

Another object of this invention, therefore, is to provide a procedure for operating a data processing system for efficient storage of data information in a mass storage system.

There and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be fully understood from the following description of illustrated embodiments when read in conjunction with the accompanying drawing, wherein.

DESCRIPTION OF THE PREFERRED EMBODIMENT

Figure 1:
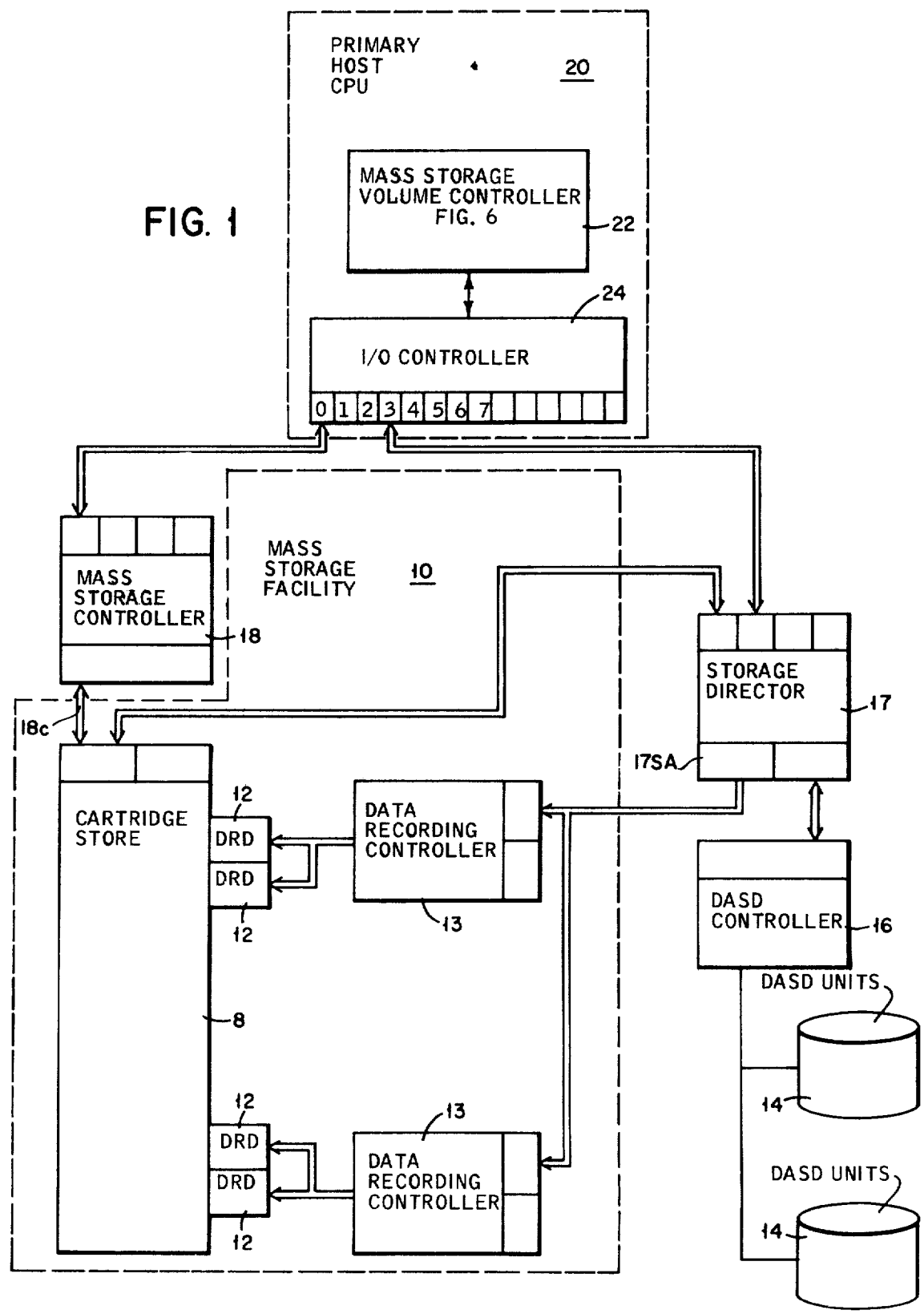
FIG. 1 is a block diagram showing a mass storage system of the single address field dual-level type connected to central processing unit.

In the drawing, like numerals indicate like parts and structural features in the various figures. The present invention enhances the mass storage system described with respect to FIG. 1 in that the management of the storage into a virtual volume cartridge store 8 in a mass storage facility 10 is performed by apparatus and in a manner that permits more efficient use of the storage facility. Without the present invention, the mass storage system illustrated in FIG. 1 selects the virtual volume storage area according to a basic size fit only. No considerations were made of the actual expiration date of the previously stored data in the volume, i.e. a short lived data set could be placed into a long lived volume, or the consideration that mounted volumes are used first before unmounted volumes and therefore the space is more efficiently used on mounted volumes. The data and space management according to the present invention is performed by a mass storage volume controller 22 under control of a primary host central processing unit (CPU) 20.

The mass storage system apparatus of FIG. 1 includes the mass storage facility 10 having the tape cartridge store 8 such as shown in the Beach et al, U.S. Pat. No. 3,831,197. The mass storage facility 10 includes a plurality of data recording devices (DRD) 12 which are tape recorders, and associated data recording controllers (DRC) 13 which are controls for the tape recorder. All of these apparatus can be constructed in accordance with the documents referenced. Control commands between the primary host CPU 20 and the cartridge store 8 is via a mass storage controller 18. The mass storage facility 10 constitutes the data base memory portion of the mass storage system.

An intermediate storage level of the mass storage system includes a plurality of direct access storage devices (DASD) such as the DASD units 14 which can each comprise a plurality of disk storage units. The DASD units 14 have many advantages when used in a data processing system. For example, the DASD units 14 enable rapid access to a data record as opposed to moving a record tape to scan long sequential files. The DASD units 14 are usually on line when the central processing unit 20 needs to access addressed storage locations in such DASD units 14. The plurality of DASD units 14 are controlled by an associated DASD controller 16 and a storage controller such as a storage director 17. Each director 17 includes a staging adaptor portion 17SA for automatically moving data signals between the mass storage facility 10 and the DASD controller 16. Moving the data signals from the mass storage facility 10 to the DASD controller 16 is termed "staging" which is the promotion of data to a higher storage level. Moving the data signals from the DASD units 14 to the mass storage facility 10 is termed "destaging" which is the demotion of data to a lower storage level. The mass storage controller 18 which is a programmable computer, supervises and directs the operation of the mass storage facility 10.

One programmable host central processing unit is the so-called "primary" host CPU 20. This central processing unit, in a limited manner, supervises the operation of the mass storage system on behalf of all other connected host central processing units. Each host CPU has at least one channel connection of its I/O controller 24 to the storage director 17. Such channel connections are in accordance with the U.S. Pat. No. 3,400,372. Additionally, the primary host CPU 20 has a channel connection from its I/O controller 24 to the mass storage controller 18 for issuing commands and receiving data signals from the mass storage facility 10. The mass storage controller 18 acts as a control unit to the primary host CPU 20, all in accordance with the U.S. Pat. Nos. 3,400,371 and 3,400,372. The mass storage controller 18 connections 18c to the mass storage facility 10 and to the storage directors 17 are also in accordance with those patents. The mass storage controller 18 is a central processing unit and the data recording controller 13 and the storage director 17 are the control units of these U.S. Pat. Nos. 3,400,371 and 3,400,372.

The storage director 17 controls the flow of data to and from the DASD units 14 through the DASD controller 16. The storage director 17 maintains tables showing the locations of all of the virtual volumes on the DASD units 14 and its control. The data on the DASD units 14 can be from the mass storage facility 10 for data that is being staged to a staging drive, or from the host CPUs when the central processing unit is using the virtual volumes that are on the DASD units 14. The storage director 17 handles the data transfers directly to the central processing units from the DASD controller 16.

The mass storage controller 18 manages the storage of data in the entire mass storage system. The host CPU sends its request except volume selection requests to the mass storage controller 18 and the mass storage controller 18 controls the execution of the request.

The mass storage controller 18 controls all of the staging and destaging operations. The function of a mass storage controller 18 includes accepting data from the central processing units, determining the location of the data, and allocating space on the DASD disk units 14 for the data to be stored. The mass storage controller 18 initiates the staging of the data from the mass storage facility 10 to the allocated space on the DASD unit 14 while monitoring the amount of allocable disk space and performing error recovery procedures if needed. The mass storage controller 18 maintains a record of the location of all mass storage volumes. The mass storage controller controls the movement of all data between the DASD disk storage unit and the mass storage facility.

The mass storage facility 10 includes a plurality of storage volumes in the cartridge store 8 for the lower level store of the data information. The cartridge store 8 can contain 2,360 volumes. Each volume comprises two cartridges of storage which is the equivalent to 100 megabytes of information. In order for the central processing unit to access the information in the volumes, the primary host CPU 20, for instance, through its I/O controller 24 must signal the mass storage controller 18 for a request for usage of information. The mass storage controller 18 in turn searches for the place where the information is stored whether on the DASD units 14 or in the cartridge store 8. If the information is stored in volumes in the cartridge store 8, the mass storage controller 18 requests that the required data set be staged, that is, be transferred to the DASD units 14 for direct access by the CPU. A data set may comprise only a portion of a volume or it may comprise more than one volume depending upon its size. The information on the DASD units is stored according to staging packs which is a group of data on line with the CPU 20. Each staging pack is divided into pages of storage. Each page contains eight cylinders of data. There are 51 pages of staging space on one staging pack. As data is staged, that is, transferred from the volumes in the cartridge store 8 to the DASD unit 14, the data is written on whatever pages of space are available at the time. The data from a single data set does not necessarily go on consecutive pages of a staging pack, nor does it necessarily use pages on a single staging disk drive. The control of the placement of the data into the staging packs is performed by the storage director 17.

The mass storage system includes an implementation of an automatic storage hierarchy. It introduces new functions and capabilities into the various aspect of data storage management. In the mass storage facility 10, the virtual volumes are automatically mounted and demounted without operator involvement. Thus, all of the data stored in the mass storage facility is considered to be "on-line" to the host computer. The data sets are automatically staged, that is, transferred to the direct access storage devices DASD units 14 from the data cartridges in the cartridge store 8. The staging and destaging operations are under the control of the mass storage controller 18 and respond to data demands from the host CPU 20. In effect, the storage hierarchy management maintains the more active data on rapid access devices such as the DASD units 14 while the less active data is maintained on the slower access cartridges in the mass storage facility 10. Using this architecture of the mass storage facility 10, a large number of virtual volumes can be supported with a large range in data storage capacity.

Most of the management of the virtual volumes of the mass storage facility 10 is provided by the mass storage volume controller 22. The mass storage volume controller 22 also provides improved control of the allocation of data sets into the virtual volumes by using a storage register 26 through which enforcement of the mass storage virtual volume group space default is accomplished. This also simplifies the operator job control language statements. Control is also improved by the allocation by the mass storage volume controller 22 of a number of mass storage facility virtual volumes to one group. The mass storage volume controller 22 also provides for simplifying the space management through the use of volume retention groups for retention period data sets. This group structure allows all data sets on an expired volume to be scratched, that is, deleted, at one time and obviates scanning the volume table of the contents listings. This eliminates the volume fragmentation which is the partial use of virtual volumes, and can increase the data stored in the mass storage facility 10. The mass storage volume controller 22 also maintains the uses tables to control the activity of the storage area. One such table is a mass storage volume inventory table 28 (see FIG. 3) which contains the group and volume records signifying the characteristics of the volume in the cartridge store 8. The mass storage volume controller 22 also provides apparatus and methods for archiving data by making some virtual volumes inactive; that is, non-mountable, and for creating backup virtual volumes without requiring a system command. The mass storage volume controller 22 increases the productivity of the management of the space in the virtual volumes.

Some of the concepts of the present invention, that is, the volume inventory, the retention volumes, and the backup volumes, stem from the application of the virtual volume management concept to the mass storage facility. A distinguishing difference which makes the operation of the mass storage facility 10 intrinsically more difficult to manage than a common tape library is that a mass storage facility virtual volume is expected to contain many data sets and not a single data set as in the standard tape library. By having the virtual volume contain many data sets, more efficient use is made of its storage capabilities. That is, a partially used virtual volume of the mass storage facility is accessed further one or more times to use the remaining storage capability in the most efficient manner by the apparatus and method according to the present invention.

Figure 2:
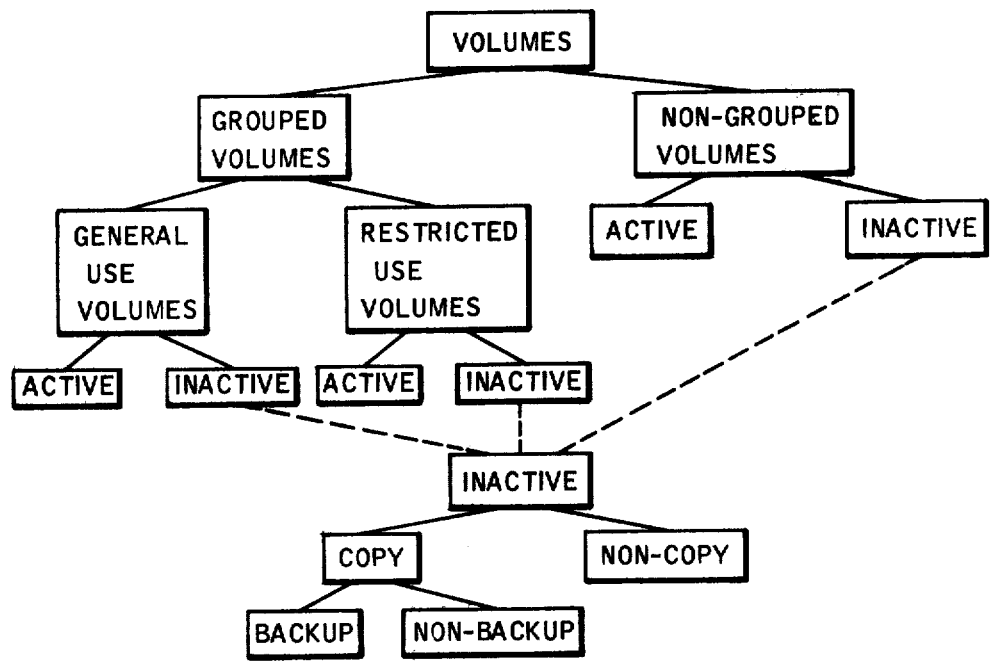
FIG. 2 is a tree diagram showing the division of the volumes in the mass storage system according to their types.

FIG. 2 is a schematic of the classes or types of virtual volumes in the mass storage facility 10. The different classes of volumes form a tree as shown in the figure. Any volume can belong to a group. The volume group is a fundamental concept of the storage in the mass storage facility. A group may be defined by various criteria of the ultimate uses. By distinguishing a volume according to a group, several attributes are attached to that volume. The criteria may be, for example, whether the data set to be stored has primary or secondary allocation quantities. A further quality is whether the volumes are to be shared or are dedicated exclusively to the data set or the particular host CPU or are bound or not bound at the staging time. Another criteria is the retention period of the particular virtual volume. Also, a free space threshold criteria can be defined for a group such that if the total free space in the group falls below a set threshold quantity, a message will be transmitted to the space manager. Grouped virtual volumes can be the target for allocation of data sets to non-specific volumes. Special data set allocation methods involve the grouped volumes. These schemes use the attribute of the group and concern the received volume free space and the number of contract allocations. Non-grouped volumes can receive only specific allocations and do not benefit from group attributes.

Group volumes can be designated for general use or for restricted use. A general use volume can receive data set allocations to non-specific volumes whereas a restricted volume cannot. A restricted volume, therefore, cannot benefit from various space attributes associated with non-specific data set allocation, such as space quantity default, space reserve, and space threshold. Restricted volumes are useful for specific data sets, password protected data sets, and multi-volume data sets. The restricted volumes are desired to keep the data sets within the volume within a particular group for reporting or other reasons such as security.

The general and restricted use volumes can be either active or inactive volumes. An active volume can be mounted; that is, used for data set storage. An inactive volume cannot be mounted. Consequently, an inactive volume cannot be accessed for storing data unless its status is changed. An inactive volume is useful strictly as an archive volume for storing rarely used information. Inactive volumes can be created through a physical copy of the volume by using a command, or by simply changing the status of a volume in the mass storage volume inventory through the use of a store volume (STOREV AMS) command.

All inactive volumes can be classified as a copy or a non-copy volume. A copy volume can be a backup volume, and can provide data replacement in the event of a loss by tranmission error or catastrophic failure of the DASD units 14. A non-copy volume is one that is not a repeat of data stored elsewhere in the system. The copy volumes require physical copying of the data from one volume to another. The backup volume, however, is handled logically like a generation data set. The number of backup copies is limited. When the limit is reached, the oldest backup volume is recycled to store the most recent copy request.

The mass storage facility volume group concept is an aid in managing the large number of virtual volumes available. A volume group assigns user responsibility to subsets of the virtual volumes and allocates the volumes among different applications. The volume group applies common attributes to a subset of volumes that share a common relationship such as retention periods and data set based allocation.

The virtual volumes in the mass storage facility can be grouped by various user chosen criteria such as application area, common retention period, and space allocation quantities. One volume group cannot be subordinated to any group. However, application area and space allocation classes can be designated.

The volume groups are managed by the following commands:

CREATEG—which defines a volume group by creating a group volume inventory record;

MODIFYG—which modifies the attributes of an existing volume group. This command can nullify or modify a volume expiration date;

SCRATCHG—which deletes the mass storage volume inventory record for an empty volume group;

LISTMSVI—which provides reports on the volume groups, the volumes belonging to groups, and the volumes that do not belong to a group.

Other commands are used to inactivate the volumes, copy the data, and eject the cartridges.

Figure 3:
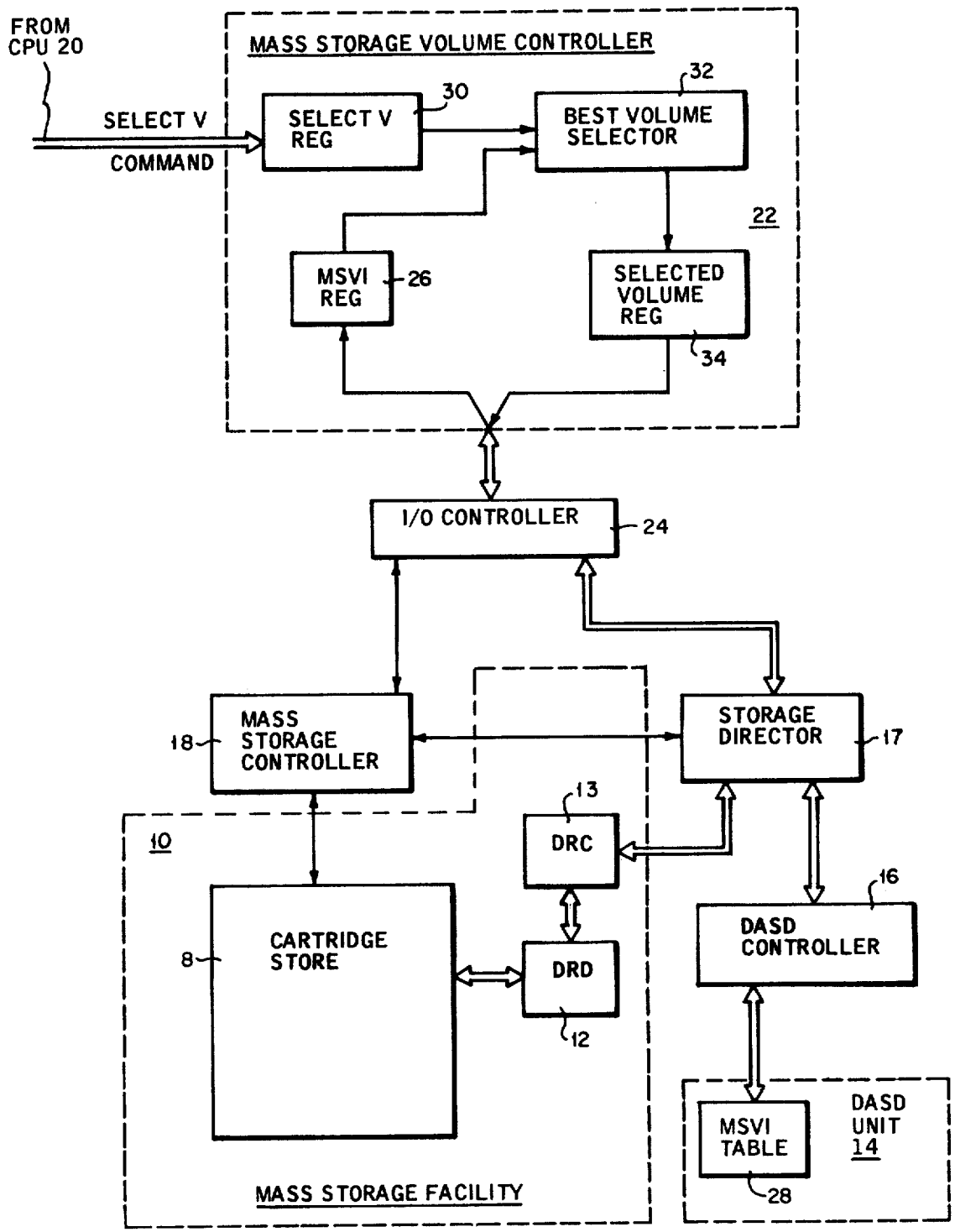
FIG. 3 is a block diagram showing apparatus of the mass storage system of FIG. 1 useful for selecting a volume according to the present invention.

The management of the virtual volumes of the mass storage facility 10 is provided by a mass storage volume controller 22 in the host CPU 20. The apparatus of FIG. 1 that is useful for selecting a volume is shown in FIG. 3. Suitable apparatus for use in the mass storage volume controller is given in FIG. 7 and will be discussed later. Better volume management is obtained by having the mass storage volume controller 22 control the selection of the volume. The mass storage volume controller 22 receives information through a mass storage volume inventory (MSVI) register 26 from which the status of the groups and the volumes, including space management, can be obtained. The information transferred to the MSVI register 26 is stored in the MSVI table 28 in the DASD units 14. The mass storage volume controller 22 updates and keeps a record of the status of each volume in the MSVI table 28. The MSVI table 28 stores a word for every volume group that identifies the volume group and lists its status. The bit and bytes comprising the word and the attributes of the volume group are shown in FIG. 4.

Figure 4:
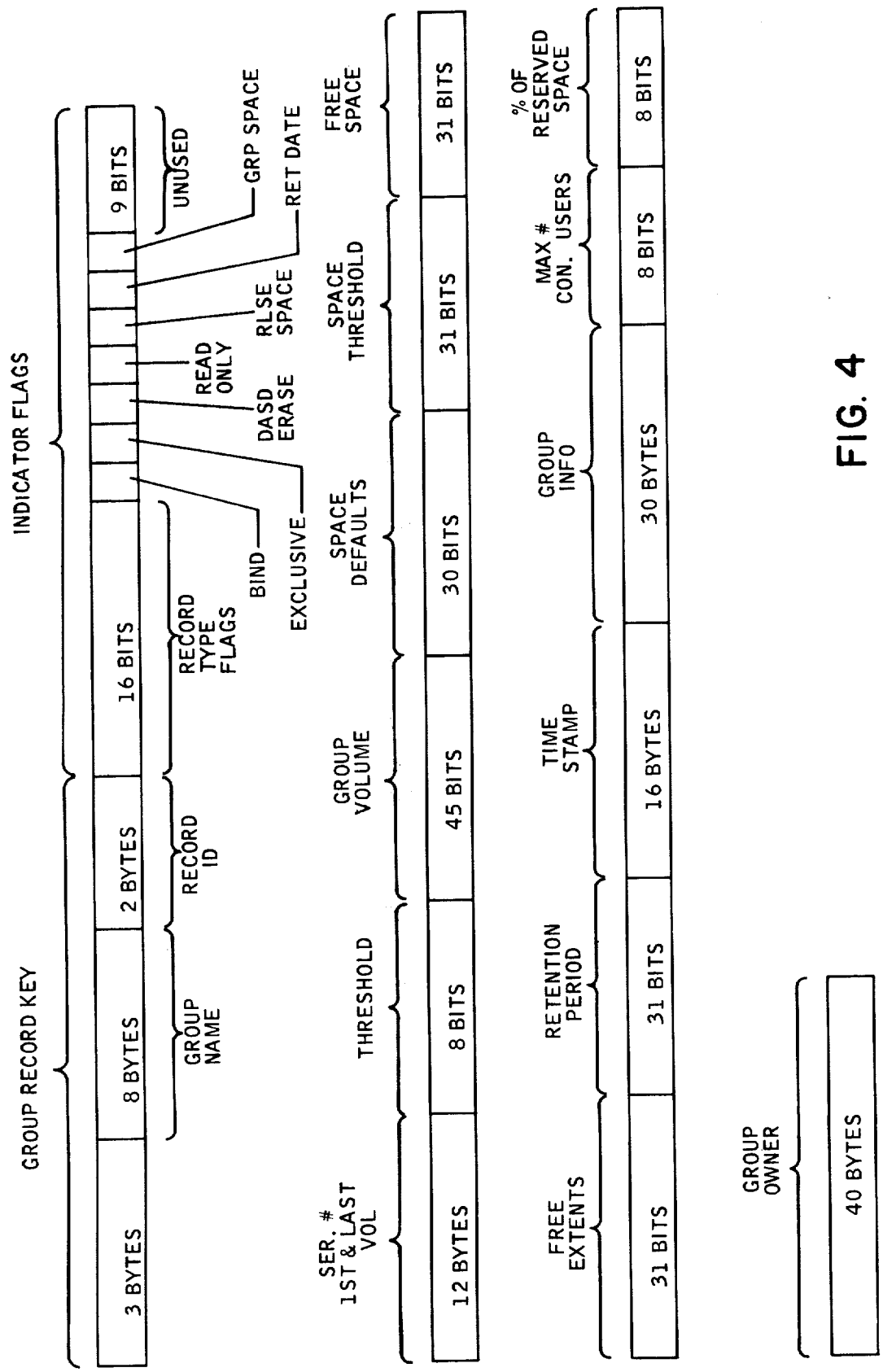
FIG. 4 shows the mapping of the word that describes the attributes of and identifies each volume group.
Figure 5:
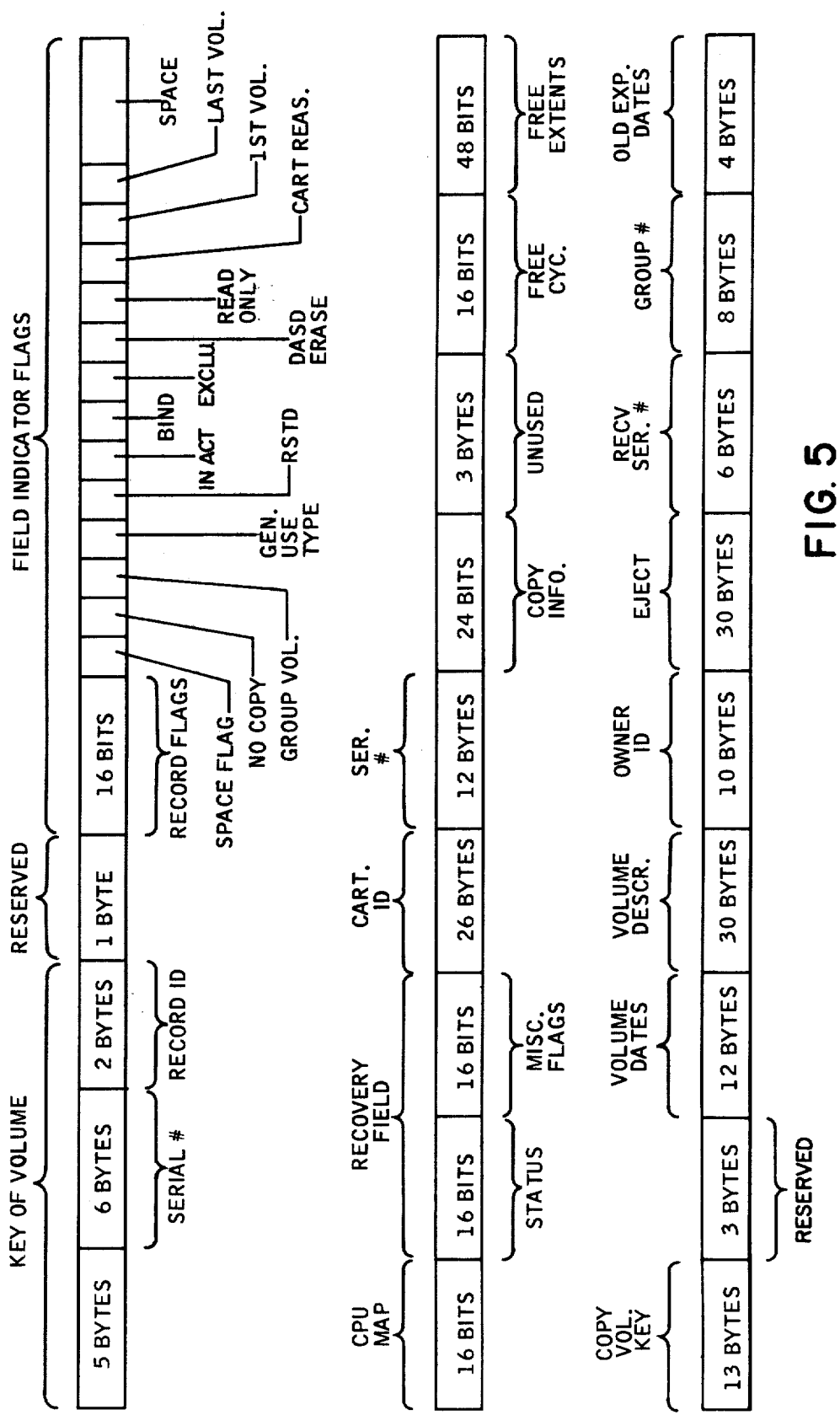
FIG. 5 shows the mapping of the word that describes the attributes of and identifies each volume.

Referring to FIG. 4, the mapping is shown of the word describing the volume group record contained in the MSVI table 28 data set. A record is kept in the MSVI table 28 for each volume and each volume group. The mapping of the word describing each volume is shown in FIG. 5. Referring to FIG. 4, the first thirteen bytes are the group record key which include the group name and the record identification. In the mass storage system of this invention, a byte contains eight bits of information. The next section contains thirty-two bits of information and are the field indicator flags. The first sixteen bits of the field indicator flags are the record type flags of which one identifies the record as a group record. The next seven bits with the nine spares are the specific attributes of the volume group. The next twelve bytes of information identify the serial number of the first and last volume in the group. The next eight bits identify the percentage of space threshold for the group. The forty-five bits for the group volume shows the number of general use volumes, the number of restricted volumes, and the number of inactive volumes. The next group of bits indicates the status of the space in the group and include the primary and secondary space defaults, the space threshold and the free space and free extents of the group. The next group of bits shows the retention period and the error time stamp of the group. The descriptive information of the group is allotted thirty bytes followed by the bits that show the maximum number of concurrent users per host CPU for a volume of this group. The next eight bits identify the percentage of reserved free space per volume for this group. The last bytes identify the owner of the information in this volume group.

The word showing the base volume record contained in the MSVI table 28 for each mass storage volume is shown in FIG. 5. Excluded from this record are the copy volumes and duplicate serial number volumes. In FIG. 5, the first thirteen bytes identify the key of the volume record including the serial number of the volume and the record identification. One byte is reserved followed by the thirty-two bits of the field indicator flags. The field indicator flags include the record flags and the different attributes of the volume. The attributes that can be flagged include the down level space flag, the do-not-copy flag, the flags identifying this volume as part of a group, as a general use type volume, as a restricted volume, and as an inactive volume, the bind volume attribute flag, the exclusive attribute flag, the DASD erase flag, the read only flag, the cartridges reassigned flag, the first volume in chain flag, and the last volume in the chain flag.

The next section maps the association to the central processing unit followed by the recovery fields which includes the status indicators and the miscellaneous flags. The status indicators are directed to the data in the volume and flag the creation of an incomplete volume, an incomplete volume copy, and a mismatched volume serial number. The next twenty six bytes identify the serial number of the two cartridges in the volume and their identification in the library. The next twelve bytes give the serial numbers of the previous and next volumes. The copy information of the word includes the number of copies of this volume, the number of backup copies and the maximum number allowed. The next information bits contain the number of free cylinders, the largest free extent, and the free extents on the volume. The remaining information in the word includes the important volume dates such as the expiration date of the volume, the description of the volume, the identity of the owner, and the identity of the group to which the volume belongs.

Figure 6A:
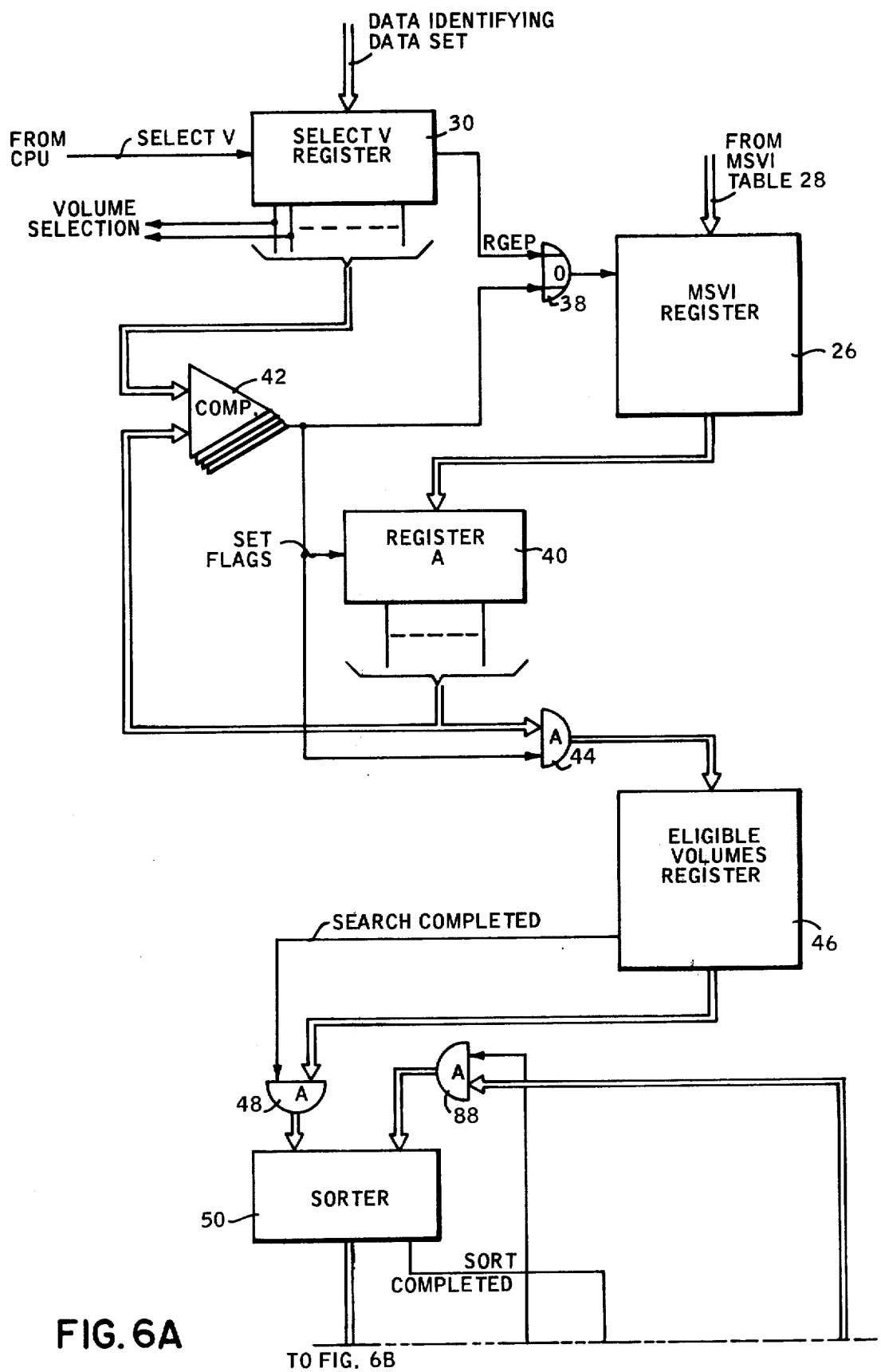
FIG. 6A–C are a more detailed block diagram of the mass storage volume controller of FIG. 3.
Figure 6B:
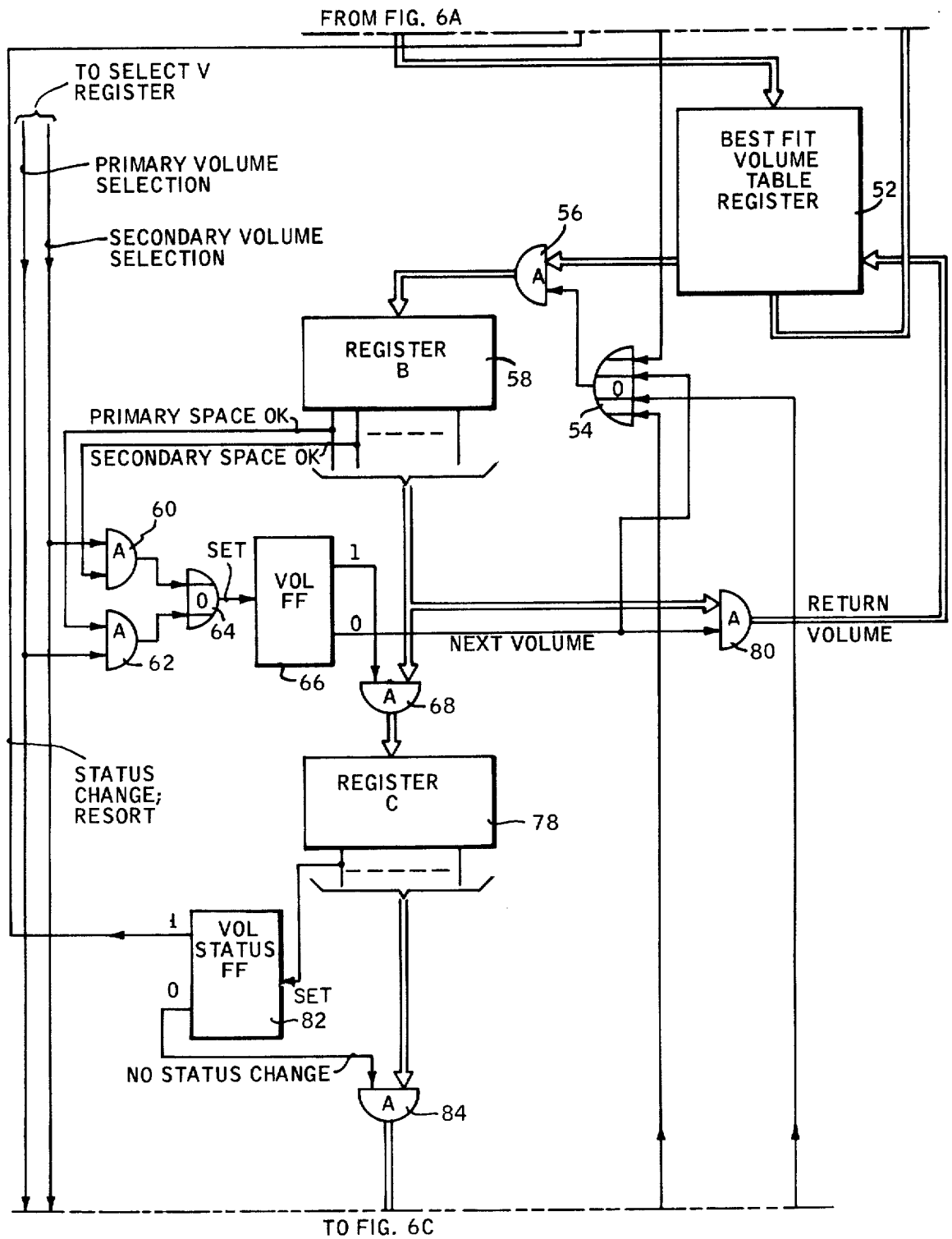
Figure 6C:
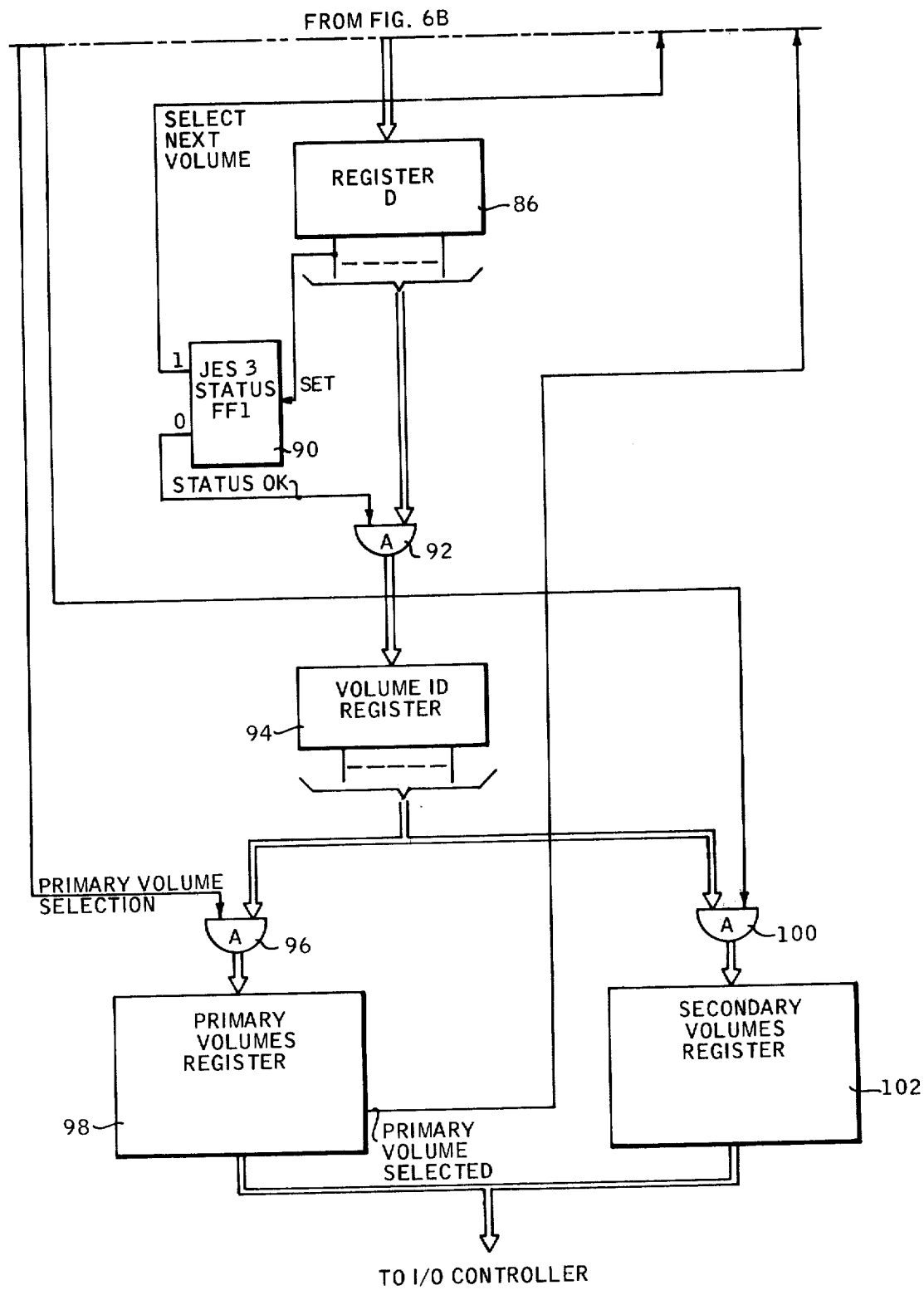

Referring again to FIG. 3, as stated, the attributes of the volumes are stored in the MSVI table 28 and transferred to the MSVI register 26 in the mass storage volume controller 22 when the select volume SELECTV command is stored in the selectv register 30. The information concerning the acceptable volumes group and the data set to be stored is transferred to a best volume selector 32. A more detailed apparatus of the best volume selector 32 is shown in FIG. 6 and will be discussed later. The best volume selector 32 selects the eligible volumes from the volume records in the MSVI register 26 and places these volume records in a list according to best to worst fit for the data set. The best volume records are directed to a selected volumes register 34 for transmission to the mass storage controller 18 which makes the cartridges of the volumes selected available for the storage of the data set information.

Several attributes of the volume groups are important for the selection of volumes for the storage of the data set, and also are important for space management, security, and performance of the system. The volume group includes values that describe its purpose, its owner, and the location of the owner. Other attribute values specify a threshold of free cylinders that must be maintained in the volume group for the aggregate space of all active general use volumes. If the number of free cylinders in the group is reduced below this threshold value due to data set allocations, a warning message is sent to the space manager. Cylinders within the volumes are given attributes of whether they are primary cylinders or secondary cylinders. These data set space allocation parameters provide common space allocation quantity for all data sets allocated in the group. These parameters provide a method for standardizing the size of data sets in the group if defaults are used, and are a principle means of preventing volume fragmentation. The use of uniform allocation quantities implies that, when a data set is destroyed, the destruction will produce free space extents which are multiples of the primary/secondary quantities of the volume group. These values can then be allocated to a new data set since the data set requires the same size allocation quantities.

Volume groups can be assigned the attribute value of release/no release. After data set allocation, unused allocated space is released in cylinder quantities if the data set is not empty. The system default for this parameter is no-release. The use of release will destroy the value of uniform primary and secondary allocation quantities in eliminating volume fragmentation, and therefore its use should be avoided except in special situations. One such situation is when the tape data set, whose size is unknown, is being transferred to a mass storage facility volume.

All of the volume groups contain an attribute value according to the period of time that the volumes assigned to the group are to exist before they expire. Through the use of this parameter, a volume retention group (VRG) is created. This type of group should only be used with retention period data sets; that is, data sets that have an assigned expiration date. A volume expiration date is calculated the first time a volume is selected to contain a data set after the volume is in a retention group. The volume expiration date is the date of the allocation plus a retention period. Nonspecific data set allocations will not allocate a data set to a volume if the expiration of the data set date exceeds that of a volume. When the volume expires, all data sets residing on that volume may be destroyed. The expiration date of the volume can be nullified and that volume is now ready for reuse. Data sets in the volume retention group should have retention periods that are not unreasonably lower than the retention period of the entire group. Otherwise, expired data may exist on volumes for relatively long periods of time. Also, a magnitude of data created daily in a volume retention group should approach the capacity of the volumes in the group. A daily creation rate which is a low fraction of the group's capacity will lead to an excess of wasted space.

The bind attribute value of a volume group requires that whenever a general use volume within the group is mounted, an entire staging drive must be reserved for that volume. The staging drive is released when the volume is demounted. As a consequence, data sets on a bound volume cannot be destaged, either wholly or partly. Thus, data in the bound volumes have performance characteristics that approximate the retrieval of data from the direct access storage devices. However, binding the volumes also reduces the staging space and therefore generally inflicts performance penalties on other uses.

The volume groups can also have the attribute of being shared which indicates that the volume group may be used by more than one host central processing unit when the volume is mounted. The volume group may also set aside space and takes this into consideration when making a non-specific data set allocation. This parameter sets aside a given percentage of the space of each active general use volume in the group as a reserved free space buffer area to provide protection against space allocation failure. The reserved space on a volume cannot be used for non-specific primary allocations. The purpose of this parameter is to provide space for secondary allocations such as data set expansion and for specific allocations. Concurrent accesses to any mounted general use volume in the group can be limited by another parameter which is used for a non-specific data set allocation. If a new data set allocation violates the maximum concurrent user number, the mass storage volume controller 22 will not select a mounted volume in this group unless no other better volumes in the group are available.

Several functions provide for the definition, creation, and management of the mass storage volumes in the mass storage facility. These functions require the services of the mass storage controller and are translated into commands by the mass storage system controller. The functions are: define or modify a volume, move a volume or cartridge, and copy a volume or cartridge. The defined volume function requests that a new mass storage volume be created using two unused data cartridges. The modify volume function requests that the attributes or characteristics of an existing volume should be altered. The move volume or cartridge function requests that a single data cartridge or a volume by physically ejected from the mass storage facility through the cartridge accessing station. Through this function, the data information in the cartridge can be stored elsewhere for a long storage cycle between requirements. The copy volume/copy cartridge function requests data from a DASD disk unit be copied to or from a volume from the mass storage facility, that a volume be copied to another volume in the mass storage facility, or that the information on one cartridge in the mass storage facility be copied to a different cartridge.

A management of the volumes in the mass storage facility requires several commands. The ADDV command activates an inactive mass storage volume. The volume can then be mounted by the host central processing unit. The CONVERTV command copies the data from the disk unit to the volumes or copies the data from the volume for transfer to the disk unit. The COPYV command makes a copy of an active mass storage volume. The CREATEV command creates mass storage volumes from unused data cartridges. This command defines the volumes for use by the system, formates the volume per use by the host central processing unit, and records the information about the volumes in the mass storage volume inventory. The CREATEV command also assigns volumes to a group upon request. The volumes are then accessible to the host operating system.

Another volume management command is the EJECTV command that physically ejects an inactive volume from the mass storage facility. Both cartridges of the volume are ejected.

A MODIFYV command changes the information about an active volume. This command can change one or all of the following: volume serial number, volume owner, volume description, volume group, the mounting attributes, the user designation, the expiration date, and the number of backup copies to be retained. The RECOVERV command restores the data from a volume copy to the original active volume or to another active volume. The copy remains as an inactive volume. The REMOVEVR command removes one or more volume records from the mass storage volume inventory. The volume must not be physically in the cartridge store. This command allows removal of records that were maintained in the inventory purely for information. The SCRATCHV command returns the cartridges making up a mass storage volume to the pool of unused cartridges, and removes the volume records from the mass storage volume inventory. The STOREV command makes an active mass storage volume inactive; the volume then cannot be mounted by the host central processing unit. The volume can be left in the cartridge store or can be ejected for storage.

The attributes of each volume are assigned at the volume creation time. Many of these are identical to those assigned to the volume groups. The volume attributes are set in the CREATEV command because they are also useful for a non-grouped volume. The binding and sharing parameters, for a general use volume, do not override the corresponding group attributes. The following attributes are more important to the selection process: a group name which indicates the owning group, if any; whether the volume is general or restricted; and the backup number attribute which specifies the number of backup volume copies that will be maintained by the system.

The general and restricted attributes apply only to grouped volumes. The general attribute designates general use volumes. These volumes are targets for non-specific data set allocation. Restricted volumes, on the other hand, must be specified for data set allocation. Restricted volumes may be useful for password protected data sets and, in general, for data sets that require specific management.

The mass storage facility has the capability of managing inactive data. The data that is used for backup data for the direct access storage devices is stored in the inactive volumes. An inactive volume is created by the STOREV command. While in the inactive status, the volume cannot be mounted and, therefore, its data sets cannot be referenced. A volume is restored to active status through the use of the ADDV command. An inactive volume may be a copy volume. A copy volume can contain backup data with a record kept in the mass storage volume inventory.

An inactive volume, which is not a copy volume, can support the data backup function by being the target for the copies of strategic data sets after it is temporally activated. These volumes use the standard data set copy facilities. These key data sets are periodically formed as part of the data integrity preservation procedure. When the volume in question is filled by this data, it is inactivated and stored. The data backup function is also supported by the inactive volumes that are not a copy volume by using the volume retention groups. When using the volume retention groups, a measure of data backup can be achieved by inactivating an expired volume for a specific period of time. In this case, no physical copying occurs of either the data sets or the volume.

The data set management on the system has the following aspects. Special procedures allocate data sets to non-specific volumes referred to as non-specific data set allocation. These procedures are unique in that they require the assistance of group general use volumes and take into account the amount of free space on the volumes and the expiration date of the volumes.

When the mass storage facility 10 runs short of storage space, the least recently used scheme is invoked to release pages for new data. This scheme uses the upper and lower staging page thresholds to destage data from the least recently referenced pages thus freeing the pages for new data. An executing program which has its data sets staged may be forced into a fault mode if the required data has been released as the least recently used data.

The system provides a non-specific data set allocation scheme for data sets. The scheme or algorithm enlarges the concept of the storage volume (on-line storage) to include the system's general use volumes thereby providing many more volumes for non-specific allocation of permanent data sets. This scheme provides protection against allocation based rejects, exploits the concept of the volume retention group, provides a degree of control over volume serialization activity, and supports forcing data set allocation onto separate volumes. The scheme gives the most benefit to permanent cataloged data sets. Cataloging is essential to allow future reference to data sets without the user having to know their volume location. The non-specific data set allocations apparatus and method of the present invention has the following characteristics:

1. the system selects the volume on which to place the data set;
2. volume serial numbers or space parameters need not be supplied;
3. the volume selected for data set allocation may be mounted or unmounted;
4. the volume selection for retention period data sets is optimized;
5. protection is provided against abnormal space allocation termination through the use of the reserved space parameter;
6. a greater amount of volume sharing results from allocation to mounted volume; and 7. a facility is provided for forcing output data sets to separate volumes from input data sets.

With this space management technique, the user need not be concerned with selecting a specific volume from a set of the large number of volumes. The parameter of the volumes such as space is taken from the primary and secondary data set space defaults of the volume group. The non-overriding of these space defaults through the mass storage volume controller 22 supports space management efforts to enforce uniform space allocation quantities within volume groups and in this way reduce or eliminate free space fragmentation on the storage volumes. The access to the volume selected for the data set to be stored is to a volume with sufficient free space (excluding reserved space) to allocate the data set in question. A volume is chosen for which the volume expiration date is equal to or exceeds, but is closest to, the expiration date of the data set to be stored. The selected volume may be mounted or unmounted. If no such volume is found, an unused volume in the group is selected and receives an expiration date of the current date plus the volume retention period. Optimizing the placement of retention data sets reduces wasted space on a volume by minimizing the length of time an expired data set will reside on a volume. The allocation scheme of the present invention will not allocate a non-specific data set (except for a reference allocation) to a volume if the existing allocation plus the new primary space allocation will exceed the non-reserved space on the volume. As was stated previously, a stated number of storage spaces on each volume in the group is set aside as a space buffer to prevent abnormal space termination. The purpose of the reserved space is to allow data sets to grow while avoiding a termination for lack of space. For this reason, secondary allocations can use reserved space. The concept of a free space buffer is especially important in the context of allocation to mounted volumes. In this case, the data set packing factor volume (the percent of the space in a volume that is allocated to data sets) increases over what it would be if data set allocation were allowed only on unmounted volumes. The greater packing density according to the present invention increases the risk of space allocation terminations. The free space buffer area is reserved to decrease the chance of a space allocation termination.

The increased sharing of volume space leads to increased contention for the volume by competing tasks. The degree of access can be controlled to a limited extent by the parameters of the CREATEG and MODIFYG commands. The mass storage volume controller 22 will attempt to bypass a volume during a non-specific data set allocation if the number of active users of the volume are equal to or greater than the number set by the parameter. Only active users in the host central processing unit are considered by these parameters. The effect of the constraints by the parameters is to balance the load, that is, to spread the allocations over more volumes in the group than would otherwise be the case. The forcing of the output data sets to separate volumes from the input data sets is of special value when the data from an old master file is entered into the system and placed on a new master file. For recovery purposes, it is preferred to have these files on separate volumes. The mass storage volume controller 22 will force a newly allocated data set to a separate volume from a previous request if required by the present volume request in the parameter list.

The non-specific allocation to mounted volumes according to the present invention has a number of performance advantages. For instance, the number of volume mounts is reduced. Correspondingly, the number of cartridge accesses and volume table of content stages are reduced thereby decreasing the amount of staging space that needs to be allocated for the table of contents. Formerly, the volume table of contents consumed valuable staging space on the DASD units 14 well out of proportion to their data space. Further, the possibility of the reuse of data is increased. Data reuse occurs when the mass storage controller 18 in a search for the data finds the requested data on staging packs of the DASD units 14 due to a previous use. When selecting a virtual volume unit on which to mount a volume, the mass storage controller 18 attempts to select a DASD unit in a staging drive group to which the volume had earlier been mounted. If it succeeds, the probability of finding required data already staged and thus available for reuse is increased. The required number of cartridge accesses and the number of cylinders staged is reduced. Thus, even when a cartridge must be accessed, the number of cylinders staged from that cartridge is reduced due to the reuse of the data.

A further advantage of the present invention is that the number of data sets and the proportion of allocated space on the volumes tends to increase. The increased data set packing arises because fewer volumes are required per group for each job step and more data sets can be packed into a retention period volume before its expiration date makes it unfeasible for new data set allocation. Under the former procedure which allocates to unmounted volumes, if a job allocates n number of new data sets in a group, that group required a minimum of n number of volumes. Since volume sharing increases in proportion to the number of data sets allocated onto the volume, there is a need for some form of load balancing to prevent undue serialization of a multi-data set volume. This is provided with the apparatus and method according to the present invention.

FIG. 6 shows a more detailed block diagram of the mass storage volume controller 22 of FIG. 3. This figure shows apparatus usable to perform the volume selection according to the present invention. To start the volume selection routine, the CPU 20 must first issue the select volume SELECTV command. The mass storage volume controller 22 will select volumes for some non-specific requests. This is the selection apparatus and method that is described in this description of the preferred embodiment. The types of requests from the CPU 20, that require the apparatus of FIG. 6 and the method steps of FIGS. 8-13, are new non-specific data set requests with a mass storage volume group specified for a group other than a special system volume group. The request from the CPU must also specify the virtual device type. The volume selection of this invention will not be selected when a mixed esoteric request is specified. A mixed esoteric request is when more than one device type is requested for storage. A mixed esoteric request would be one where a storage is requested in both DASD units 14 and a reel tape unit, for instance. If the command is correct for entering the apparatus of FIG. 6, the select volume SELECTV command activates the selectv register 30 and the data identifying the data set requirements is entered into the selectv register 30.

There are two data sets in the DASD units 14 that support the mass storage volume controller function.

The data set forming the MSVI table 28 contains the control records for each volume and volume group in the mass storage facility 10. The journal data set (not shown) is used to record all modifications to the MSVI table register 28. The journal data set is updated whenever the MSVI table register 28 has major modifications. The information in the MSVI table register 28 is transferred into the MSVI register 26 when activated by the SELECTV command. The transfer of the volume information from the MSVI register 26 to a register A is shown activated by a reading group extension records RGEP command by virtue of a symbolic OR gate 38. Register A is identified by the reference numeral 40. The volume information from the MSVI register 26 is transferred to the register A, each in sequence.

The information in register A 40 identifies one volume. This information is directed to comparators 42, which also is connected to the selectv register 30. If a volume according to the information concerning its attributes compares favorably to the requirements of the data set, the comparator 42 sets particular flags in the volume record now in register A, activates an AND gate 44 to transfer this volume record to an eligible volume register 46 and also activates the OR gate 38 to transfer another volume record from the MSVI register 26 to register A.

Each volume record from the group is checked one at a time to determine if the volumes are eligible to be selected for the current request according to the data set information. The comparators 42 check the different flags of the volume record to determine the mount status of the volume, and if the volume expires before the expiration date set for the data set, and also determines if there is sufficient space on the volume for the data set, if the volume is effected by a data separation criteria and whether the planned use of the volume by the data set is permitted. Thus, all of the volumes that are eligible for the data set are stored in the eligible volume register 46. After all of the records in the MSVI register 26 have been checked, a search completed command is generated that activates an AND gate 48 to start the transfer of the eligible volumes from the eligible volumes register 46 into a sorter 50.

The sorter 50 routinely orders the volume records from best fit to worst fit according to the data set information from the selectv register 30 and the attributes of the volume itself. The sorter performs the ordering on specific fields within the volume record. The flags entered into the volume record in register A 40 by the set flags command and stored in the eligible volume register 46 are shown in FIG. 7 which shows the mapping of the word for the volumes used in the sort procedure.

Figure 7:
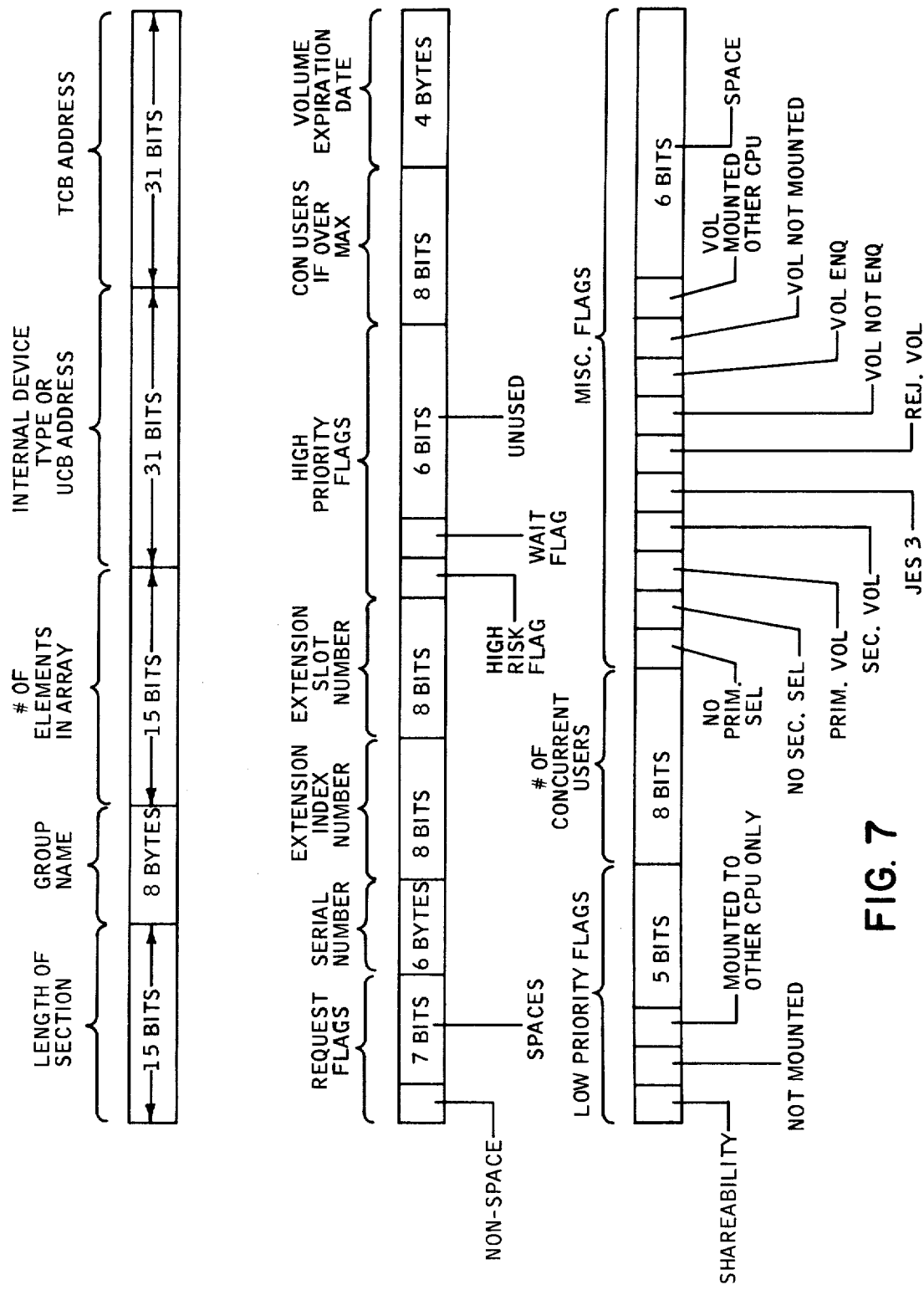
FIG. 7 shows the mapping of the word for the volumes as sorted in the best fit table of FIG. 6.

Referring to FIG. 7, all of the volume records in a specific group eligible to be selected for the particular request have the information as set out in the mapping of the word. Certain fields will be sorted when the list is complete in the order of their fitness for the request. After sorting, the volumes are placed in order from best to worst in a best fit volume table register 52, see FIG. 6. Besides having the standard information identifying the volume and volume group, the volume records in the eligible volume register 46 contains information bits identifying the request flags, the high priority sorting flags, the number of concurrent users flags, the volume expiration date in packed decimal, the low priority flags, and a group of miscellaneous flags. The information sections used in the sorting process are the high priority flags, the bits representing the number of concurrent users if over a maximum, the volume expiration date, the low priority flags, and the bits giving the number of concurrent users.

The request flag identifies the volume record as a non-shareable volume. The high priority sorting flags identify the volume as a high risk volume or as a wait or enqueued volume. If a volume is in a wait state, the volume is ready to be used by another procedure. If the concurrent users is over the maximum number, another section in the word identifies the number of concurrent users. The low priority flag indicates whether the volume can be shared, whether the volume is mounted or not, and whether the volume is mounted only to another central processing unit. The miscellaneous flags include flags representing whether the volume can be a primary or secondary selection, whether the volume already is a primary or secondary volume, whether the volume is approved by JES3 or not or whether the JES3 has already rejected this volume, whether the volume is enqueued or not, whether the volume is not mounted, or whether the volume is mounted to another central processing unit.

Returning to FIG. 6, the sorter 50 performs a sort on the bits of information as shown in FIG. 7. The first field sorted on is the bit representing whether the volume is a high risk volume or not. If this flag is on, the volume is a high risk volume and will go to the bottom of the list. The next field sorted on is the wait flag. If on, the volume is a wait volume and will go to the bottom of the non-high risk or bottom of the high risk list depending on the risk status. This type of stratification will continue as the lower priority fields are taken into account. The remaining fields sorted on in order of priority are the number of concurrent users if over maximum, the expiration date of the volume as compared to the expiration date of the data set, the shareability conflicts flags, the volume not mounted flag, the volume mounted only to another central processing unit flag, and the number of concurrent users field. For instance, since only volumes having an expiration date after the expiration date of the data set are eligible for the data set and thus available for storing in the eligible volumes register, the sort procedure only has to place the eligible volumes in date sequence. The earliest expiration date of otherwise eligible volumes is the best volume.

When the sorting is completed by the sorter 50, the volume records are located in the best fit volume table register 52 in an order from best fit to worst fit. The sorter 50 executes a sort completed command to activate an OR gate 54 which in turn activates an AND gate 56 to transfer the volume record that best fits the data set requirements to a register B, reference numeral 58.

In the register B, the primary and the secondary space is checked by checking these volume record bits of information (see FIG. 7) with the volume selection information of the data set from the selectv register 30. The primary volume selection and the secondary volume selection are compared with the primary and secondary space of the volume record in associated AND gates 60 and 62. If either the primary or secondary space meet the necessities of the data set, either one of the AND gate 60 or 62 is activated and, via an OR gate 64 sets a volume flip-flop 66. Activating the volume flip-flop 66 activates an AND gate 68 to transfer the volume record from the register B 58 to a register C. If the volume flip-flop 66 was not set, signifying that the primary and secondary space of the volume record, whatever is required at that time, does not meet the requirements of the data set, and AND gate 80 is activated to return the volume record from the register B back to the best fit volume table register 52. For instance, the volume record may not have sufficient space for a primary volume selection but may have sufficient space for a secondary volume selection, thus the volume record is returned to the best fit volume table register 52 to await the secondary volume selection. If the volume record is returned to the best fit volume table register 52, the volume flip-flop 66 also activates the OR gate 54 to transfer the next record to the register B via the AND gate 56. This volume record is then checked in the same manner as stated.

Assume the volume record passed the space requirements and was transferred to the register C shown as reference numeral 78. In register C, the volume status flags are checked to see if a change in the status was made since the selection of the volume record. If there is no status change, a volume status flip-flop 82 is not set and an AND gate 84 is activated to transfer the volume record from the register C to a register D, reference numeral 86. If the volume status flip-flop 82 is set, identifying that there is a status change, the volume status flip-flop 82 activates an AND gate 88 to start the transfer of the volume records from the best fit volume table register 52 for another sort into the sorter 50. The re-sorted volume records are again placed in the best fit volume table register 52 and the volume records are looked at from best to worst fit in the ordering procedure just mentioned for the operation of the sorter 50.

To continue with the apparatus of FIG. 6 assuming that there was no status change in the volume status and the volume record is in register D, the next step is to check whether the volume is approved for selection by JES3. The JES3 is a controller (not shown) that manages the operation of the entire system. The JES3 must be checked since it is possible that the central processing unit is planning to select this volume for another data set. Thus, this volume could already be scheduled to be used for the storage of another data set from another central processing unit and that central processing unit cannot share this volume. The volume may also be already scheduled to be used by another request on the host CPU and that request cannot wait or cannot share the volume. If either of these conditions exist, the mass storage volume controller 22 will set the JES3 flag in the volume record word (see FIG. 7) to signal the apparatus not to use this volume. Thus, if the JES3 flag is set, the JES3 status flip-flop will activate the OR gate 54 to transfer another volume record from the best fit volume table register 52 to the register B via the AND gate 56. The apparatus again will be activated to check that volume record for space and status change and the JES3 status. If the JES3 status is OK for a particular volume record, the JES3 status flip-flop 90 will activate an AND gate 92 to transfer the volume record from the register D to a volume ID register 94.

The primary volume selections are made first and thus the primary volume selection signal from the selectv register 30 activates an AND gate 96 to transfer the volume record from the volume ID register 94 to a primary volume register 98. A primary volume selected signal is then sent to the OR gate 54 to have another volume record transferred from the best fit volume table register for checking of its status as discussed. The apparatus is now checking for the required secondary volume and as the secondary volumes are obtained, the secondary volume selection signal activates an AND gate 100 to transfer these volume records into a secondary volumes register 102. The information from the primary volumes register 98 and a secondary volumes register 102 are transferred to the I/O controller 24, see FIG. 3. The volume records information is then transferred to the mass storage controller 18 which activates the selection of the particular volume from the cartridge store 8 for mounting. The data set information is then directed by the CPU 20 through the I/O controller 24 to the storage director 17 for placement directly onto the volumes as previously stated. The data set information is transferred through the DRC 13 and the DRD 12 directly onto the volume cartridges in the cartridge store 8.

In the apparatus of FIG. 6, the OR gate 38, the register A, the comparators 42 and the AND gate 44 all comprise means for comparing each volume status indication with the requirements indicator of the data set to obtain volumes eligible for the storage of the data set. The eligible volumes register 46 comprises a means for storing the available eligible volume status indications. The AND gate 48, the sorter 50, the best fit volume table register 52, the OR gate 54, the AND gate 56, the register B, the AND gates 60 and 62, the OR gate 64, the volume flip-flop 66, the AND gate 68, and the AND gate 80 all comprise a means for sequencing the eligible volumes obtained from best to worst fit according to the manner in which the volumes match the needs of the data set to be stored. The register C together with the volume status flip-flop 82 and the AND gate 84 comprise a means for checking the present status of the selected volume indication for any change, and the volume status flip-flop 82 together with the AND gate 88 comprise a means for activating a re-sequencing of the volume indication from best fit to worst fit if the volume status has changed. The register D, the JES3 status flip-flop 90, and the AND gate 92 all comprise a means for checking the present status of the selected volume indication for acceptance for the mass storage system. The volume ID register 94, the AND gate 96 and the AND gate 100 all comprise a means for determining the primary and secondary volume indications. The primary volume register 98 and the secondary volumes register 102 together with the I/O controller 24, the mass storage controller 18, the storage director 17, the DRC 13, the DRD 12, and the cartridge store 8 all comprise the means for transferring the data set information to the mass storage volume according to the selected primary and secondary volumes indications. Thus, the apparatus of FIG. 6 together with the apparatus of FIG. 3 comprises a means for selecting the volumes that best matches the requirements of the data set that is to be stored into that volume.

Figure 8:
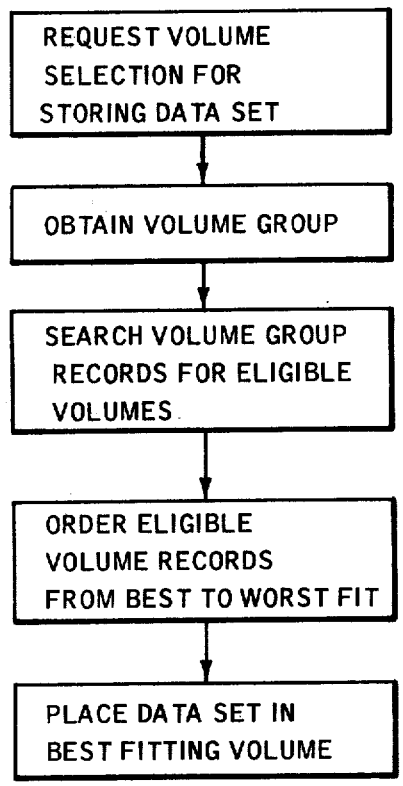
FIG. 8 is a high level flow diagram showing the overall procedures followed to select a volume according to the present invention.

In FIG. 8 is shown a procedure for accomplishing the volume selection according to the present invention. The first process or method step shown in the first block is to request a volume selection for storing the data set that requires a storage space. This request can be made by the primary host CPU 20 of the figures. The volume records for the volume group is then searched for all of the volumes that are eligible for storing the data set. This process step is performed by the comparators 42, the register A and the eligible volume register 46 of FIG. 6. In the fourth procedure step, the eligible volumes records obtained are ordered from best to worst fit of storing the data set information. This procedure is mainly performed by the sorter 50 together with the best fit volume table register 52, the registers B, C, and D and the flip-flop 66, 82 and 90. The last procedure step is to use the best fitting volume records to obtain the best fitting volume and to place the data set into that best fitting volume. This procedure can be best performed by the primary host CPU 20 using the I/O controller 24 in communication with the mass storage facility 10 and the storage director 17. A more particular process flow for the selection of volumes for a data set is shown in FIG. 9

Figure 9:
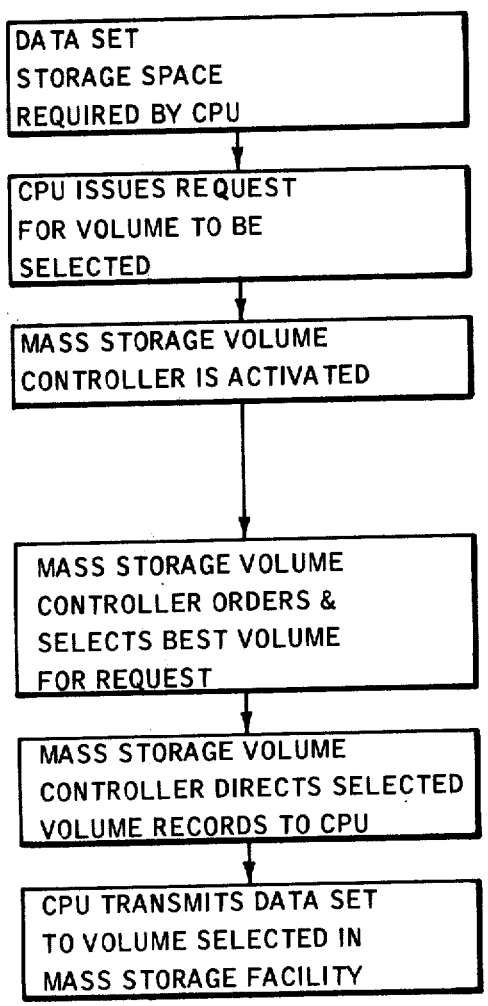
FIG. 9 is a flow diagram of the procedure taken by the mass storage system of FIG. 3 for selecting a volume.
Figure 10A:
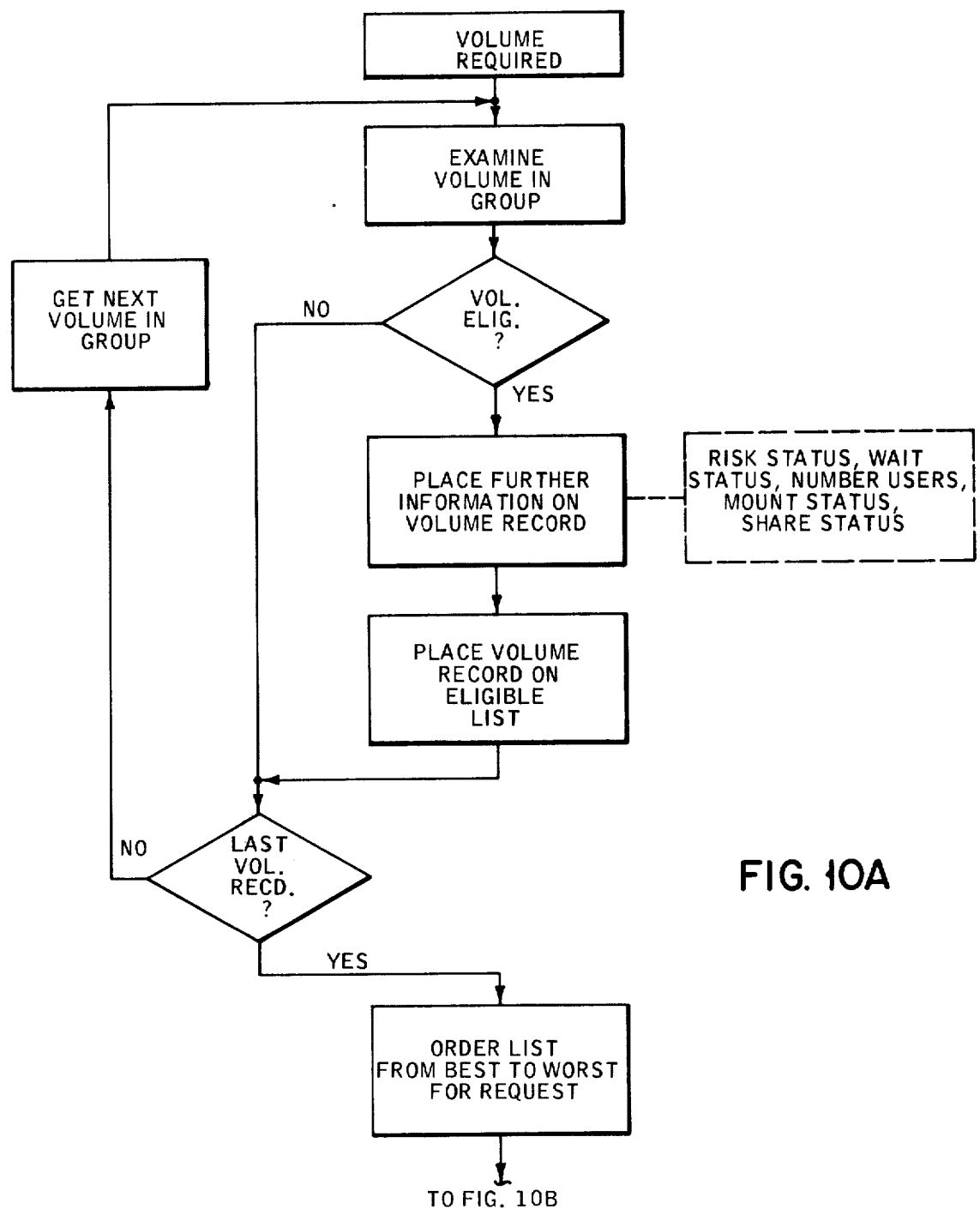
FIGS. 10A and B are a more detailed flow diagram of the volume selection method steps of the present invention.
Figure 10B:
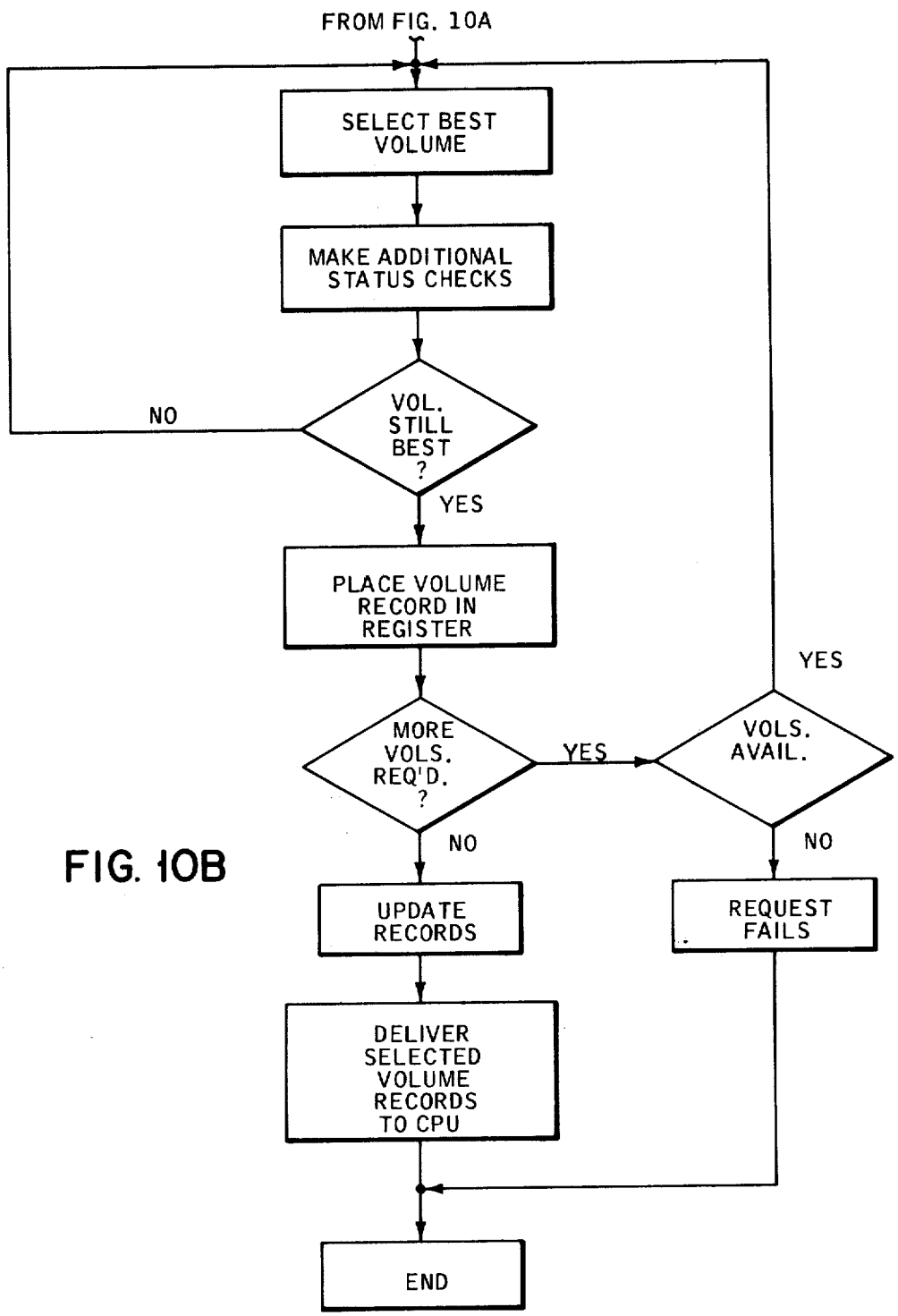
Figure 11A:
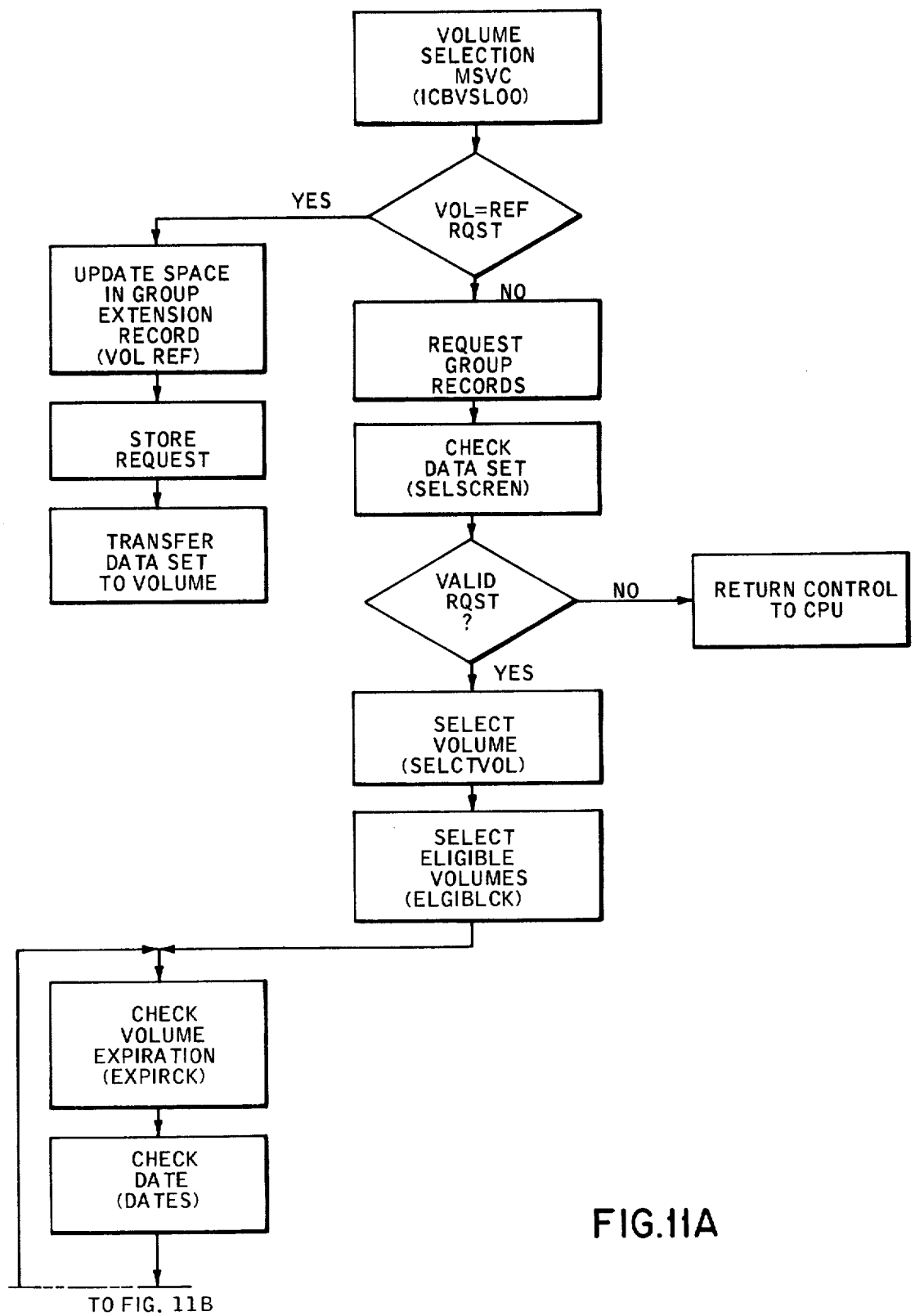
FIGS. 11A-C are a still more detailed flow diagram of volume selection method steps of the present invention.
Figure 11B:
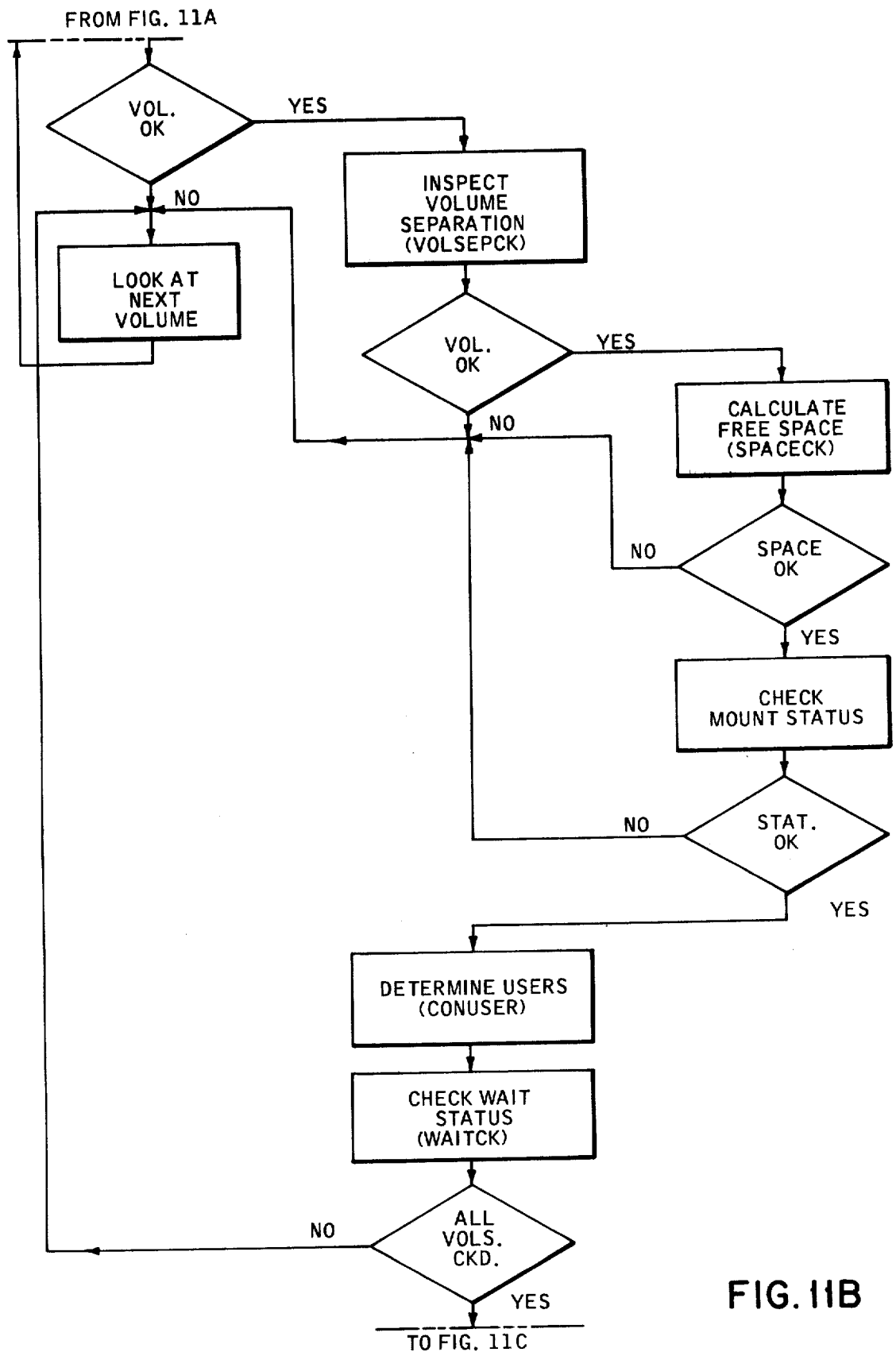
Figure 11C:
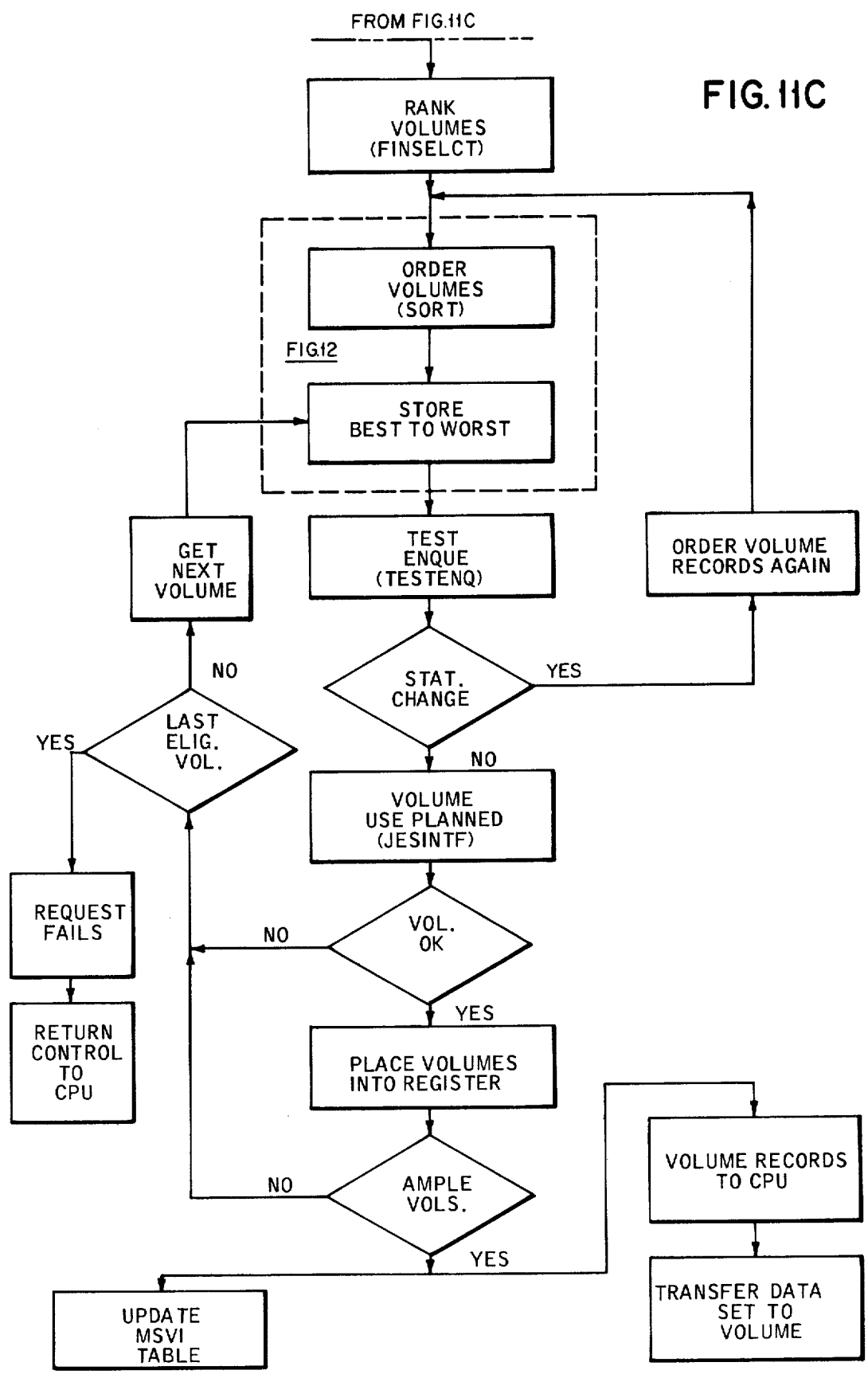

In FIGS. 9-11, method steps are shown for selecting a virtual volume for data storage under the request of a host central processing unit. FIG. 9 shows the method steps for the entire system including the central processing unit and the mass storage system. FIGS. 10A and 10B show more detailed method steps of the virtual volume selection by the mass storage volume controller of FIG. 6. FIGS. 11A-C show more detailed method steps for determining the order of preference for the volume selected.

In the general selection of a mass storage volume, if the request for a new data set specifies the storage system unit and does not specify a specific volume identification, the mass storage volume controller selects the volume for the new data set. Because no volume identification was specified for the new data set, this selection is called a non-specific volume request. The mass storage volume controller always selects the mass storage volume from a mass storage volume group. If the group is specified in the request, the mass storage volume controller selects the volume from the group named in the request. If no group is specified in the storage request for the new data set, the mass storage volume controller selects the volume from the special system volume group. Also, if the request does not specify a group, the central processing unit tries to find space on a volume that is already mounted. If the central processing unit cannot find the space in any volume, the mass storage volume controller then chooses a volume. If the request does not use the basic partition, the index sequential, and if the request does not specify the space, the mass storage volume controller supplies the space that is defined for the group.

If an existing data set on a volume needs more space on another volume, the mass storage volume controller selects the volume. If the volume for the data set belongs to a mass storage volume group, the mass storage volume controller then chooses from that same volume group. Otherwise, the mass storage volume controller selects the volume from the special systems group. In order to select a volume, the mass storage volume controller scans the MSVI table register and uses this information according to the present invention in order to obtain a volume for the new data set. After selecting the volume, the mass storage volume controller updates the information in the volume records of the MSVI table register.

If the request for the storage of the data set requires a multi-volume allocation, the primary space is allocated on the first volume selected which is called the primary volume. The volumes selected subsequently are called the secondary volumes.

In general, as shown in FIG. 9, the host central processing system first requires a storage area for some data. The host central processing unit issues a command to enter the mass storage system for a storage area. The request is placed onto the mass storage volume controller queue for handling in turn with the other systems requests. The mass storage volume controller is activated and responds to the command by requesting the records describing the group's volume. The volume is selected by the mass storage volume controller according to the procedure shown in FIGS. 10 and 11. The mass storage volume controller orders and selects the best volume or volumes for the request. The mass storage volume controller 22 in response to a signal that a volume has been selected transmits the records of the selected volume to the host central processing unit. The central processing unit then transmits the data set to the volume selected. A more specific description of the process of the present invention describing the volume selection is shown in FIG. 10.

Referring to FIG. 10, after the mass storage volume controller 22 receives the request for volumes from the CPU, the first step performed is to examine the volume records of the group stored in the MSVI register 26. The data information stored in the volume is not in the volume record stored in the MSVI register 26, but rather the information describing the volume. The information in the volume record is used by the mass storage controller 18 for the identification of the volume in the cartridge store 8 for the transfer of the data set. The first decision is whether the volume is eligible to satisfy this request. If it is not eligible, the volume record is checked to see if it is the last volume in the group and, if not, the subsequent step is to get the next volume in this group and to examine that volume. If the volume is eligible, the process goes to the next step where further information is placed on the volume record. Thus, the first procedure followed by the mass storage volume controller 22 is to determine which volumes in the group are eligible to be selected for the request.

The volume is initially eligible if: it is not exclusively dedicated to another host computer; the remaining space in a volume has not been invalidated; there is sufficient space on the volume to satisfy the request; the volume will not expire before the expiration date of the data set; the data separation does not exclude the volume; the volume selected must be available without waiting for another request to be completed if the request indicates that it can not wait; and the volume must be scheduled for use elsewhere. For primary volumes, there is enough space available in the volume if the primary extents will not use any of the reserved space. For secondary volumes, there must be enough space in the volume for one secondary extent, not taking reserved space into account.

As shown in FIG. 10 and described later in FIG. 12, the further information placed on the volume record concerns the risk status of the volume, the wait status, the number of concurrent users, the mount status, and the share status. The next process step is to place the volume record onto the eligible list. The process steps repeat to examine each volume record in this group by returning to the beginning of the process steps if the volume just placed on the eligible list was not the last volume record in the group. After all of the volume records in the group are searched to find volumes that are eligible for this request, the process flow continues to order the volume records on the eligible list from best to worst for request.

Thus, having determined which volumes are eligible for the selection, the mass storage volume controller 22 sorts the eligible volumes into an order of desirability for selection. This sorting is based on the following criteria which is given in decreasing order of their impact on the selection of the volume. The general process for the sort is shown in FIG. 12. The criteria in order is: the volume, if selected, could cause the job to fail because it is in use on another host central processing unit; the volume, if selected, could cause the job to wait for the completion of another request; the maximum desired number of concurrent users of that volume has been exceeded; the volume whose expiration date is equal to or later than and closest to the data set expiration date will be chosen first; the volume is already scheduled to be allocated on a non-shearable unit; and the volume selection is first from volumes already mounted for use by the host CPU, followed by the volumes mounted for use by another CPU. For the sorting process, the field being sorted on is set such that the field contains a relatively small number if the volume is a good candidate for the request and a relatively large number if the volume is a poor candidate for the request. Therefore, after the sorting is completed, the very best volume for the request is at the top of the list, followed by the second best volume and so forth. The worst volume for the request is last in the list. As shown in the word of the volume record of FIG. 7, since the field is scanned during the sorting procedure from left to right, the most critical volume status flag is placed on the left, followed by the second most critical status and so forth. The least critical volume status flag would be the last space on the right in the field being sorted.

Returning to FIG. 10, after the list of volume records are ordered from best to worst, the next process step is to select the best volume and to make additional status checks. The additional status checks concern whether the volume is acceptable to the JES3, whether there has been a status change, and whether the primary or secondary space is sufficient for the selection depending upon whether the volume is being selected as a primary or secondary volume. If the volume is to be a primary volume, in order to be eligible, there must be enough non-reserved free space for the primary extent. To be eligible as a secondary volume, there must be enough space for one secondary extent.

The next step is to determine if, after the additional status checks, the volume is still best for the request. If not, the process flow returns to again select the best volume. If this volume is still best for the request, the process flow continues to place the volume record in a register. In this step, the selected volumes are placed in the selected volumes register 34. The process steps continue to check whether more volumes are needed for this request. If more volumes are needed, the next process step is to check whether more volumes are available for the request. If there are no more volumes available, the request fails and the process ends. If there are more volumes available, the flow branches to select the next best volume and to make the additional status checks on that volume record in order to obtain the required volume records for the request.

After all of the volumes required are obtained, the next process step is to update the records. By this step, the records contained in the MSVI table 28 in the DASD unit 14 are updated to reflect their selection for this request. The selected volume records are then delivered to the CPU for obtaining the volume from the mass storage facility 10 for transmission of the data set to the selected volumes. A process flow then ends for the procedure steps of the mass storage volume controller 22.

The method steps for the present invention are best described in FIG. 11. The process selects the best volume available for a non-specific volume request. This method supports a request by the host CPU to place a data set into the mass storage facility. In FIG. 11, the name placed within the parenthesis in different process steps refers to the name of modules of the program listings which are given in the Tables at the end of this specification. For instance, the SELSCREN procedure is given in Table 2. The specific source listing for these module names permits a person skilled in the art to practice the invention according to the best mode.

As shown in FIG. 11, the volume selection request for storage space into the mass storage system activates the program ICBVSLOO. The request for a volume selection is transmitted to the mass storage volume controller 22. This module name directs the highest level of program execution and screens the request whether valid or invalid including a check to see if the request to allocate the data to the mounted volumes is supported in the mass storage system. If the volume request refers to a valid group general use volume, the ICBVSLOO program calls the VOLREF program for this request to update the running space count values. The VOLREF program reads the base volume record for the primary volume and updates the space in the group extention record. The request is then stored in the selected volume register and the host CPU transfers the data set to the volume.

If a volume was not specifically requested, the ICBVSLOO program requests the reading of the group record from the MSVI table. The next process step is to check the data set information by virtue of executing the SELSCREN program. The SELSCREN program is executed to make sure that the data set organization and the type of space allocation are valid. If this is not a valid request, the mass storage volume controller 22 returns the control to the CPU. If this was a valid request, the next process step is to select the volume by activating the SELCTVOL program to read the group extension records for the volume group. For each volume in the extension record, the SELCTVOL program activates the ELGIBLCK program to determine if the volume is eligible and therefore should be placed in the best fit table register.

The ELGIBLCK program takes the volumes in the group one at a time and determines that they are eligible to be selected for the current request. The ELGIBLCK program determines the mount status of the volume, the expiration date, the space left, and the planned use of the volume. This program calls the EXPIRCK, the SPACECK, and the VOLSEPCK program.

The ELGIBLCK program activates the EXPIRCK program to make sure that the volume does not expire before the data set. Where the data sets do not have space specified, a default will be established from the group record. If the volume is eligible and if the volume does not already have an expiration date, an expiration date will be placed temporarily in the volume record. This date will become permanent only if the volume is selected for the data set. If the volume does not have an expiration date that is after the expiration date of the data set, the volume is ineligible and the next process step is to look at the next volume and to check the expiration date of that volume. If the volume has an expiration date that is later, the next process step is to inspect the volume separation by activating the VOL-SEPCK program. If the volume is to be excluded for this specific request such as if the volume is affected by a data separation criteria, the program returns by looking at the next volume to again check the volume expiration date and to pass through the process steps as before. If the volume meets the criteria of the VOL-SEPCK program, the next process step is to check and calculate the amount of free space on the volume excluding the reserved space. This check is performed by the SPACECK program. The SPACECK program calculates the free space on the volume taking into account the reserved space on each volume. If more than one volume is selected, this process determines if enough space is left for one secondary allocation on each secondary volume. A volume is rejected if there is not sufficient space in the volume and the process returns to look at the next volume. If the space check determined that the amount of space was sufficient, the next process on FIG. 11 is to check the mount status of the volume.

If the volume under consideration is mounted to a host other than the requesting host, then the volume must be mounted on a host shareable basis. If the volume is mounted as non-shareable to another central processing unit, it is not eligible for the record. If a volume is already mounted to the requesting central processing unit, then the volume must be mounted as a private reserve or private removable volume or else the volume must have no mounting attributes. If the mount status is not approved for this volume selection, the process returns to look at the next volume and to continue through the process steps as above. If a mount status is approved for this request, the next process step is to determine how many users there are for a volume by executing the CONUSER program. The next step in the program is to check the current mount status of the volume to determine if this request may have to wait, if this volume is selected. The wait status of a volume is determined by the WAITCK program. The next step in the process is to check whether all volumes of the volume group have been checked in this procedure. If not, the process returns to look at the next volume and to continue through as discussed.

After all of the volumes have been checked, the next process is to rank all of the volumes selected according to their best fit to worst fit for the volume request. This ranking is done by the FINSELCT program. The FINSELCT program accomplishes the sorting of the volumes from best fit to worst fit, checks on the status of the enqueue and checks the status of the JES3 controller. This program chooses the best volume not rejected by the JES3 controller taking into account the enqueue status of the volume. The program chooses a primary volume first, then selects the requested number of secondary volumes if the request was for a multi-volume storage area. If no volumes or not enough volumes were selected, the FINSELCT program issues an error message. The FINSELCT program activates the SORT program, the TESTENQ program, and the JESINTF program. Thus, as shown in FIG. 11, the next process step is to order the volumes by using the SORT program to store the volume records from best fit to worst fit. The sort process is more completely described in FIG. 12 and will be discussed with that figure. The sort program, in general, orders the volumes by sensing specified fields within the volume records. The fields within the record are the flags set in the volume record word as shown in FIG. 7.

Continuing with the process steps of FIG. 11, the next process step is to test the enqueue status by the TESTENQ program. The TESTENQ program creates the communications necessary to issue a command to test the enqueue records. The TESTENQ program interprets the results and issues a code indicating how the volume should be handled when making the final selection of the volume. If the status of the volume has changed as indicated by the enqeue record, the program branches to re-sort the volume records again by entering the SORT procedure. If the status of the volume record has not changed, the next process step is to check the planned use of the volume by entering the JESINTF program.

The JESINTF program creates the communications needed to communicate with the JES3 controller. As stated previously, if the JES3 controller already has a usage for the volume selected, that volume record is rejected and the process branches to check whether this is the last eligible volume in the best fitting list and if not to get the next volume from the best fit register. If the volume under consideration is approved for use by this volume selection routine as determined by the JES3 controller, the program continues to place each volume into the selected volume register. If there are not enough volumes in the register, the program branches to get the next volume from the best fit register. If this is the last eligible volume and there are not enough volumes for this request, the program branches to fail this request and to return the control to the CPU. If the request is rejected, this means that no volume or not enough volumes meet the requirements of this particular request. If, however, there are enough volumes selected, the process step occurring next is to update the mass storage volume inventory table and also to transfer the volume records to the central processing unit which in turn activates the transfer of the data set information to the volumes selected in the mass storage facility.

In this process, the primary volume is chosen first and then the requested number of secondary volumes, if any, are selected.

Figure 12:
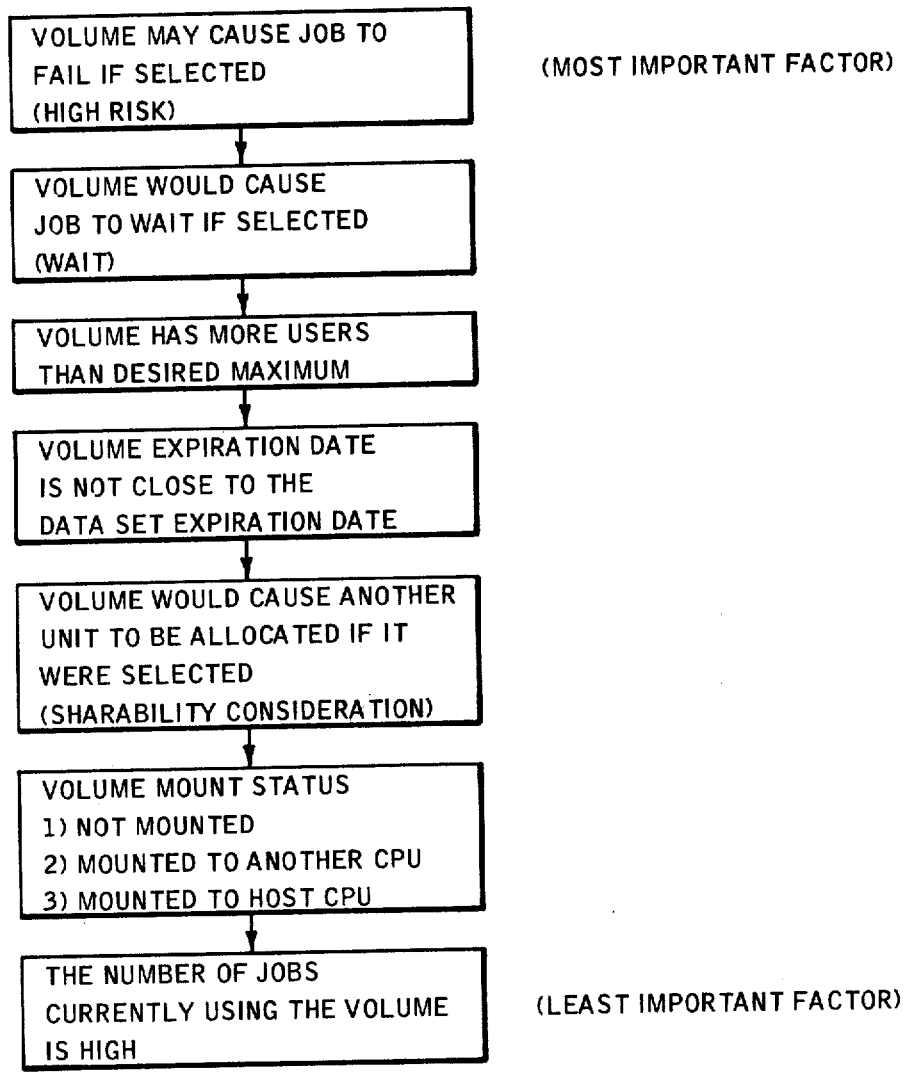
FIG. 12 is a flow diagram of the order process.

A more specific description of the process for ranking the volume records according to the best fit arrangement is shown in FIG. 12. The best fit process is a procedure performed by a mass storage volume controller 22 wherein a register stores all of the volume records in a specific order. All of these volumes are eligible to be selected for the particular volume selection request. Certain fields in each volume record identify the qualifications of each volume. These fields are examined and the volume records are placed in a list in the order of their fitness for the request according to the best to worst volume available. Further checks are made of the volume records to obtain additional information for placing the volume record within the best fit register. The sorting process checks through these criteria and places the volume records into the register with the first volume record being the best fitting volume for the request and the last being a volume available but not the best selection.

As shown in FIG. 12, the sort process ranks the volume records by sorting on particular bit fields and bit flags representing the current status of the volumes (see FIG. 7). The first field sorted is a bit representing whether the volume is a high risk volume or not. If the bit flag is high or on, the volume is a high risk and will go to the bottom of the list. A volume is a high risk volume if an esoteric or a specific unit address is specified on a request and the volume in question is not mounted to the selecting central processing unit but is mounted to another central processing unit. This is a high risk volume because if a specific unit address is specified, the volume may not be mountable to that specific unit. If an esoteric request is specified, the selected unit may not belong to the group to which the volume is already mounted making the volume unmountable to the selected unit. The next field sorted on is the WAIT flag.

There exists certain instances where a volume may not be a very good candidate for the current request because there is a previous request using or waiting in the queue to use the volume in an exclusive fashion. These volumes are called job wait volumes. The selection of this volume will cause this request to wait for the conflicting request to be completed. If the WAIT flag is activated, this signifies that the volume is selected for a request that would cause this request to wait because the volume was not completely ready for selection. A volume on the WAIT list will go to the bottom of the non-high risk or to the bottom of the high risk list depending upon the high risk status. This type of stratification will continue as the lower priority fields are taken into account. The remaining bit fields that are sorted in order of priority are: a number of concurrent users if over a maximum; the volume expiration date as compared to the expiration date of the data set; any conflict as to the shareability of the data set compared to the shareability of the volume under scrutiny; whether the volume is mounted or not mounted, or mounted to another host CPU; and the number of concurrent users currently using the volume. As shown in FIG. 12, the most important factor is the high risk flag with the least important factor being the number of jobs currently using the volume. Thus, a volume may be a good candidate for the volume request, but may not be the best candidate because of the shareability considerations of the volume. The volume request may be for a non-shareable use and the volume is shareable with other uses. The volume request may be for either shareable or non-shareable use and the volume in question is already scheduled to be allocated on a non-shareable unit by virtue of a request that is already awaiting processing. This volume, therefore, would be a shareability consideration volume.

The selection process from among the eligible volume records is from the criterion of the greatest importance to the criterion of the least importance. The most important aspect of the selection process is the selection of a volume that is not a high risk volume. If any volumes exist that are not high risk volumes, then one of these volumes will be selected. The remaining criteria will finalize the selection if more than one such volume exists. If all of the eligible volumes are high risk volumes, then one of these volumes will be selected with the remaining criteria finializing the selection if more than one high risk volume exists. From the volumes remaining, an attempt will be made to select a volume that is not a job wait volume. If any volumes exist that are not a job wait volume, then one of these volumes will be selected. The remaining criteria will finalize the selection if more than one such volume exists. If all of the volumes remaining are job wait volumes, then one of these job wait volumes will be selected unless the volume selection request requires an immediate transfer of the data set information. Thus, if only job wait volumes remain, the request will fail.

From the volumes remaining, an attempt will be made to select a volume that currently has fewer concurrent allocations within the requesting central processing unit than the desired maximum. If any volumes exist that currently have fewer concurrent allocations than the desired maximum, then one of these volumes will be selected. A remaining criteria will finalize the selection if more than one such volume exists. If no volumes exist that currently have fewer concurrent allocations than the desired maximum, then the volume with the fewest number of concurrent allocations is selected. If more than one such volume has a lowest value for concurrent allocations, then the remaining criteria will finalize the selection. If the specified group has a retention period, then from the volumes remaining, the volume whose expiration date is greater than or equal to but closest to the data sets expiration date will be chosen. If more than one volume exists with a best fit expiration date, then the remaining criteria will finalize the selection. If the specified group of volumes does not have a retention period, then no expiration criteria applies and the remaining criteria will finalize the selection from the volumes remaining.

From the volumes remaining, an attempt will be made to select a volume or volumes that does not contain a shareability consideration. If any volumes exist that have no shareability consideration, then one of these volumes will be selected. The remaining criteria will finalize the selection if more than one such volume exists. If all of the volumes remaining have a shareability consideration, then one of these volumes will be selected with the remaining criteria finalizing the selection if more than one such volume exists.

Again, from the volumes remaining, the procedure attempts to select a volume next that is already mounted to the requesting central processing unit or a volume that is scheduled to be allocated to the requesting central processing unit. This criteria is determined by an examination of the tables that contain the list of jobs that are yet to be performed or completed. If more than one such volume exists, then the volume with the fewest number of concurrent allocations is selected. If more than one such volume has a lowest value for concurrent allocations, the first such volume examined will be selected for this volume request. If none of the remaining volumes are already mounted or scheduled to be allocated to the requesting central processing unit, then an attempt will be made to select a volume that is already mounted to another host. If more than one such volume exists, then the first such volume examined will be selected. If none of the remaining volumes are already mounted or scheduled to be allocated to the requesting central processing unit, and none are already mounted to another central processing unit, then the first non-mounted volume examined will be selected for this request. When the sorting is completed, the best volume for this request is chosen as a primary volume and, if more than one volume is requested, the next best volume is chosen for the first secondary volume and so forth until all of the required volumes are chosen.

Tables 1–16 show the significant portions of an exemplary program implementation of the volume selection routine according to the present invention. The program is written in the virtual operating system language described, for example, in the IBM Systems/370 Principles of Operation Reference Manual No. GA22-7000-4, File No. S/370-01 for implementation on any IBM System 370 series computer. The immediately following Tables 1-16 each identify one procedure performed by the mass storage system and in particular by the mass storage volume controller which is itself identified by the ICBVSLOO volume selection routine of Table 1. Implementation of the present invention in the program of Tables 1-16 is apparent from an examination thereof and, therefore, except for the comparison to the flow diagram of FIGS. 11 and 12, are not described further herein.

```
TABLE 1 - ICBVSLOO: VOLUME SELECTION ROUTINE
     ICBVSLOO CSECT
              LR      RPLVPTR,REG1
              LA      SELTMPTR,RPLVUTIL(,RPLVPTR)
SETUP ADDRESSING TO RECORD RETURN AREAS
              LA      @06,STORBASE
              ST      @06,BASEVPTR
              LA      @06,STORGRP
              ST      @06,GROUPPTR
              LA      @06,STORGPEX
              ST      @06,GVSNEPTR
IF VOL=REF REQUEST CALL APPROPRIATE ROUTINE
              TM      SELVOLRF(SELTMPTR),B'00001000'
              BNO     @RF00242
              BAL     @14,VOLREF
     @RF00242 DS      0H
READ GROUP RECORD, FOR READ ONLY
              L       @06,JFCBPTR(,SELTMPTR)
              MVC     GROUPKY(8),JFCMSVGP(@06)
              LA      @06,GKEY
              ST      @06,RPLVKEY(,RPLVPTR)
              LA      @06,STORGRP
              ST      @06,RPLVBUF(,RPLVPTR)
              MVC     RPLVBLN(4,RPLVPTR),@CF02198
              OI      RPLVDIR(RPLVPTR),B'01000000'
              MVI     RPLVTYP(RPLVPTR),X'00'
              LR      REG1,RPLVPTR
              L       @15,@CV01897
              BALR    @14,@15
DETERMINE IF GROUP SUPPORTS THIS TYPE OF REQUEST
              L       @06,GROUPPTR
              CLI     GROCONUS(@06),0
              BNE     @RF00274
ZERO CONCURRENT USERS, GROUP DOES NOT SUPPORT THIS FUNCTION.
RETURN.
              MVC     RPLRCODE(2,RPLVPTR),@CB02074
              MVC     RPLVRETC(2,RPLVPTR),@CB02074
              OI      EXITVSL,B'00100000'
DETERMINE IF ANY GENERAL USE VOLUMES IN GROUP
              B       @RC00274
     @RF00274 L       @06,GROUPPTR
              LH      @06,GRONGEN(,@06)
              LTR     @06,@06
              BNZ     @RF00280
IF THERE ARE NO GENERAL USE VOLUMES IN GROUP, ISSUE ERROR
MESSAGE AND RETURN
              XC      MSGRQ(32),MSGRQ
              ST      RPLVPTR,MSGRPLV
              MVC     MSGID(4),@CF02026
              MVI     MSGLEN1,X'08'
              LA      @06,GROUPKY
              STCM    @06,7,MSGTEXT1
              LA      REG1,MSGRQ
              L       @15,@CV01899
              BALR    @14,@15
              MVC     RPLRCODE(2,RPLVPTR),@CB02054
              MVC     RPLVRETC(2,RPLVPTR),@CB02076
     @RF00280 DS      0H
     @RC00274 DS      0H
DETERMINE IF REQUEST IS FINISHED OR IF PROCESSING SHOULD
CONTINUE
     @RF00272 CLC     RPLVRETC(2,RPLVPTR),@CB02074
              BNE     @RF00295
```

```
            TM    SELVOLRF(SELTMPTR),B'00001000'
            BNZ   @RF00295
            TM    EXITVSL,B'00100000'
            BNZ   @RF00295
CALL ROUTINE TO DETERMINE IF VALID REQUEST.
            BAL   @14,SELSCREN
    @RF00295 CLC  RPLVRETC(2,RPLVPTR),@CB02074
            BNE   @RF00297
            TM    SELVOLRF(SELTMPTR),B'00001000'
            BNZ   @RF00297
            TM    EXITVSL,B'00100000'
            BNZ   @RF00297
DETERMINE NUMBER OF VOLUMES TO BE SELECTED FOR THIS REQUEST.
            TM    SELPARMT(SELTMPTR),B'10000000'
            BNO   @RF00299
            L     @06,JFCBPTR(,SELTMPTR)
            MVC   NUMBVOL(1),JFCBVLCT(@06)
IF NOT PARALLEL MOUNT, UNIT COUNT IS DESIRED NUMBER
            B     @RC00299
    @RF00299 MVC  NUMBVOL(1),SELUNCNT(SELTMPTR)
IF MORE VOLUMES THAN UNITS AND NOT PARALLEL MOUNT, THEN
REQUEST IS FOR NON-SHARE.
    @RC00299 L    @06,JFCBPTR(,SELTMPTR)
            CLC   JFCBVLCT(1,@06),SELUNCNT(SELTMPTR)
            BNH   @RF00302
            TM    SELPARMT(SELTMPTR),B'10000000'
            BNZ   @RF00302
            OI    NSHRREQF,B'10000000'
DETERMINE IF ENOUGH GENERAL USE VOLUMES IN GROUP TO SATISFY
THE REQUEST. EXIT IF NOT ENOUGH.
    @RF00302 SLR  @06,@06
            IC    @06,NUMBVOL
            L     @04,GROUPPTR
            CH    @06,GRONGEN(,@04)
            BNH   @RF00304
ISSUE ERROR MESSAGE AND REASON CODE.
            XC    MSGRQ(32),MSGRQ
            ST    RPLVPTR,MSGRPLV
            MVC   MSGID(4),@CF02026
            MVI   MSGLEN1,X'08'
            LA    @06,GROUPKY
            STCM  @06,7,MSGTEXT1
            LA    REG1,MSGRQ
            L     @15,@CV01899
            BALR  @14,@15
            MVC   RPLRCODE(2,RPLVPTR),@CB02054
            MVC   RPLVRETC(2,RPLVPTR),@CB02076
    @RF00304 DS   0H
DETERMINE IF REQUEST IS FINISHED OR IF PROCESSING SHOULD
CONTINUE.
    @RF00297 CLC  RPLVRETC(2,RPLVPTR),@CB02074
            BNE   @RF00319
            TM    SELVOLRF(SELTMPTR),B'00001000'
            BNZ   @RF00319
            TM    EXITVSL,B'00100000'
            BNZ   @RF00319
            LA    @06,STRBFTBL
            ST    @06,BFTBLPTR
            MVC   BFLEN(2,@06),@CB02195
NOW THAT ADDRESSING SET UP TO BEST FIT TABLE
SET NON-SHARE FLAG FROM INTERNAL WORK AREA.
            TM    NSHRREQF,B'10000000'
            BNO   @RF00353
```

```
              OI    BFNSHRFL(@06),B'10000000'
    @RF00353 DS     0H
    @RC00321 DS     0H
```
CHECK IF PROGRAM HAS ENCOUNTERED ERROR YET. IF NOT, CONTINUE
CALL SELECTVOL ROUTINE TO SELECT VOLUMES.
```
              BAL   @14,SELCTVOL
              BR    @14
```
*******************************************************
TABLE 2 - PROCEDURE NAME: SELSCREN
FUNCTION - DETERMINES IF REQUEST CAN BE PROCESSED ON BASIS
OF DATA SET AND SPACE REQUIREMENTS. SPACE MUST BE
SPECIFIED ON PARTITIONED OR INDEXED ORGANIZATION.
INPUT - JFCB (JOB FILE CONTROL BLOCK)
OUTPUT - REASON CODES AND RETURN CODE RETURNED IN RPLV
```
              B     @EL00001
    SELSCREN  ST    @14,12(,@13)
```
DETERMINE IF PARTITIONED OR INDEXED ORGANIZATION.
```
              L     @06,JFCBPTR(,SELTMPTR)
              TM    JFCORGIS(@06),B'10000010'
              BZ    @RF00372
```
CHECK TO DETERMINE IF SPACE WAS SPECIFIED. IF NO SPACE, SET
FAILING REASON AND RETURN CODE.
```
              ICM   @04,7,PQTY(@06)
              BNZ   @RF00374
              ICM   @04,7,SQTY(@06)
              BNZ   @RF00374
              TM    JFCBSPAC(@06),B'11000000'
              BNZ   @RF00374
              LH    @06,JFCBABST(,@06)
              LTR   @06,@06
              BNZ   @RF00374
```
SET REASON CODE AND RETURN CODE.
```
              MVC   RPLRCODE(2,RPLVPTR,@CB02050
              MVC   RPLVRETC(2,RPLVPTR,@CB02076
    @RF00374 DS     0H
```
DETERMINE IF NECESSARY TO CHECK ON CORRECT UNITS FOR SPACE
ALLOCATION.
```
    @RF00372 CLC    RPLVRETC(2,RPLVPTR,@CB02074
              BNE   @RF00380
```
CHECK ON UNITS SPACE ALLOCATED IN ABSOLUTE, MIXG OR ALX.
```
              L     @06,JFCBPTR(,SELTMPTR)
              TM    JFCBSPAC(@06),B'11000000'
              BNZ   @GL00015
              LH    @06,JFCBABST(,@06)
              LTR   @06,@06
              BNZ   @RT00382
    @GL00015  L     @06,JFCBPTR(,SELTMPTR)
              TM    JFCMIXG(@06),B'00000110'
              BZ    @RF00382
    @RT00382 DS     0H
```
SET REASON CODE AND RETURN CODE.
```
              MVC   RPLRCODE(2,RPLVPTR,@CB02042
              MVC   RPLVRETC(2,RPLVPTR,@CB02076
              BR    @14
              B     @EL00002
```
*******************************************************
TABLE 3 - PROCEDURE NAME: SELCTVOL
FUNCTION - MAIN DRIVER ROUTINE FOR THE SELECTION PROCESS.
HANDLES THE GROUP EXTENSION READING AND PASSES VOLUMES TO
ROUTINES TO BUILD A BEST FIT TABLE, SORT THE BEST FIT TABLE
AFTER IT IS BUILT AND FINALLY CALLS A ROUTINE TO SELECT A
SATISFACTORY VOLUME OR VOLUMES FOR THE REQUEST.
INPUT - THE SELECT REQUEST BLOCK, THE GROUP RECORD, AND THE

GROUP EXTENSION RECORDS FROM THE MSVI. ALSO THE STATUS OF
VOLUME AS TO ITS MOUNT STATUS FOR THE ELGIBLCK ROUTINE.
OUTPUT - A ZERO RETURN CODE IN RPLV WITH SELECTED VOLUMES
IN THE VOLUME RETURN AREA OR A NON-ZERO RETURN CODE IN THE
RPLV WHICH WILL FAIL THE REQUEST. REASON CODES ARE RETURNED
FOR FAILURES.

```
     SELCTVOL ST      @14,@SA00003
INITIALIZE BEST FIT TABLE INDEX TO ONE
              LA      INDXBFTB,1
INITIALIZE LOOP SWITCH
              NI      EXITSW,B'11101111'
INITIALIZE HEADER FIELDS IN THE BEST FIT TABLE
              L       @15,BFTBLPTR
              L       @14,GROUPPTR
              MVC     BFGROUP(8,@15),GROVVGRP(@14)
IF SPECIFIC UNIT REQUEST, PUT UCB ADDR IN BEST FIT TABLE. IF
NOT, PUT DEVICE TYPE IN BEST FIT TABLE.
              C       @04,SELUCBAD(,SELTMPTR)
              BNE     @RF00396
              L       @04,SELDEVTP(,SELTMPTR)
              ST      @04,BFDEVTP(,@15)
              B       @RC00396
    @RF00396  L       @04,SELUCBAD(,SELTMPTR)
              L       @01,BFTBLPTR
              ST      @04,BFDEVTP(,@01)
    @RC00396  L       @04,SELJOBID(,SELTMPTR)
              L       @01,BFTBLPTR
              ST      @04,BFJOBID(,@01)
SET UP RPLV TO READ GROUP EXTENSION RECORD.
              LA      @04,GKEY
              ST      @04,RPLVKEY(,RPLVPTR)
              LA      @04,STORGPEX
              ST      @04,RPLVBUF(,RPLVPTR)
              MVC     RPLVBLN(4,RPLVPTR),@CF02200
              OI      RPLVDIR(RPLVPTR),B'01000000'
              MVI     RPLVTYP(RPLVPTR),X'00'
              OI      RPLVKGE(RPLVPTR),B'00000100'
              NI      RPLVUPD(RPLVPTR),B'11111101'
SET UP OUTSIDE DO LOOP TO READ EACH EXTENSION RECORD.
              B       @DE00410
    @DL00410  DS      0H
SET UP INDEX TO READ NEXT RECORD.
              L       @04,GVSNEPTR
              SLR     @15,@15
              IC      @15,GVSNO(,@04)
              STC     @15,GIDKY
              AL      @15,@CF00043
              STC     @15,GIDKY
CALL THE I/O PROCESSOR TO READ THE GROUP EXTENSION RECORD.
              LR      REG1,RPLVPTR
              L       @15,@CV01897
              BALR    @14,@15
    @RF00417  LA      INDXEXTS,1
              B       @DE00432
    @DL00432  DS      0H
CALL ROUTINE DETERMINE IF VOLUME IS ELIGIBLE FOR SELECTION
FOR THIS REQUEST.
              BAL     @14,ELGIBLCK
IF VOLUME IS ELIGIBLE, MAKE REMAINING CHECKS, IF VOLUME NOT
ELIGIBLE, GET NEXT VOLUME IN EXTENSION IF ANY, OR FALL TO
END OF INSIDE LOOP GET NEXT VOLUME IN NEW EXTENSION RECORD
UNLESS CURRENT EXTENSION WAS THE LAST EXTENSION RECORD.
              CLC     INTERCC(2),@CB02074
```

```
              BNE     @RF00434
```
CHECK MOUNT FLAGS SET BY ELGIBLCK IF VOLUME IS MOUNTED TO
ANOTHER HOST AND THE DEVICE IS OTHER THAN 3330V, THE VOLUME
IS A HIGH RISK VOLUME.
```
              L       @04,BFTBLPTR
              LR      @02,INDXBFTB
              MH      @02,@CH02201
              ST      @02,@TF00001
              ALR     @02,@04
              TM      BFMTDOHF-18(@02),B'00100000'
              BNO     @RF00436
              CLC     SELDEVTP(4,SELTMPTR),DEV3330V
              BE      @RF00436
              AL      @04,@TF00001
              OI      BFHRSKFL-18(@04),B'10000000'
```
CALL ROUTINE TO DETERMINE IF VOLUME WOULD CAUSE THE STEP TO
WAIT IF IT WERE SELECTED FOR THE REQUEST ONLY IF IT IS
CURRENTLY MOUNTED TO THIS HOST. CALL ROUTINE TO GET NUMBER
OF CONCURRENT USERS THIS VOLUME HAS AT PRESENT TIME ONLY IF
VOLUME IS MOUNTED TO THIS HOST
```
    @RF00436  L       @04,BFTBLPTR
              LR      @02,INDXBFTB
              MH      @02,@CH02201
              ST      @02,@TF00001
              ALR     @02,@04
              TM      BFNOTMTD-18(@02),B'10000000'
              BNZ     @RF00438
              AL      @04,@TF00001
              TM      BFMTDOHF-18(@04),B'00100000'
              BNZ     @RF00438
              BAL     @14,WAITCK
              BAL     @14,CONUSER
```
SET BEST FIT TABLE POINTER TO NEXT SLOT SINCE AN ENTRY WAS
MADE IN BEST FIT TABLE.
```
    @RF00438  AL      INDXBFTB,@CF00043
    @RF00434  AL      INDXEXTS,@CF00043
    @DE00432  L       @04,GVSNEPTR
              LH      @04,GVSESIND(,@04)
              BCTR    @04,0
              CR      INDXEXTS,@04
              BNH     @DL00432
```
DETERMINE IF ANOTHER EXTENSION RECORD IS TO BE READ IF AN
ERROR HAS NOT ALREADY OCCURRED.
```
    @RC00417  TM      EXITSW,B'00010000'
              BNZ     @RF00446
              L       @04,GVSNEPTR
              TM      GVSEX(@04),B'10000000'
              BNZ     @RF00446
              OI      EXITSW,B'00010000'
    @RF00446  DS      0H
    @DE00410  TM      EXITSW,B'00010000'
              BZ      @DL00410
```
DETERMINE IF REQUEST FAILED YET.
```
              CLC     RPLVRETC(2,RPLVPTR),@CB02074
              BNE     @RF00449
```
SET INDEX COUNTER IN BEST FIT TABLE TO NUMBER OF ELEMENTS IN
BEST FIT TABLE.
```
              C       INDXBFTB,@CF00043
              BNH     @RF00451
              LR      @04,INDXBFTB
              BCTR    @04,0
              L       @01,BFTBLPTR
              STH     @04,BFTOTIDX(,@01)
```

```
                B      @RC00451
     @RF00451 L        @06,BFTBLPTR
              SLR      @04,@04
              STH      @04,BFTOTIDX(,@06)
```
DETERMINE IF THERE ARE ENOUGH VOLUMES IN THE BEST FIT TABLE
TO POSSIBLY SATISFY THIS REQUEST. IF NOT, ISSUE MESSAGE AND
FAIL THE REQUEST NOW.
```
     @RC00451 SLR     @06,@06
              IC      @06,NUMBVOL
              L       @04,BFTBLPTR
              CH      @06,BFTOTIDX(,@04)
              BNH     @RF00454
```
ISSUE ERROR MESSAGE AND FAIL REQUEST WITH REASON CODE.
```
              XC      MSGRQ(32),MSGRQ
              ST      RPLVPTR,MSGRPLV
              MVC     MSGID(4),@CF02026
              MVI     MSGLEN1,X'08'
              L       @06,GROUPPTR
              LA      @06,GROVVGRP(,@06)
              STCM    @06,7,MSGTEXT1
              LA      REG1,MSGRQ
              L       @15,@CV01899
              BALR    @14,@15
              MVC     RPLRCODE(2,RPLVPTR),@CB02054
              MVC     RPLVRETC(2,RPLVPTR),@CB02076
     @RF00454 DS      0H
```
IF REQUEST HAS NOT ALREADY FAILED, SET UP PARAMETER LIST
CALL TABLE PROCESSOR TO UPDATE CONCURRENT USERS, WAIT
STATUS, SHAREABILITY AND MOUNT STATUS OF VOLUMES IN BEST
FIT TABLE.
```
     @RF00449 CLC     RPLVRETC(2,RPLVPTR),@CB02074
              BNE     @RF00469
              LA      @06,STRTABP
              XC      TABP(12,@06),TABP(@06)
              OI      TABFBFIT(@06),B'00100000'
              LA      @04,RPLVUTIL(,RPLVPTR)
              ST      @04,TABSELRB(,@06)
              L       @04,DFTBLPTR
              ST      @04,TABBFTBL(,@06)
              ST      @06,@AL00001
              L       @15,@CV01901
              LA      @01,@AL00001
              BALR    @14,@15
```
LOOP THRU BEST FIT TABLE AND UPDATE CONCURRENT USER FIELD
FOR VOLUMES THAT ARE OVER THE MAXIMUM CONCURRENT USERS.
```
              LA      INDXBFTB,1
              B       @DE00476
     @DL00476 DS      0H
```
DETERMINE IF CONCURRENT USERS IS OVER MAXIMUM.
```
              L       @04,BFTBLPTR
              LR      @15,INDXBFTB
              MH      @15,@CH02201
              SLR     @14,@14
              IC      @14,BFCONUSE-18(@15,@04)
              L       @01,GROUPPTR
              SLR     @00,@00
              IC      @00,GROCONUS(,@01)
              CR      @14,@00
              BL      @RF00477
```
SET OVER MAXIMUM FIELD TO NUMBER OF CONCURRENT USERS.
```
              STC     @14,BFOVERUS-18(@15,@04)
     @RF00477 AL      INDXBFTB,@CF00043
     @DE00476 L       @04,BFTBLPTR
```

```
            CH    INDXBFIB,BFTOTIDX(,@04)
            BNH   @DL00476
CALL ROUTINE TO USE BEST FIT TABLE TO MAKE FINAL VOLUME
SELECTIONS FOR THIS REQUEST.
            BAL   @14,FINSELCT
CHECK IF FINSELCT ROUTINE HAD A PROBLEM OR ANY PREVIOUS
PROBLEMS EXIST, AND IF THERE ARE NOT ANY, CALL ROUTINE TO
UPDATE THE MSVI RECORDS.
    @RF00469 CLC   RPLVRETC(2,RPLVPTR),@CB02074
            BNE   @RF00482
            BAL   @14,UPDTMSVI
SET UP PARAMETER LIST TO CALL THE TABLE PROCESSOR TO TABLE
THE VOLUME SELECTIONS MADE FOR THIS REQUEST.
            L     @06,SELGRPPR(,SELTMPTR)
            L     @04,BFTBLPTR
            MVC   GRPNAME(8,@06),BFGROUP(@04)
            SLR   @15,@15
            IC    @15,PRIBFIDX
            MH    @15,@CH02201
            SLR   @14,@14
            IC    @14,BFGRPIDX-18(@15,@04)
            STC   @14,GRPEXTIN(,@06)
            SLR   @14,@14
            IC    @14,BFGRPSLT-18(@15,@04)
            STC   @14,GRPSLOTN(,@06)
            LH    @04,PRICYL
            STH   @04,GRPPRMSP(,@06)
            LA    @04,STRTABP
            XC    TABP(12,@04),TABP(@04)
            OI    TABFBLDE(@04),B'10000000'
            LA    @15,RPLVUTIL(,RPLVPTR)
            ST    @15,TABSELRB(,@04)
            ST    @04,@ALC0001
            L     @15,@CV01901
            LA    @01,@ALC0001
            BALR  @14,@15
            BR    @14
            B     @EL00003
**********************************************************
TABLE 4 - PROCEDURE NAME: VOLREF
FUNCTION - HANDLES VOL=REF REQUESTS BY UPDATING SPACE IN THE
EXTENSION RECORD FOR THE PRIMARY VOLUME. IF THE SPACE WAS
SUCCESSFULLY UPDATED IN EXTENSION RECORD, THEN THAT SPACE
IS TABLED BY THE TABLE PROCESSOR, OTHERWISE ZERO CYLINDERS
ARE TABLED ON THE CALL TO THE STEP TABLE PROCESSOR.
INPUT - ADDRESSABILITY SET UP TO JFCB, BASE VOLUME RECORD,
GROUP EXTENSION RECORD.
OUTPUT - UPDATED FREE SPACE FOR VOLUME IN GROUP EXTENSION
RECORD, TABLED DD ENTRY IN STEP TABLE RESULTING FROM CALL TO
TABLE PROCESSOR. ZERO REASON AND RETURN CODES IN THE RPLV.
    VOLREF   ST    @14,@SA00004
GET THE VOLID OF THE PRIMARY VOLUME FROM THE JFCB AND READ
THE BASE VOLUME RECORD.
            L     @06,JFCBPTR(,SELTMPTR)
            MVC   VOLKY(6),JFCAVOLS(@06)
            LA    @06,VKEY
            ST    @06,RPLVKEY(,RPLVPTR)
            LA    @06,STORBASE
            ST    @06,RPLVBUF(,RPLVPTR)
            MVC   RPLVBLN(4,RPLVPTR),@CF02202
            OI    RPLVDIR(RPLVPTR),B'01000000'
            MVI   RPLVTYP(RPLVPTR),X'00'
            LR    REG1,RPLVPTR
```

```
          L     @15,@CV01897
          BALR  @14,@15
IF THE BASE VOLUME RECORD WAS READ, CHECK THAT IT IS GROUPED
OTHER THAN SYSGROUP AND IS GENERAL-USE, READ FOR CORRECT
SLOT IN EXTENSION RECORD.
          B     @RC00508
@RF00508  L     @06,BASEVPTR
          TM    BASGRPV(@06),B'00110000'
          BNO   @RF00522
          CLC   BASGROUP(8,@06),SYSGROUP
          BE    @RF00522
          NI    ERRORSW,B'11100111'
          MVI   GBLKKY,C' '
          MVI   GIDKY,X'01'
          MVC   GROUPKY(8),BASGROUP(@06)
          LA    @06,GKEY
          ST    @06,RPLVKEY(,RPLVPTR)
          LA    @06,STORGPEX
          ST    @06,RPLVBUF(,RPLVPTR)
          MVC   RPLVBLN(4,RPLVPTR),@CF02200
          OI    RPLVDIR(RPLVPTR) B'01000000'
          MVI   RPLVTYP(RPLVPTR) X'00'
          OI    RPLVGE(RPLVPTR),B'00000100'
          OI    RPLVUPD(RPLVPTR) B'00000010'
@DL00536  DS    0H
READ GROUP EXTENSION RECORD.
          LR    REG1,RPLVPTR
          L     @15,@CV01897
          BALR  @14,@15
UPDATE FIELDS FOR TABLE PROCESSOR CALL ROUTINE TO CONVERT
SPACE TO CYLINDERS TO UPDATE MSVI RECORDS IF SPACE IS NOT
ALREADY DOWN LEVEL
          L     @04,SELGRPPR(,SELTMPTR)
          MVC   GRPNAME(8,@04),GVSVVGRP(@06)
          MVC   GRPEXTIN(1,@04),GVSNO(@06)
          STC   INDXEXTS,GRPSLOTH(,@04)
UPDATE SPACE IN EXTENSION SLOT.
          L     @06,GVSNEPTR
          LR    @04,INDXEXTS
          MH    @04,@CH01836
          LH    @02,GVSMTDSP-20(@04,@06)
          SH    @02,PRICYL
          STH   @02,GVSMTDSP-20(@04,@06)
WRITE UPDATED EXTENSION RECORD.
@RF00559  MVI   RPLVTYP(RPLVPTR),X'01'
          LR    REG1,RPLVPTR
          L     @15,@CV01897
          BALR  @14,@15
IF SPACE UPDATE IN EXTENSION RECORD WAS SUCCESSFULLY WRITTEN
TO THE MSVI, THEN INDICATE TO TABLE PROCESSOR THE AMOUNT OF
PRIMARY SPACE.
          CLC   RPLVRETC(2,RPLVPTR),@CB02074
          BNE   @RF00566
          L     @06,SELGRPPR(,SELTMPTR)
          LH    @04,PRICYL
          STH   @04,GRPPRMSP(,@06)
          B     @RC00566
@RF00566  DS    0H
          MVC   RPLVRETC(2,RPLVPTR),@CB02074
          MVC   RPLRCODE(2,RPLVPTR),@CB02074
@RC00566  DS    0H
@RF00522  DS    0H
@RC00508  LA    @06,STRTADP
```

```
           OI    TABFBLDE(@06),B'10000000'
           LA    @04,RPLVUTIL(,RPLVPTR)
           ST    @04,TABSELRB(,006)
           ST    @06,@AL00001
           L     @15,@CV01901
           LA    @01,@AL00001
           BALR  @14,@15
IGNORE REG15 AND RETURN
           BR    @14
****************************************************
```

TABLE 5 - PROCEDURE NAME: ELGIBLCK
FUNCTION - DETERMINES IF A VOLUME IS ELIGIBLE TO BE SELECTED
FOR THIS PARTICULAR REQUEST. CHECKS AVAILABLE FREE SPACE,
CHECKS MOUNT STATUS AND IF MOUNTED TO ANOTHER HOST, CHECKS
IF GROUP MUST HAVE EXCLUSIVE CONTROL OR IF VOLUME IS
MOUNTED EXCLUSIVE TO ANOTHER HOST. ALSO CHECKS FOR USER
SPECIFIED UNIT OR DATA SEPARATION REQUESTS. CHECKS MOUNT
ATTRIBUTES IF VOLUME HAS AN ASSOCIATED UCB.
INPUT - INDEX INTO BEST FIT TABLE, INDEX INTO GROUP EXTENSION
RECORD, GROUP RECORD, SELECT REQUEST BLOCK, GROUP EXTENSION
RECORD, MSVC CONTROL BLOCK.
OUTPUT - AN ENTRY FOR THE VOLUME UNDER CONSIDERATION IN THE
BEST FIT TABLE OR A FOUR RETURN CODE IN THE INTERNAL RETURN
AREA.

```
ELGIBLCK   ST    @14,@SA00005
DETERMINE MOUNT STATUS OF VOLUME AND SET INDICATORS IN BEST
FIT TABLE.
@RF00610   CLC   INTERCC(2),@CB02074
           BNE   @RF00625
           LR    @04,INDXEXTS
           MH    @04,@CH01836
           L     @02,GVSNEPTR
           ALR   @02,@04
           CLC   GVSCPUBM-20(2,@02),@CB02074
           BNE   @RF00627
SET INDICATOR SHOWING VOLUME NOT MOUNTED.
           L     @04,BFTBLPTR
           LR    @02,INDXBFTB
           MH    @02,@CH02201
           ST    @02,@TF00001
           ALR   @02,@04
           OI    BFNMTDFL-18(@02),B'01000000'
           AL    @04,@TF00001
           OI    BFNOTMTD-18(@04),B'10000000'
IF VOLUME IS MOUNTED, DETERMINE IF MOUNTED ONLY TO ANOTHER.
           B     @RC00627
@RF00627   DS    0H
CHECK IF MOUNTED TO THIS HOST.
           LR    @04,INDXEXTS
           MH    @04,@CH01836
           MVC   TESTMASK(2),VVICPUID(VVIPTR)
           L     @02,GVSNEPTR
           ALR   @02,@04
           NC    TESTMASK(2),GVSCPUBM-20(@02)
           CLC   TESTMASK(2),@CB02074
           BNE   @RF00634
INDICATE VOLUME MOUNTED TO ANOTHER HOST.
           L     @04,BFTBLPTR
           LR    @02,INDXBFTB
           MH    @02,@CH02201
           ST    @02,@TF00001
           ALR   @02,@04
           OI    BFMTDOHF-18(@02),B'00100000'
```

```
                BNZ     @RF00654
CALL UNIT PROCESSOR
                LA      @04,STRUNITP
                XC      UNITP(17,@04),UNITP(@04)
                LR      @02,INDXEXTS
                MH      @02,@CH01836
                L       @01,GVSNEPTR
                ALR     @01,@02
                MVC     UNIVOL(6,@04),GVSVOLID-20(@01)
                OI      UNIFMTD(@04),B'10000000'
                ST      @04,@AL00001
                ST      VVIPTR,@AL00001+4
                L       @15,@CV01900
                LA      @01,@AL00001
                BALR    @14,@15
                LTR     REG15,REG15
                BNZ     @RF00661
SET UCB ADDRESS IN WORK AREA AND CHECK UCB.
                LA      @14,STRUNITP
                L       @14,UNIUCBP(,@14)
                ST      @14,UCBADDR
                ST      @14,UCBPTR
CHECK MOUNTING ATTRIBUTES OF VOLUME IN UCB. CHECK IF ONLINE,
PRIVATE RESERVED, PRIVATE REMOVABLE, OR NO ATTRIBUTES.
                TM      UCBONLI(@14),B'10000000'
                BNO     @RF00665
                TM      UCBPRES(@14),B'00000100'
                BNZ     @RF00665
                TM      UCBBFRV(@14),B'00010000'
                BO      @RT00665
                TM      UCBBPRV(@14),B'00011100'
                BNZ     @RF00665
                TM      UCBRESV(@14),B'00100000'
                BZ      @RT00665
IF ABOVE CONDITIONS ARE NOT MET, VOLUME IS INELIGIBLE.
        @RF00665 MVC    INTERCC(2),@CB02076
        @RT00665 DS     0H
        @RF00661 DS     0H
IF VOLUME IS STILL ELIGIBLE, IT WILL BE AN ENTRY IN THE BEST
FIT TABLE, SO FILL IN THE REMAINING FIELDS IN THE TABLE THAT
ARE KNOWN AT THIS TIME.
        @RF00654 CLC    INTERCC(2),@CB02074
                BNE     @RF00671
                L       @04,BFTBLPTR
                LR      @02,INDXBFTB
                MH      @02,@CH02201
                ST      @02,@TF00001
                ALR     @02,@04
                L       @15,GVSNEPTR
                LR      @14,INDXEXTS
                MH      @14,@CH01836
                ALR     @14,@15
                MVC     BFVOLID-18(6,@02),GVSVOLID-20(@14)
                SLR     @02,@02
                IC      @02,GVSNO(,@15)
                L       @01,@TF00001
                STC     @02,BFGRPIDX-18(@01,@04)
                L       @02,@TF00001
                STC     INDXEXTS,BFGRPSLT-18(@02,@04)
                BR      @14
                B       @EL00005
```

```
***************************************************************
TABLE 6 - PROCEDURE NAME: EXPIRCK
FUNCTION - DETERMINES IF VOLUME IS IN A RETENTION GROUP
AND IF IT IS, DETERMINES IF VOLUME EXPIRES BEFORE THE DATA
SET. IF VOLUME IN A RETENTION GROUP HAS A NULL EXPIRATION
DATE, A ROUTINE IS CALLED TO CALCULATE A DEFAULT, WHICH IS
THEN USED TO MAKE THE COMPARISON. IF NO EXPIRATION DATE WAS
SPECIFIED ON THE DD, A DEFAULT OF TODAYS DATE IS USED FOR
THE DATA SET EXPIRATION. IF THE DATA SET EXPIRED AFTER THE
VOLUME, THE VOLUME IS INELIGIBLE FOR THIS REQUEST.
INPUT - THE VOLUME EXPIRATION DATE IN THE EXTENSION RECORD,
THE GROUP RECORD, THE INDEX VALUES INTO EXTENSION SLOT AND
THE BEST FIT TABLE, THE VOLUME DEFAULT EXPIRATION DATE FOR
GROUP IF CALCULATED BEFORE IN THE INTERNAL WORK AREA, TODAYS
DATE IN THE CVT, AND THE DATA SET EXPIRATION DATE IN JFCB.
OUTPUT - THE VOLUME EXPIRATION DATE IN THE BEST FIT TABLE IF
THE VOLUME IS ELIGIBLE, PLUS A ZERO INTERNAL RETURN CODE. A
FOUR INTERNAL RETURN CODE IF THE VOLUME IS NOT ELIGIBLE.
      EXPIRCK  ST    @14,@SA00006
DETERMINE IF VOLUME IS IN A RETENTION GROUP. IF NOT,SET NULL
EXPIRATION DATE IN THE BEST FIT TABLE AND EXIT PROGRAM.
               L     @04,GROUPPTR
               TM    GRORETN(@04),B'00000100'
               BNZ   @RF00680
               LR    @04,INDXBFTB
               MH    @04,@CH02201
               L     @02,BFTBLPTR
               ALR   @02,@04
               MVC   BFVOLEXP-18(4,@02),NULEXPDT
               B     @RC00680
      @RF00680 DS    0H
EXPIRATION DATE FROM JFCB IF IT IS NOT ZERO, OTHERWISE SET
DEFAULT FROM CVT.
      @RF00683 L     @04,JFCBPTR(,SELTMPTR)
               ICM   @02,7,JFCBDATE(@04)
               BNZ   @RF00685
               L     @04,CVTPTR
               MVC   EXPCVT(4),CVTDATE(@04)
DETERMINE IF VOLUME EXPIRES TOO SOON FOR THIS REQUEST.
      @RC00685 LR    @04,INDXEXTS
               MH    @04,@CH01836
               L     @02,GVSNEPTR
               ALR   @02,@04
               CLC   GVSEXPDT-20(4,@02),NULEXPDT
               BNE   @RF00697
NULL DATE IN EXTENSION RECORD, BOTH DEFAULTS ARE TAKEN AND
THE VOLUME MUST BE OK.
               L     @04,JFCBPTR(,SELTMPTR)
               ICM   @02,7,JFCBDATE(@04)
               BNZ   @RF00699
               LR    @04,INDXBFTB
               MH    @04,@CH02201
               L     @02,BFTBLPTR
               ALR   @02,@04
               MVC   BFVOLEXP-18(4,@02),EXPIRDT
DATE IN JFCB
               B     @RC00699
      @RF00699 CLC   EXPIRDT(4),EXPJFCB
               BNL   @RF00701
               MVC   INTERCC(2),@CB02076
               B     @RC00701
      @RF00701 LR    @04,INDXBFTB
               MH    @04,@CH02201
```

```
                    L       @02,BFTBLPTR
                    ALR     @02,@04
                    MVC     BFVOLEXP-18(4,@02),EXPIRDT
EXPIRATION DATE IS NOT NULL IN EXTENSION RECORD.
                    B       @RC00697
        @RF00697 DS         OH
IF NO DATE IN JFCB, USE DEFAULT.
                    L       @04,JFCBPTR(,SELTMPTR)
                    ICM     @02,7,JFDCBDATE(@04)
                    BNZ     @RF00706
                    LR      @04,INDXEXTS
                    MH      @04,@CH01836
                    L       @02,GVSNEPTR
                    ALR     @02,@04
                    CLC     GVSEXPDT-20(4,@02),EXPCVT
                    BNL     @RF00707
                    MVC     INTERCC(2),@CB02076
                    B       @RC00707
        @RF00707 LR         @04,INDXBFTB
                    MH      @04,@CH02201
                    L       @02,BFTBLPTR
                    ALR     @02,@04
                    LR      @04,INDXEXTS
                    MH      @04,@CH01836
                    L       @01,GVSNEPTR
                    ALR     @01,@04
                    MVC     BFVOLEXP-18(4,@02),GVSEXPDT-20(@01)
COMPARE EXTENSION AND JFCB DATES
                    B       @RC00706
        @RF00706 LR         @04,INDXEXTS
                    MH      @04,@CH01836
                    L       @02,GVSNEPTR
                    ALR     @02,@04
                    CLC     GVSEXPDT-20(4,@02),EXPJFCB
                    BNL     @RF00710
                    MVC     INTERCC(2),@CB02076
                    B       @RC00710
        @RF00710 LR         @04,INDXBFTB
                    MH      @04,@CH02201
                    L       @02,BFTBLPTR
                    ALR     @02,@04
                    LR      @04,INDXEXTS
                    MH      @04,@CH01836
                    L       @01,GVSNEPTR
                    ALR     @01,@04
                    MVC     BFVOLEXP-18(4,@02),GVSEXPDT-20(@01)
                    BP      @14
                    B       @EL00006
***********************************************************
TABLE 7 - PROCEDURE NAME: SPACONV
FUNCTION - THE SPACE IN CYLINDERS IS PLACED IN THE INTERNAL
WORK AREA TO BE USED IN LATER PROCESSING.
INPUT - THE NUMBER OF VOLUMES BEING SELECTED FOR REQUEST.
THIS VALUE WILL ALWAYS BE ONE IF CONVERTING SPACE FOR A
VOLREF REQUEST, THE JFCB AND GROUP RECORD.
OUTPUT - SPACE IS IN THE JFCB, PRIMARY IS PLACED IN INTERNAL
WORK AREA. IF MORE THAN ONE VOLUME IS TO BE SELECTED THE
SECONDARY SPACE IS PLACED IN THE INTERNAL WORK AREA.
        SPACONV  ST         @14,12(,@13)
        @RF00753 DS         OH
SPACE ALLOCATED IN CYLINDERS, COPY TO INTERNAL PARAMETER.
                    MVC     PRICYL(2),PQTY+1(@04)
```

IF MULTI-VOLUME REQUEST, SET SECONDARY SPACE IN CYLINDERS.
```
          CLI     NUMBVOL,1
          BNH     @RF00757
          MVC     SECCYL(2),SQTY+1(004)
          BR      @14
          B       @EL00008
```
****************************************************************

TABLE 8 - PROCEDURE NAME: SPACECK
FUNCTION - DETERMINES IF THERE IS ENOUGH SPACE ON VOLUME FOR THE PRIMARY SPACE REQUIRED WITHOUT USING ANY RESERVED SPACE. IF THE REQUEST IS MULTI-VOLUME, THE ROUTINE DETERMINES IF ENOUGH SPACE FOR ONE SECONDARY EXTENT NOT TAKING INTO ACCOUNT ANY RESERVED SPACE.
INPUT - PRIMARY AND SECONDARY SPACE REQUIRED BY THE REQUEST AND COUNT FIELD TO DETERMINE IF IT IS A MULTI-VOLUME REQUEST OR NOT. AVAILABLE SPACE FROM EXTENSION RECORD. PERCENT RESERVED SPACE FROM THE GROUP RECORD. ALSO INDEXES INTO THE EXTENSION RECORD AND THE BEST FIT TABLE.
OUTPUT - A 4 RETURN CODE IN INTERNAL WORK AREA IF VOLUME IS NOT ELIGIBLE FOR PRIMARY VOLUME AND IF MULTI-VOLUME IS NOT ELIGIBLE FOR SECONDARY. TURNS ON INDICATORS IN BEST FIT TABLE IF VOLUME IS ELIGIBLE.
```
          SPACECK  ST     @14,12(,@13)
                   MVC    INTERCC(2),@CB02074
```
DETERMINE ROUNDING FACTOR FOR RESERVED SPACE
```
                   L      @04,GROUPPTR
                   SLR    @01,@01
                   IC     @01,GRORESSP(,@04)
                   M      @00,@CF01989
                   D      @00,@CF01991
                   LTR    @00,@00
                   BNP    @RF00848
                   LA     ROUND,1
                   B      @RC00848
          @RF00848 SLR    ROUND,ROUND
```
CALCULATE RESERVED SPACE.
```
          @RC00848 L      @01,GROUPPTR
                   SLR    @15,@15
                   IC     @15,GRORESSP(,@01)
                   M      @14,@CF01989
                   D      @14,@CF01991
                   ALR    @15,ROUND
                   LR     RESERSPA,@15
```
DETERMINE IF THIS, PLUS PRIMARY SPACE REQUEST IS MORE THAN THE AVAILABLE FREE SPACE.
```
                   AH     RESERSPA,PRICYL
```
DETERMINE IF RESERVE SPACE WOULD BE USED IF VOLUME WAS USED.
```
                   LR     @02,INDXEXTS
                   MH     @02,@CH01836
                   L      @01,GVSNEPTR
                   CH     RESERSPA,GVSMTDSP-20(@02,@01)
                   BNH    @RF00853
```
FAIL THIS VOLUME FOR PRIMARY BECAUSE NOT ENOUGH SPACE.
DETERMINE IF VOLUME NEEDS CHECK FOR SECONDARY SPACE.
```
                   CLI    NUMBVOL,1
                   BNE    @RF00855
                   MVC    INTERCC(2),@CB02076
                   B      @RC00855
          @RF00855 LR     @04,INDXBFTB
                   MH     @04,@CH02201
                   L      @02,BFTBLPTR
                   ALR    @02,@04
                   OI     BFBADPRI-18(@02),B'10000000'
```

```
    @RC00855 DS    0H
IF SELECTING FOR PRIMARY ONLY, DO NOT PROCESS FOR SECONDARY.
    @RF00853 CLI   NUMBVOL,1
             BNH   @RF00859
IF NOT ENOUGH SPACE FOR SECONDARY EXTENT, TURN ON INDICATOR.
             LR    @04,INDXEXTS
             MH    @04,@CH01836
             LH    @02,SECCYL
             L     @01,GVSNEPTR
             CH    @02,GVSMTDSP-20(@04,@01)
             BNH   @RF00861
             LR    @04,INDXBFTB
             MH    @04,@CH02201
             L     @02,BFTBLPTR
             ALR   @02,@04
             OI    BFBADSEC-18(@02),B'01000000'
IF VOLUME IS NOT ELIGIBLE, SET BAD RETURN CODE.
    @RF00861 LR    @04,INDXBFTB
             MH    @04,@CH02201
             L     @02,BFTBLPTR
             ALR   @02,@04
             TM    BFBADPRI-18(@02),B'11000000'
             BNO   @RF00863
             MVC   INTERCC(2),@CB02076
             BR    @14
             B     @EL00009
***********************************************************
TABLE 9 - PROCEDURE NAME: VOLSEPCK
FUNCTION - DETERMINE IF VOLUME SHOULD BE EXCLUDED FROM
SELECTION BECAUSE REQUEST REQUIRES DATA SEPARATION.
INPUT - SELECT REQUEST BLOCK, INDEX INTO EXTENSION RECORD TO
GET VOLID PRESENTLY WORKING ON.
OUTPUT - ZERO RETURN CODE IF VOLUME IS ELIGIBLE, FOUR RETURN
CODE IF SEPARATION REQUIREMENTS ELIMINATE VOLUME.
    VOLSEPCK ST    @14,@SA00010
INITIALIZE LOOP CONTROL SWITCH.
             NI    SEPEXIT,B'01111111'
SET UP PARAMETER LIST TO CALL STEP TABLE PROCESSOR.
SINCE VOL SEP SPECIFIED, CALL TABLE PROCESSOR TO SEE IF
VOLUME IS EXCLUDED FROM SELECTION, UNLESS TABLE PROCESSOR
HAS ALREADY BEEN CALLED FOR A PREVIOUS VOLUME IN REQUEST.
             L     @04,DSPDDADR
             LTR   @04,@04
             BNZ   @RF00871
INITIALIZE PROCESSOR PARAMETER. CALL TABLE PROCESSOR FOR
ADDRESS OF DD ENTRY.
             LA    @04,STRTABP
             XC    TABP(12,@04),TABP(@04)
             OI    TABFSRCD(@04),B'01000000'
             L     @02,SELJOBID(,SELTMPTR)
             ST    @02,TABJOBID(,@04)
             LH    @02,SELRFDDN(,SELTMPTR)
             STH   @02,TABDDNUM(,@04)
             ST    @04,@AL00001
             L     @15,@CV01901
             LA    @01,@AL00001
             BALR  @14,@15
CHECK RETURN CODE FROM TABLE PROCESSOR.
             LA    @14,STRTABP
             L     @14,TABDDRET(,@14)
             ST    @14,DSPDDADR
             B     @RC00879
    @RC00879 DS    0H
```

LOOP THRU VOLUMES IN STEP TABLE ENTRY.
```
           LR    INDXDDVL,@04
           B     @DE00885
@DL00885   TM    SEPEXIT,B'10000000'
           BNZ   @DC00885
```
IF MATCH FOUND, GET OUT OF LOOP AND SET RETURN INDICATING
VOLUME IS NOT ELIGIBLE FOR SELECTION.
```
           LR    @04,INDXEXTS
           MH    @04,@CH01836
           LR    @15,INDXDDVL
           MH    @15,@CH00214
           L     @01,GVSNEPTR
           ALR   @01,@04
           L     @04,DSPDDADR
           ALR   @04,@15
           CLC   GVSVOLID-20(6,@01),STPDDVOL-6(@04,
           BNE   @RF00886
           MVC   INTERCC(2),UCB02076
           OI    SEPEXIT,B'10000000'
@RF00886   AL    INDXDDVL,@CF00043
@JE00885   L     @04,DSPDDADR
           SLR   @15,@15
           IC    @15,STPDDNVL(,@04)
           CR    INDXDDVL,@15
           BNH   @DL00885
@JC00885   DS    0H
           BR    @14
           B     @EL00010
```
*************************************************************

TABLE 10 - PROCEDURE NAME: WAITCK
FUNCTION - DETERMINES IF A VOLUME WOULD CAUSE STEP TO WAIT
IF IT WERE SELECTED FOR THE REQUEST. ROUTINE GETS CALLED ONLY
IF MSVI RECORDS INDICATE VOLUME IS MOUNTED TO THIS HOST.
INPUT - UCB ADDRESS IF AVAILABLE, UCB IF ACCESSABLE, UCB
ADDRESS OF REQUEST IF SPECIFIC UNIT SPECIFIED ON REQUEST,
BFNSHRFL FLAG IN BEST FIT TABLE TO INDICATE REQUEST IS FOR
SHARED OR EXCLUSIVE USE AND ALSO THE DEVICE TYPE FOR THIS
REQUEST IF A SPECIFIC UNIT WAS NOT SPECIFIED.
OUTPUT - RETURNS WITH WAIT FLAG SET ON OR LEFT OFF.
```
           WAITCK ST    @14,@SA00011
                  NI    WAITEXIT,B'11111110'
```
DETERMINE IF UCB LOCATED FOR VOLUME UNDER CONSIDERATION, AND
IF NO UCB ADDRESS, MARK AS A WAIT VOLUME SINCE IT IS
ASSUMED THAT THE VOLUME IS IN THE PROCESS OF BEING MOUNTED.
```
           L     @04,UCBADDR
           LTR   @04,@04
           BNZ   @RF00896
           LR    @04,INDXBFTB
           MH    @04,@CH02201
           L     @02,BFTBLPTR
           ALR   @02,@04
           OI    BFWAITFL-18(@02),B'01000000'
```
IF VOLUME IS NOT ALREADY MARKED AS A WAIT VOLUME, CHECK UCB
SHAREABILITY AND EXCLUSIVE REQUEST STATUS. IF UCB IS NON-
SHARABLE OR REQUEST IS FOR EXCLUSIVE USE, TURN ON WAIT FLAG.
```
@RF00896   L     @04,BFTBLPTR
           LR    @02,INDXBFTB
           MH    @02,@CH02201
           ALR   @02,@04
           TM    BFWAITFL-18(@02),B'01000000'
           BNZ   @RF00898
           L     @02,UCBPTR
           CLI   UCBUSER(@02),0
```

```
              BE      @RF00899
              TM      UCBBSVL(@02),B'10000000'
              BO      @RT00899
              TM      BFNSHRFL(@04),B'10000000'
              BNO     @RF00899
@FT00899 DS   0H
              LR      @04,INDXBFTB
              MH      @04,@CH02201
              L       @02,BFTBLPTR
              ALR     @02,@04
              OI      BFWAITFL-18(@02),B'01000000'
```
IF VOLUME IS NOT YET MARKED AS A WAIT VOLUME AND THE REQUEST SPECIFIED A SPECIFIC UNIT ADDRESS, CHECK CURRENT LOCATION.
```
@RF00899 DS   0H
@RF00898 L    @04,BFTBLPTR
              LR      @02,INDXBFTB
              MH      @02,@CH02201
              ST      @02,@TF00001
              ALR     @02,@04
              TM      BFWAITFL-18(@02),B'01000000'
              BNZ     @RF00901
              L       @02,SELUCBAD(,SELTMPTR)
              LTR     @02,@02
              BZ      @RF00901
```
IF VOLUME IS NOT CURRENTLY MOUNTED ON THE UNIT REQUESTED, IT IS A WAIT VOLUME.
```
              C       @02,UCBADDR
              BE      @RF00902
              AL      @04,@TF00001
              OI      BFWAITFL-18(@04),B'01000000'
```
IF IT IS ON REQUESTED UNIT, INDICATE NO MORE CHECKS NECESSARY.
```
              B       @RC00902
@RF00902 OI   WAITEXIT,B'00000001'
```
IF VOLUME IS NOT MARKED WAIT AND REMAINING CHECKS ARE REQUIRED, CHECK IF AN ESOTERIC OTHER THAN '3330V' WAS SPECIFIED.
```
@RC00902 DS   0H
@RF00901 LR   @04,INDXBFTB
              MH      @04,@CH02201
              L       @02,BFTBLPTR
              ALR     @02,@04
              TM      BFWAITFL-18(@02),B'01000000'
              BNZ     @RF00905
              TM      WAITEXIT,B'00000001'
              BNZ     @RF00905
```
CHECK DEVICE TYPE OF REQUEST.
```
              CLC     SELDEVTP(4,SELTMPTR),DEV3330V
              BE      @RF00906
```
IF '3330V' DEVICE TYPE WAS NOT SPECIFIED, SET UP PARAMETER TO CALL UNIT PROCESSOR TO DETERMINE IF THE UNIT VOLUME IS MOUNTED ON FALLS WITHIN ESOTERIC SPECIFIED
```
              LA      @04,STRUNITP
              XC      UNITP(17,@04),UNITP(@04)
              MVC     UNIDEVTP(4,@04),SELDEVTP(SELTMPTR)
              L       @02,UCBADDR
              ST      @02,UNIUCBP(,@04)
              OI      UNIFINJL(@04),B'01000000'
              ST      @04,@AL00001
              ST      VVIPTR,@AL00001+4
              L       @15,@CV01900
              LA      @01,@AL9C001
              BALR    @14,@15
```

CHECK RETURN FROM UNIT PROCESSOR AND IF NOT ZERO, VOLUME
IS A WAIT BECAUSE UNIT DID NOT FALL WITHIN ESOTERIC.
```
             LTR    REG15,REG15
             BZ     @RF00914
             LR     @14,INDXBFTB
             MH     @14,@CH02201
             L      @04,BFTBLPTR
             ALR    @04,@14
             OI     BFWAITFL-18(@04),B'01000000'
@RF00914 DS  OH
@RF00906 DS  OH
             BR     @14
```
************* '**************************************
TABLE 11 - PROCEDURE NAME: CONUSER
FUNCTION - ROUTINE GETS THE CONCURRENT USERS FROM THE UCB IF
THE UNIT PROCESSOR LOCATED A UCB FOR THE VOLUME. IF UCB WAS
NOT LOCATED, SINCE VOLUME IS INDICATED AS BEING MOUNTED BY
THE MSVI RECORDS, ONE CONCURRENT USER IS ASSUMED.
INPUT - ROUTINE ONLY GETS CALLED IF MSVI RECORDS INDICATE
VOLUME IS MOUNTED TO THIS HOST. IT USES THE UCB ADDRESS IN
INTERNAL WORK AREA IF UCB EXISTS. IT THEN USES THE UCBUSER
FIELD IN THE UCB TO RETRIEVE CONCURRENT USERS. ALSO NEEDS
CURRENT INDEX INTO THE BEST FIT TABLE.
OUTPUT - PUTS CONCURRENT USERS INTO THE BEST FIT TABLE FOR
VOLUME CURRENTLY BEING PROCESSED.
```
     CONUSER ST     @14,12(,@13)
```
IF THE UCB FOR THIS VOLUME COULD NOT BE LOCATED, ASSUME ONE
USER AND EXIT THIS PROCEDURE.
```
             L      @04,UCBADDR
             LTR    @04,@04
             BNZ    @RF00922
             LR     @04,INDXBFTB
             MH     @04,@CH02201
             LA     @02,1
             L      @01,BFTBLPTR
             STC    @02,BFCONUSE-18(@04,@01)
```
OTHERWISE TAKE USER COUNT FROM UCB FOR THE NUMBER OF USERS.
```
             B      @RC00922
@RF00922     LR     @04,INDXBFTB
             MH     @04,@CH02201
             L      @02,UCBPTR
             SLR    @15,@15
             IC     @15,UCBUSER(,@02)
             L      @02,BFTBLPTR
             STC    @15,BFCONUSE-18(@04,@02)
             BR     @14
             B      @EL00012
```
*********************************************************
TABLE 12 - PROCEDURE NAME: FINSELCT
FUNCTION - USES THE BEST FIT TABLE ENTRIES AND CALLS SORT
ROUTINE TO SORT THE VOLUMES IN ORDER FROM BEST FIT TO WORST
FIT. THIS IS ACCOMPLISHED BY SORTING ON FIELDS AND FLAGS
REPRESENTING THE CURRENT STATUS OF THE VOLUME.
INPUT - BEST FIT TABLE WITH ALL ELIGIBLE VOLUMES IN IT AND
EACH ENTRY COMPLETED. SELECT REQUEST. NUMBER OF VOLUMES
TO BE SELECTED FOR THIS REQUEST.
OUTPUT - SELECTED VOLUMES IN THE VOLUME RETURN AREA OF RPLV
OR IF THE REQUESTED NUMBER OF VOLUMES COULD NOT BE SELECTED,
MESSAGE WILL BE ISSUED ALONG WITH A REASON CODE AND A RETURN
CODE IF REQUEST WAS SUCCESSFUL. ZERO REASON AND RETURN CODE
WILL BE RETURNED IN THE RPLV.
```
     FINSELCT ST    @14,@SA00013
```
IF REQUEST CANNOT WAIT FOR THE SELECTED VOLUME, ELIMINATE

VOLUMES IN THE BEST FIT TABLE THAT ARE ALREADY WAIT VOLUMES.
```
            TM      SELCNTWT(SELTMPTR),B'00001000'
            BNO     @RF00930
            LA      INDXBFTB,1
            B       @DE00931
    @DL00931 DS     0H
            L       @04,BFTBLPTR
            LR      @15,INDXBFTB
            MH      @15,@CH02201
            ST      @15,@TF00001
            ALR     @15,@04
            TM      BFWAITFL-18(@15),B'01000000'
            BNO     @RF00932
            AL      @04,@TF00001
            OI      BFVOLREJ-18(@04),B'00000100'
    @RF00932 AL     INDXBFTB,@CF00043
    @DE00931 L      @04,BFTBLPTR
            CH      INDXBFTB,BFTOTIDX(,@04)
            BNH     @DL00931
```
CALL SORT ROUTINE TO SORT VOLUMES IN BEST FIT TABLE.
```
    @RF00930 L      @06,BFTBLPTR
            LA      @04,BFSLOT(,@06)
            ST      @04,SRTADDR
            LH      @15,BFTOTIDX(,@06)
            STH     @15,SRTNUM
            MVC     SRTLEN(2),@CH02201
            LA      @15,BFHPFLGS(,@06)
            LCR     @04,@04
            ALR     @04,@15
            STH     @04,SRTBEG
            LA      @06,BFMISCFL(,@06)
            SLR     @06,@15
            STH     @06,SRTFLDLN
            OI      RESORTSW,B'00100000'
            NI      FINEXIT,B'10111111'
```
LOOP THRU BEST FIT TABLE UNTIL THE DESIRED NUMBER OF VOLUMES HAVE BEEN SELECTED.
```
            LR      INDXBFTB,@14
            B       @DE00943
    @JL00943 TM     FINEXIT,B'01000000'
            BNZ     @DC00943
```
DETERMINE IF BEST FIT TABLE MUST BE SORTED
```
            TM      RESORTSW,B'00100000'
            BNO     @RF00944
            BAL     @14,SORT
            NI      RESORTSW,B'11011111'
```
DETERMINE IF VOLUME IS ELIGIBLE FOR PRIMARY OR SECONDARY.
```
    @RF00944 L      @04,BFTBLPTR
            LR      @15,INDXBFTB
            MH      @15,@CH02201
            ST      @15,@TF00001
            ALR     @15,@04
            TM      BFVOLREJ-18(@15),B'00000100'
            BNZ     @RF00949
            CLI     NUMCHOS,0
            BNE     @GL00041
            AL      @04,@TF00001
            TM      BFBADPRI-18(@04),B'10000000'
            BZ      @RT00949
    @GL00041 CLI    NUMCHOS,0
            BNH     @RF00949
            LR      @04,INDXBFTB
            MH      @04,@CH02201
```

```
              L     @01,BFTBLPTR
              ALR   @01,@04
              TM    BFBADSEC-18(@01,B'01010000'
              BNZ   @RF00949
    @RT00949 DS    0H
CALL ROUTINE TO DETERMINE IF VOLUME IS ENQUEUED UNLESS TEST
ENQ HAS ALREADY BEEN DONE ON THIS VOLUME.
              LR    @04,INDXBFTB
              MH    @04,@CH02201
              L     @01,BFTBLPTR
              ALR   @01,@04
              TM    BFNOENQ-18(@01),B'00000011'
              BNZ   @RF00951
              BAL   @14,TESTENQ
CHECK RETURN CODE FROM ENQUEUE ROUTINE.
              CLC   INTERCC(2),@CB02074
              BNE   @RF00954
              LR    @04,INDXBFTB
              MH    @04,@CH02201
              L     @01,BFTBLPTR
              ALR   @01,@04
              OI    BFNOENQ-18(@01),B'00000010'
VOLUME IS ENQUEUED OR NOT ELIGIBLE.
CHECK IF VOLUME IS ENQUEUED.
              B     @RC00954
    @RF00954 CLC   INTERCC(2),@CB02076
              BNE   @RF00956
INDICATE VOLUME IS ENQUEUED.
              L     @04,BFTBLPTR
              LR    @15,INDXBFTB
              MH    @15,@CH02201
              ST    @15,@TF00001
              ALR   @15,@04
              OI    BFENQUED-18(@15),B'00000001'
CHECK TO SEE IF VOLUME IS STILL ELIGIBLE.
              TM    SELCNTWT(SELTMPTR),B'00001000'
              BNO   @RF00959
              AL    @04,@TF00001
              OI    BFVOLREJ-18(@04),B'00000100'
VOLUME IS WAIT VOLUME AND IS STILL ELIGIBLE. CHECK STATUS.
              B     @RC00959
    @RF00959 LR    @04,INDXBFTB
              MH    @04,@CH02201
              L     @01,BFTBLPTR
              ALR   @01,@04
              TM    BFWAITFL-18(@01),B'01000000'
              BNZ   @RF00961
INDICATE BEST FIT TABLE WILL BE RE-SORTED, STATUS CHANGED.
              OI    RESORTSW,B'00100000'
    @RF00961 DS    0H
    @RC00959 LR    @04,INDXBFTB
              MH    @04,@CH02201
              L     @01,BFTBLPTR
              ALR   @01,@04
              OI    BFWAITFL-18(@01),B'01000000'
DETERMINE IF RE-SORTING AND THEREFORE NEED TO START AT TOP.
              TM    RESORTSW,B'00100000'
              BNO   @RF00964
              SLR   INDXBFTB,INDXBFTB
VOLUME IS NOT AVAILABLE FOR USE AT THIS TIME.
              B     @RC00956
    @RF00956 CLC   INTERCC(2),@CB02078
              BNE   @RF00967
```

```
                LR      @04,INDXBFTB
                MH      @04,@CH02201
                L       @01,BFTBLPTR
                ALR     @01,@04
                OI      BFVOLREJ-18(@01),B'00000100'
@RF00967 DS     0H
@RC00956 DS     0H
@RC00954 DS     0H
```
CHECK IF STATUS HAS CHANGED OR IF VOLUME IS STILL ELIGIBLE.
```
@RF00951 C      INDXBFTB,@CF00084
         BNH    @RF00970
        *LR     @04,INDXBFTB
         MH     @04,@CH02201
         L      @01,BFTBLPTR
         ALR    @01,@04
         TM     BFVOLREJ-18(@01),B'00000100'
         BNZ    @RF00971
         TM     RESORTSW,B'00100000'
         BNZ    @RF00971
```
SINCE VOLUME IS STILL ELIGIBLE FOR SELECTION AND ITS STATUS
HAS NOT CHANGED, CALL JES3 INTERFACE ROUTINE TO DETERMINE
IF VOLUME IS OK FOR SELECTION.
```
         BAL    @14,JESINTF
```
CHECK CODE IN RPLV AND IF ZERO, CHECK INTERNAL RETURN CODE.
```
         CLC    RPLVRETC(2,RPLVPTR),@CB02074
         BNE    @RF00974
```
CHECK IF VOLUME HAS APPROVAL OF JES3.
```
         CLC    INTERCC(2),@CB02074
         BNE    @RF00976
```
VOLUME IS APPROVED BY JES3, SELECT IT.
IF VOLUME IS A PRIMARY SELECTION, INDICATE IT.
```
         CLI    NUMCHOS,0
         BNE    @RF00978
         LR     @04,INDXBFTB
         MH     @04,@CH02201
         L      @01,BFTBLPTR
         ALR    @01,@04
         OI     BFSELPRI-18(@01),B'01100000'
         MVI    NUMCHOS,X'01'
```
VOLUME IS A SECONDARY SELECTION.
```
         B      @RC00978
@RF00978 DS     0H
         LR     @04,INDXBFTB
         MH     @04,@CH02201
         L      @01,BFTBLPTR
         ALR    @01,@04
         OI     BFSELSEC-18(@01),B'00010000'
         LA     @04,1
         SLR    @15,@15
         IC     @15,NUMCHOS
         ALR    @04,@15
         STC    @04,NUMCHOS
```
IF ALL VOLUMES SELECTED, EXIT LOOP. IF NOT, CHECK IF PRIMARY
SELECTION. IF PRIMARY SET INDEX SO THAT SEARCH FOR SECONDARY
WILL START AT TOP OF TABLE.
```
@RC00978 CLC    NUMCHOS(1),NUMBVOL
         BNE    @RF00988
         L      @04,SELVLRET(,SELTMPTR)
         SLR    @15,@15
         IC     @15,NUMCHOS
         STH    @15,VOLNUM(,@04)
         OI     FINEXIT,B'01000000'
         B      @RC00988
```

```
@RF00968 LR    @04,INDXBFTB
         MH    @04,@CH02201
         L     @01,BFTBLPTR
         ALR   @01,@04
         TM    BFSELPRI-18(@01),B'00100000'
         BNO   @RF00993
         SLR   INDXBFTB,INDXBFTB
```
VOLUME WAS NOT APPROVED BY JES3.
INDICATE VOLUME REJECTED.
```
         B     @RC00976
@RF00976 LR    @04,INDXBFTB
         MH    @04,@CH02201
         L     @01,BFTBLPTR
         ALR   @01,@04
         OI    BFVOLREJ-18(@01),B'00000100'
         B     @RC00974
@RC00974 DS    0H
@RF00971 DS    0H
@RF00970 DS    0H
@RF00949 AL    INDXBFTB,@CF00043
@DE00943 L     @04,BFTBLPTR
         CH    INDXBFTB,BFTOTIDX(,@04)
         BNH   @DL00943
@DC00943 DS    0H
```
DETERMINE IF ALL REQUESTED VOLUMES WERE SELECTED, AND IF
WERE NOT, ISSUE ERROR MESSAGE.
```
         CLC   RPLVRETC(2,RPLVPTR),@CB02074
         BNE   @RF01002
         CLC   NUMCHUS(1),NUMRVOL
         BNL   @RF01002
```
ISSUE MESSAGE AND SET REASON CODE.
```
         XC    MSGRQ(32),MSGRQ
         ST    RPLVPTR,MSGRPLV
         MVC   MSGID(4),@CF02026
         MVI   MSGLEN1,X'08'
         L     @06,GROUPPTR
         LA    @06,GROVVGRP(,@06)
         STCM  @06,7,MSGTEXT1
         LA    REG1,MSGRQ
         L     @15,@CV01899
         BALR  @14,@15
         MVC   RPLRCODE(2,RPLVPTR),@CB02054
         MVC   RPLVRETC(2,RPLVPTR),@CB02076
         BR    @14
         B     @EL00013
```
*****************************************************
TABLE 13 - PROCEDURE NAME: SORT
FUNCTION - THIS PROCEDURE PROVIDES THE CALLER WITH BASIC
FUNCTION OF SORTING A CONTIGUOUS STORAGE OF ANY LENGTH,
OR ELEMENT (RECORD) SIZE. IT ALLOWS FIELDS TO BE SORTED PER
USER CALL, ANYWHERE WITHIN ELEMENT (RECORD) FOR ANY LENGTH
EQUAL TO OR SMALLER THAN AN ELEMENTS SIZE.
INPUT - ADDRESS OF ARGUMENT LIST (SRTAGL), AND THE BEST FIT
TABLE. ALSO SORT WORK AREA IS PROVIDED.
OUTPUT - A SORTED BEST FIT TABLE. NO RETURN CODE IS SET.
```
  SORT   ST    @14,12(,@13)
```
CALCULATE ENDING POSITION AND INITIALIZE LOOP CONTROL AND
END INDICATOR SWITCHES.
```
         LH    SRTEND,SRTFLDLN
         BCTR  SRTEND,0
         AH    SRTEND,SRTBEG
         NI    SRTSTOP,B'00111111'
```
EXECUTE SORT LOOP USING THE MAXIMUM ELEMENTS MINUS ONE FOR

SRTI COUNTER AND DECREMENTING THE SRTI COUNTER BY ONE EACH
PASS. SRTJ COUNTER IS USED TO COUNT THE ELEMENTS THRU EACH
PASS AND INCREMENT SRTJ COUNTER BY ONE AFTER EACH ELEMENT
IS COMPARED. SRTSTOP SWITCH IS USED TO TERMINATE THE SORT
IF NO INTERCHANGE OF ELEMENTS TAKES PLACE.

```
              LH     SRTI,SRTNUM
              BCTR   SRTI,0
              B      @DE01022
    @DL01022  TM     SRTSTOP,B'10000000'
              BNZ    @DC01022
              LA     SRTJ,1
              B      @DE01023
    @DL01023  DS     0H
```
COMPARE TO SEE IF AN INTERCHANGE SHOULD TAKE PLACE, USING
PASSED SORT FIELDS AS A SUBSTRING. IF SO INTERCHANGE THEM.
```
              L      @15,SRTADDR
              LH     @14,SRTBEG
              LR     @01,SRTJ
              MH     @01,@CH02201
              LR     @00,@01
              ALR    @00,@14
              LCR    @14,@14
              ALR    @14,SRTEND
              ST     @01,@TF00001
              LR     @01,@00
              ALR    @01,@15
              AL     @01,@CF02239
              ST     @14,@TF00002
              LR     @14,@00
              ALR    @14,@15
              AL     @14,@CF02203
              L      @15,@TF00002
              EX     @15,@SC02240
              BNH    @RF01024
              OI     SRTMOVE,B'01000000'
              L      @15,SRTADDR
              LR     @14,@15
              AL     @14,@TF00001
              AL     @14,@CF02242
              MVC    SORTWORK(18),SRTELEM(@14)
              LR     @14,@15
              AL     @14,@TF00001
              AL     @14,@CF02242
              LR     @01,@15
              AL     @01,@TF00001
              MVC    SRTELEM(18,@14),SRTELEM(@01)
              AL     @15,@TF00001
              MVC    SRTELEM(18,@15),SORTWORK
    @RF01024  AL     SRTJ,@CF00043
    @DE01023  CR     SRTJ,SRTI
              BNH    @DL01023
```
IF AN ELEMENT WAS INTERCHANGED TURN SRTMOVE SWITCH OFF. IF
NO INTERCHANGE WAS MADE TURN SORT STOP SWITCH TO ON.
```
              TM     SRTMOVE,B'01000000'
              BNO    @RF01032
              NI     SRTMOVE,B'10111111'
              B      @RC01032
    @RF01032  OI     SRTSTOP,B'10000000'
    @RC01032  BCTR   SRTI,0
    @DE01022  LTR    SRTI,SRTI
              BP     @DL01022
    @DC01022  DS     0H
              BR     @14
```

```
************************************************************
TABLE 14 - PROCEDURE NAME: TESTENQ
FUNCTION - THE ROUTINE DETERMINES IF THE VOLUME IS ENQUEUED
OR NOT FOR TYPE OF USE VOLUME IS NEEDED FOR. THIS CAN BE
EITHER SHARED OR EXCLUSIVE USE. IF THE REQUEST IS FOR SHARE,
TEST ENQ FOR SHARED USE IS ISSUED. IF THE REQUEST IS FOR
EXCLUSIVE CONTROL, TEST ENQ FOR EXCLUSIVE USE IS ISSUED.
INPUT - THE BEST FIT TABLE AND THE INDEX INTO THE BEST FIT
TABLE FOR THE VOLUME BEING PROCESSED.
OUTPUT - A RETURN CODE IN THE INTERNAL RETURN CODE AREA
     0 - VOLUME WILL NOT CAUSE A WAIT IF SELECTED
     4 - VOLUME WOULD CAUSE REQUEST TO WAIT IF SELECTED.
     TESTENQ  ST    @14,@SA00015
SETUP REQUIRED PARAMETERS FOR THE TEST ENQ MACRO
              L     @04,BFTBLPTR
              LR    @15,INDXBFTB
              MH    @15,@CH02201
              ALR   @15,@04
              MVC   TENQVOL(6),BFVOLID-18(@15)
IF REQUEST IS FOR EXCLUSIVE USE, TEST ENQ MUST BE DONE.
              TM    BFNSHRFL(@04),B'10000000'
              BNO   @RF01040
     LENQ1    DS    0H
              CNOP  0,4
              BAL   1,IHB0003
              DC    AL1(192)
              DC    AL1(6)
              DC    BL1'01000111'
              DC    AL1(0)
              DC    A(MAJRNAM)
              DC    A(TENQVOL)
     IHB0003  DS    0H
              SVC   56
CHECK RETURN CODE FROM ENQ.
              LTR   REG15,REG15
              BNZ   @RF01044
              MVC   INTERCC(2),@CB02074
CHECK NON-ZERO RETURN CODE FROM ENQ.
     @RF01044 CLI   ENQRETC(REG15),4
              BNE   @RF01046
              MVC   INTERCC(2),@CB02076
              B     @RC01046
     @RC01046 DS    0H
     @RC01044 DS    0H
REQUEST IS FOR SHARED USE, SO PROCESS ON THAT BASIS.
              B     @RC01040
     @RF01040 DS    0H
DETERMINE IF ISSUING A TEST ENQ IS NECESSARY.
              L     @04,BFTBLPTR
              LR    @15,INDXBFTB
              MH    @15,@CH02201
              ST    @15,@TF00001
              ALR   @15,@04
              TM    BFNOTMTD-18(@15),B'11000000'
              BNZ   @RF01052
              L     @01,@TF00001
              SLR   @00,@00
              IC    @00,BFCONUSE-18(@01,@04)
              C     @00,@CF00084
              BNH   @RF01052
              AL    @04,@TF00001
              TM    BFWAITFL-18(@04),B'01000000'
              BNZ   @RF01052
```

```
                MVC     INTERCC(2),@CB02074
IF ABOVE TEST WAS NOT MET, ISSUE TEST ENC FOR SHARED USE.
                B       @RC01052
    @RF01052 DS  0H
    LENQ2    DS  0H
             ENQ     (MAJRNAM,TENQVOL,S,6,SYSTEM),RET=TEST
             CNOP    0,4
             BAL     1,IHB0004
             DC      AL1(192)
             DC      AL1(6)
             DC      BL1'11000111'
             DC      AL1(0)
             DC.     A(MAJRNAM)
             DC      A(TENQVOL)
    IHB0004  DS      0H
             SVC     56
CHECK RETURN CODE FROM ENQ.
             BNZ     @RF01057
             MVC     INTERCC(2),@CB02074
             B       @RC01057
    @RF01057 CLI     ENQRETC(REG15),4
             BNE     @RF01059
             MVC     INTERCC(2),@CB02076
             B       @RC01059
    @RC01059 DS      0H
    @RC01057 DS      0H
             BR      @14
             B       @EL00015
```
****************************************************
TABLE 15 - PROCEDURE NAME: JESINTF
FUNCTION - THE ROUTINE SETS UP THE REQUIRED INTERFACE THRU SUBSYSTEM INTERFACE TO CONTACT JES3. IT THEN INTERPRETS THE RETURN FROM JES3 AND SUBSYSTEM INTERFACE TO DETERMINE IF THE VOLUME IS ELIGIBLE FOR THIS REQUEST OR NOT.
INPUT - THE ADDRESS OF THE SUBSYSTEM CONTROL BLOCK SSOB. BEST FIT TABLE ALONG WITH THE INDEX INTO THE BEST FIT TABLE OF THE VOLUME CURRENTLY BEING PROCESSED. THE SELECT REQUEST BLOCK. THE ADDRESS OF THE SSOB IS IN VVICB. SSOB CONTAINS THE ADDRESS OF THE SSOBMO.
OUTPUT - A ZERO REASON AND RETURN CODE IN THE RPLV IF JES3 PROCESSED THE REQUEST SUCCESSFULLY. A NON-ZERO REASON AND RETURN IN RPLV IF SUBSYSTEM OR JES3 ERRORS. IF THE REQUEST WAS SUCCESSFULLY PROCESSED, THE INTERNAL RETURN CODE WILL CONTAIN EITHER ZERO IF VOLUME IS ELIGIBLE TO BE SELECTED FOR THIS REQUEST, OR A FOUR IF VOLUME IS NOT A CANDIDATE.

```
    JESINTF  STM     @14,@12,12(@13)
             ST      @13,@SA00016+4
             LA      @14,@SA00016
             ST      @14,8(,@13)
             LR      @13,@14
SET UP PARAMETER LIST FOR THE SUBSYSTEM INTERFACE. START
BY SETTING INDICATOR TELLING IF VOLUME IS MOUNTED OR NOT.
             LR      @04,INDXBFTB
             MH      @04,@CH02201
             L       @01,BFTBLPTR
             ALR     @01,@04
             TM      BFNOTMTD-18(@01),B'10000000'
             BNZ     @RF01068
             L       @04,VVISSOBA(,VVIPTR)
             L       @04,SSOBINDV(,@04)
             OI      SSMOMNTD(@04),B'00001000'
             B       @RC01068
    @RF01068 L       @04,VVISSOBA(,VVIPTR)
```

```
            L     @04,SSOBINDV(,@04)
            NI    SSMOMNTD(@04),B'11110111'
@FC01068    L     @04,VVISSOBA(,VVIPTR)
            L     @15,SSOBINDV(,@04)
            LA    @14,SELJOBNM(,SELTMPTR)
            ST    @14,SSMOPNAM(,@15)
            LA    @14,SELSTNUM(,SELTMPTR)
            ST    @14,SSMOPSTN(,@15)
```
MOVE VOLID CURRENTLY INTO SELECT REQUEST BLOCK SO SUBSYSTEM
INTERFACE HAS ACCESS TO IT.
```
            SLR   @14,@14
            IC    @14,NUMCHOS
            MH    @14,@CH00214
            L     @03,SELVLRET(,SELTMPTR)
            ST    @14,@TF00001
            ALR   @14,@03
            LR    @02,INDXBFTB
            MH    @02,@CH02201
            L     @01,BFTBLPTR
            ALR   @01,@02
            MVC   VOLSER(6,@14),BFVOLID-8(@01)
            L     @02,@TF00001
            LA    @14,VOLSER(@02,@03)
            ST    @14,SSMOPVOL(,@15)
            LA    @14,SELDDNAM(,SELTMPTR)
            ST    @14,SSMOPDDN(,@15)
            LA    @14,SELDDCAT(,SELTMPTR)
            ST    @14,SSMOPRPN(,@15)
```
ISSUE MACRO TO INVOKE SUBSYSTEM INTERFACE
PASS CONTROL TO JOB ENTRY SUBSYSTEM TO PROCESS REQUEST
INPUT - REGISTER 1 POINTS TO ONE-WORD PARAMETER LIST WHICH
POINTS TO THE SSOB.
```
            ST    @04,@AL00001
            MVI   @AL00001,X'80'
            L     @04,CVTPTR
            L     @04,CVTJESCT(,@04)
            L     @15,JESSSREQ(,@04)
            LA    @01,@AL00001
            BALR  @14,@15
```
CHECK ON RETURN CODE FROM SUBSYSTEM INTERFACE AND JES3.
```
            SLR   @14,@14
            CR    REG15,@14
            BNE   @RF01080
```
CHECK RETURN CODE IN SSOB. IF ZERO, VOLUME OK TO SELECT.
```
            L     @04,VVISSOBA(,VVIPTR)
            C     @14,SSOBRETN(,@04)
            BNE   @RF01082
            MVC   INTERCC(2),@CB02074
```
IF FOUR RETURN, VOLUME IS BUSY AND THEREFORE NOT ELIGIBLE.
```
            B     @RC01082
@RF01082    L     @14,VVISSOBA(,VVIPTR)
            CLC   SSOBRETN(4,@14),@CF00064
            BNE   @RF01084
```
ISSUE MESSAGE AND SET INTERNAL RETURN CODE.
```
            XC    MSGRQ(32),MSGRQ
            ST    RPLVPTR,MSGRPLV
            MVC   MSGID(4),@CF02034
            MVI   MSGLEN1,X'06'
            LR    @14,INDXBFTB
            MH    @14,@CH02201
            L     @04,BFTBLPTR
            LA    @14,BFVOLID-18(@14,@04)
            STCM  @14,7,MSGTEXT1
```

```
            LA      REG1,MSGRQ
            L       @15,@CV01899
            BALR    @14,@15
            MVC     INTERCC(2),@CB02076
            B       @RC01080
@RF01080 DS  OH
            C       REG15,@CF00064
            BE      @RT01103
            C       *REG15,@CF00040
            BE      @RT01103
            C       REG15,@CF00032
            BNE     @RF01103
@RT01103 DS  OH
```
SUBSYSTEM IS NOT UP, NOT SUPPORTED OR DOES NOT EXIST.
```
            MVC     INTERCC(2),@CB02074
            B       @EL00016
```
**************************************************

TABLE 16 - PROCEDURE NAME: UPDTMSVI
FUNCTION - READS THE EXTENSION RECORDS AND UPDATES AVAILABLE
RUNNING SPACE. ALSO UPDATES THE EXPIRATION DATE IN BOTH THE
BASE VOLUME AND EXTENSION RECORDS IF IT WAS MODIFIED.
INPUT - THE BEST FIT TABLE, THE GROUP RECORD, THE GROUP
EXTENSION RECORDS, THE NUMBER OF VOLUMES SELECTED FOR THIS
REQUEST AND THE AMOUNT OF PRIMARY SPACE ALLOCATED FOR THIS
REQUEST IN CYLINDERS.
OUTPUT - GROUP EXTENSION RECORD UPDATED WITH NEW SPACE
FOR PRIMARY VOLUME, PLUS EXPIRATION DATE UPDATED FOR VOLUME
CHOSEN WITH A NULL EXPIRATION DATE IF IN A RETENTION
GROUP. BASE VOLUME RECORDS EXPIRATION DATE IS UPDATED IF IT
CHANGED. ALSO, IT INITIALIZES FIELD IN INTERNAL PARAMETER
LIST WITH INDEX INTO THE BEST FIT TABLE, OF THE VOLUME
SELECTED FOR PRIMARY.
```
       UPDTMSVI ST   @14,@SA00017
```
SET SWITCHES CONTROLLING INITIAL I/O FOR EXTENSION RECORD.
```
            OI      BASEREAD,B'01000000'
            NI      UPDTGVSN,B'01100111'
```
DETERMINE IF BEST FIT TABLE NEEDS TO BE SORTED BY EXTENSION
INDEX FOR EFFICIENCY OF I/O OPERATION.
```
            CLI     NUMBVOL,2
            BNH     @RF01128
            L       @06,GROUPPTR
            TM      GRORETN(@06),B'00000100'
            BNO     @RF01128
```
SET UP PARAMETER LIST TO CALL SORT ROUTINE.
```
            L       @06,BFTBLPTR
            LA      @04,BFSLOT(,@06)
            ST      @04,SRTADDR
            LH      @15,BFTOTIDX(,@06)
            STH     @15,SRTNUM
            MVC     SRTLEN(2),@CH02201
            LA      @06,BFGRPIDX(,@06)
            SLR     @06,@04
            STH     @06,SRTBEG
            STH     @04,SRTFLDLN
```
CALL SORT PROCEDURE.
```
            BAL     @14,SORT
```
LOOP THRU BEST FIT TABLE UPDATING RECORDS. START AT
BOTTOM SINCE THAT GVSNE IS THE MOST LIKELY TO BE IN CORE.
```
@RF01128 L   @04,BFTBLPTR
            LH      INDXBFTB,BFTOTIDX(,@04)
            B       @DE01138
@DL01138 TM  EXITSW,B'00010000'
            BNZ     @DC01138
```

LOOK FOR VOLUME SELECTED FOR EITHER PRIMARY OR SECONDARY
ALLOCATION AND DETERMINE IF ANY UPDATES COULD BE NECESSARY.

```
            L      @04,BFTBLPTR
            LR     @15,INDXBFTB
            MH     @15,@CH02201
            ST     @15,@TF00001
            ALR    @15,@04
            TM     BFSELPR1-18(@15),B'0C100000'
            BO     @RT01139
            AL     @04,@TF00001
            TM     BFSELSEC-18(@04),B'0C010000'
            BNO    @RF01139
            L      @04,GROUPPTR
            TM     GRORETN(@04),B'00000100'
            BNO    @RF01139
@RT01139    DS     0H
```
CHECK TO SEE IF GVSNE ALREADY IN BUFFER AREA. IF NOT, WRITE
OLD RECORD IF NECESSARY AND READ GROUP EXTENSION RECORD.
```
            L      @04,GVSNEPTR
            LR     @15,INDXBFTB
            MH     @15,@CH02201
            SLR    @14,@14
            IC     @14,GVSNO(,@04)
            L      @01,BFTBLPTR
            SLR    @00,@00
            IC     @00,BFGRPIDX-18(@15,@01)
            CR     @14,@00
            BE     @RF01141
```
DETERMINE IF OLD GVSNE MUST BE WRITTEN TO THE MSVI.
```
            TM     UPDTGVSN,B'10000000'
            BNO    @RF01143
```
CHECK IF RECORD MUST BE RE-READ FOR UPDATE BEFORE WRITTEN.
```
            TM     BASEREAD,B'01000000'
            BNO    @RF01145
```
READ EXTENSION RECORD CURRENTLY IN STORAGE FOR UPDATE.
```
            MVC    GKEY(13),GVSNAME(@04)
            LA     @04,GKEY
            ST     @04,RPLVKEY(,RPLVPTR)
            LA     @04,DUMMYBUF
            ST     @04,RPLVBUF(,RPLVPTR)
            MVC    RPLVBLN(4,RPLVPTR),@CF02200
            OI     RPLVDIR(RPLVPTR),B'01000000'
            MVI    RPLVTYP(RPLVPTR),X'00'
            OI     RPLVUPD(RPLVPTR),B'00000010'
            LR     REG1,RPLVPTR
            L      @15,@CV01897
            BALR   @14,@15
```
WRITE EXTENSION RECORD NOW IN BUFFER.
```
@RF01145    LA     @04,STORGPEX
            ST     @04,RPLVBUF(,RPLVPTR)
            MVI    RPLVTYP(RPLVPTR),X'01'
            LR     REG1,RPLVPTR
            L      @15,@CV01897
            BALR   @14,@15
            MVC    RPLVRETC(2,RPLVPTR),@CB02074
            MVC    RPLRCODE(2,RPLVPTR),@CB02074
            NI     UPDTGVSN,B'01111111'
```
READ THE NEW EXTENSION RECORD FOR UPDATE.
```
@RF01143    LR     @04,INDXBFTB
            MH     @04,@CH02201
            L      @01,BFTBLPTR
            SLR    @00,@00
            IC     @00,BFGPPIDX-18(@04,@01)
```

```
            STC    @00,GIDKY
            LA     @04,GKEY
            ST     @04,RPLVKEY(,RPLVPTR)
            LA     @04,STORGPEX
            ST     @04,RPLVBUF(,RPLVPTR)
            MVC    RPLVBLN(4,RPLVPTR),@CF02200
            OI     RPLVDIR(RPLVPTR),B'01000000'
            MVI    RPLVTYP(RPLVPTR),X'00'
            OI     RPLVUPD(RPLVPTR),B'00000010'
            LR     REG1,RPLVPTR
            L      @15,@CV01897
            BALR   @14,@15
            MVC    RPLVRETC(2,RPLVPTR),@CB02074
            MVC    RPLRCODE(2,RPLVPTR),@CB02074
            NI     BASEREAD,B'10111111'
PROPER EXTENSION RECORD IS NOW IN BUFFER AND CAN THEREFORE
BE UPDATED AS NECESSARY. IF THE VOLUME IS A PRIMARY, UPDATE.
     RF01141 L     @04,BFTBLPTR
            LR     @15,INDXBFTB
            MH     @15,@CH02201
            ST     @15,@TF00001
            ALR    @15,@04
            TM     BFSELPRI-18(@15),B'00100000'
            BNO    @RF01184
            L      @15,GVSNEPTR
            L      @01,@TF00001
            SLR    @14,@14
            IC     @14,BFGRPSLT-18(@01,@04)
            MH     @14,@CH01836
            LH     @04,GVSMTDSP-20(@14,@15)
            SH     @04,PRICYL
            STH    @04,GVSMTDSP-20(@14,@15)
SET INDEX INTO BEST FIT TABLE FOR PRIMARY VOLUME.
     @RF01187 STC  INDXBFTB,PRIBFIDX
INDICATE EXTENSION RECORD UPDATED.
            OI     UPDTGVSN,B'10000000'
CHECK IF GROUP RETENTION APPLIES, UPDATE EXPIRATION DATE.
     @RF01184 L    @04,GROUPPTR
            TM     GRORETN(@04),B'00000100'
            BNO    @RF01192
            L      @04,GVSNEPTR
            L      @15,BFTBLPTR
            LR     @14,INDXBFTB
            MH     @14,@CH02201
            SLR    @03,@03
            IC     @03,BFGRPSLT-18(@14,@15)
            MH     @03,@CH01836
            ST     @03,@TF00001
            ALR    @03,@04
            CLC    GVSEXPDT-20(4,@03),NULEXPDT
            BNE    @RF01192
UPDATE EXPIRATION DATE AND INDICATE EXTENSION UPDATED.
            AL     @04,@TF00001
            ST     @14,@TF00001
            ALR    @14,@15
            MVC    GVSEXPDT-20(4,@04),BFVOLEXP-18(@14)
            OI     UPDTGVSN,B'10000000'
READ THE BASE VOLUME RECORD AND UPDATE ITS EXPIRATION DATE.
            OI     BASEREAD,B'01000000'
            LR     @04,INDXBFTB
            MH     @04,@CH02201
            L      @01,BFTBLPTR
            ALR    @01,@04
```

```
                MVC     VOLKY(6),BFVOLID-18(@01)
                LA      @04,VKEY
                ST      @04,RPLVKEY(,RPLVPTR)
                LA      @04,STORBASE
                ST      @04,RPLVBUF(,RPLVPTR)
                MVC     RPLVBLN(4,RPLVPTR),@CF02202
                OI      RPLVDIR(RPLVPTR),B'01000000'
                MVI     RPLVTYP(RPLVPTR),X'00'
                OI      RPLVUPD(RPLVPTR),B'00000010'
                LR      REG1,RPLVPTR
                L       @15,@CV01897
                BALR    @14,@15
UPDATE EXPIRATION DATE IN BASE VOLUME RECORD.
                L       @04,BASEVPTR
                LR      @15,INDXBFTB
                MH      @15,@CH02201
                L       @01,BFTBLPTR
                ALR     @01,@15
                MVC     BASEXPDT(4,@04),BFVOLEXP-18(@01)
WRITE BASE VOLUME RECORD.
                MVI     RPLVTYP(RPLVPTR),X'01'
                LR      REG1,RPLVPTR
                L       @15,@CV01897
                BALR    @14,@15
                MVC     RPLVRETC(2,RPLVPTR),@CB02074
                MVC     RPLRCODE(2,RPLVPTR),@CB02074
CHECK STATUS OF VOLUMES PROCESSED DETERMINE IF POSSIBLE TO
HALT SCANNING OF BEST FIT TABLE. IF PRIMARY VOLUME PROCESSED
AND NO GROUP RETENTION OR ONLY ONE VOLUME SELECTED, EXIT.
        @RF01192 CLI    PRIBFIDX,0
                BE      @RF01250
                CLI     NUMBVOL,1
                BE      @RT01250
                L       @04,GROUPPTR
                TM      GRORETN(@04),B'00000100'
                BNZ     @RF01250
        @RT01250 DS     0H
                OI      EXITSW,B'00010000'
        @RF01250 DS     0H
        @RF01139 BCTR   INDXBFTB,0
        @DL01138 C      INDXBFTB,@CF00043
                BNL     @DL01138
        @DC01138 DS     0H
CHECK TO SEE IF AN EXTENSION RECORD MUST BE WRITTEN OUT OF
BUFFER BEFORE EXITING ROUTINE.
                TM      UPDTGVSN,B'10000000'
                BNO     @RF01254
CHECK IF RECORD MUST BE READ FOR UPDATE BEFORE WRITTEN.
                TM      BASEREAD,B'01000000'
                BNO     @RF01256
READ EXTENSION RECORD CURRENTLY IN STORAGE FOR UPDATE.
                L       @06,GVSNEPTR
                MVC     GKEY(13),GVSNAME(@06)
                LA      @06,GKEY
                ST      @06,RPLVKEY(,RPLVPTR)
                LA      @06,DUMMYBUF
                ST      @06,RPLVBUF(,RPLVPTR)
                MVC     RPLVBLN(4,RPLVPTR),@CF02200
                OI      RPLVDIR(RPLVPTR),B'01000000'
                MVI     RPLVTYP(RPLVPTR),X'00'
                OI      RPLVUPD(RPLVPTR),B'00000010'
                LR      REG1,RPLVPTR
                L       @15,@CV01897
                BALR    @14,@15
                NI      BASEREAD,B'10111111'
WRITE THE EXTENSION RECORD NOW IN THE BUFFER.
        @RF01256 LA     @06,STORGPEX
                ST      @06,RPLVBUF(,RPLVPTR)
```

```
MVI    RPLVTYP(RPLVPTR),X'01'
LR     REG1,RPLVPTR
L      @15,@CV01897
BALR   @14,@15
NI     UPDTGVSN,B'01111111'
BR     @14
B      @EL00017
```

\*\*\*\*\*\*\* !\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

The volume selection program, according to the preferred embodiment, has been designed to select the best volumes of the mass storage system for the storage of a new data set. It is, of course, obvious that the program modules could be stored in any memory store format required for operation by a data processing system. The invention, as disclosed, should not be limited by the type of file used or the size of the registers, nor the apparatus disclosed, nor the specific procedures related in the detailed process steps. The method obtained in ordering the volume records from best fit to worst fit, for instance, should not be taken to limit the present invention to that particular selection process since there might be different criteria required if a different storage area is to be used other than the mass storage facility of the preferred embodiment. Further, the method used in obtaining the information for the selection process should not be taken to limit the present invention since many other types of identifiers could be used as well as many other flags to identify other requirements. Also, the use of a virtual operating system coding for the source listing should not be taken to limit the present invention to that language. Any skilled programmer, once shown the preferred embodiment according to the present invention can code the program flow diagram into any language for use on any type of data processing system.

It is to be understood that the above described embodiment is only illustrative to the application of the principles of the present invention. Modifications in this embodiment many be devised by those skilled in the art without departing from the spirit and scope of the invention. The appended claims are, therefore, intended to cover and embrace any such modification.

What we claim is:

1. Apparatus for selecting a volume space in a mass storage facility according to the attributes of a data set to be stored in the selected volume as requested by a central processing unit, said apparatus comprising:

first storage means for storing an indication of the status of each of the volumes in the mass storage facility;

second storage means for storing an indication of the requirements of the data set to be stored;

means connected to said first and second storing means for comparing each volume status indication with the requirements indication of the data set to identify volumes eligible for the storage of the data set;

third storage means connected to said comparing means for storing the eligible volume status indications of those volumes that meet the requirements of the data set;

means connected to said third storage means for sequencing the status indications of eligible volumes from best to worst fit according to the manner in which the volumes matched the needs of the data set to be stored; and means connected to said sequencing means for transferring the data set to the mass storage volume according to the best fitting volume indicated.

2. Apparatus for selecting a storage volume in a mass storage facility having a plurality of such storage volumes according to the attributes of a data set to be stored in the selected volume as requested by a central processing unit, said apparatus comprising:

first storage means for storing an indication of the status of each of the volumes in the mass storage facility;

second storage means for storing an indication of the requirements of the data set to be stored;

means connected to said first and second storage means for comparing each volume status indication with the requirements indication of the data set to identify volumes eligibile for the storage of the data set;

third storage means connected to said comparing means for storing the elgible volume status indications of those volumes that meet the requirements of the data set;

means connected to said third storage means for sequencing the status indications of eligible volumes from best to worst fit according to the manner in which the volumes match the needs of the data set to be stored;

first checking means connected to said sequencing means for checking the present status of the best to worst fitting selected volume indications for any change, said first checking means including means for activating a re-sequencing of the volume indications from best fit to worst fit if volume status has changed;

second checking means connected to said first checking means for checking present status of the selected volume indications for acceptance by the central processing unit;

means connected to said second checking means for determining primary and secondary best fit volume indications; and means connected to said determining means for transferring the data set to a mass storage volume according to the selected primary and secondary best fit volume indications.

3. The method of selecting a storage volume having a plurality of predetermined storage characteristics and residing in a mass storage system, said selection being in response to a request for storage of a new data set having a plurality of given storage requirements, said storage volume being in a given storage group of a plurality of such storage groups in said mass storage system, each storage group consisting of such storage volumes, said mass storage system storing electrical signal records identifying said storage volumes and each record having signals indicating said predetermined storage characteristics for each said storage volume, said records being arranged by record groups corresponding to said storage groups of storage volumes, the steps of:

electronically requesting a selection of a storage volume for storing a new data set, electronically characterizing said new data set in parameters related to storage requirements for such new data set in signals indicating terms identifiable and comparable with said predetermined storage characteristics of said storage volumes, electronically retrieving record signals of a record group having records which identify and characterize the plurality of said storage volumes for volume selection which constitute said given storage group, electronically searching said retrieved records for finding records having electrical signals which identify and characterize storage volumes of said given storage group having said predetermined storage characteristics which indicate that a corresponding storage volume can store said new data set and identifying such capable storage volumes as eligible storage volumes, electronically ordering the storage records of said eligible storage volumes of said given storage group from a best fit for said new data set to a worst fit for said new data set according to said storage requirements of said new data set and second ones of said plurality of predetermined storage characteristics of each said eligible storage volume in said given group, electronically selecting and indicating a storage volume as a best fit storage volume for receiving said new data set; and electronically storing said new data set in said selected storage volume of said given storage group.

4. The method set forth in claim 3 wherein said record signals indicate said predetermined storage characteristics include indications of expiration dates of each said storage volume in said given storage group, indications of old data set separation in each said storage volumes in said given storage group and storage space allocated to old data sets in each said storage volumes in said given storage group, indications of waiting status for each storage volume in said given storage group, the improvement further including the steps of electronically ordering said records for all said eligible volumes by those eligible volumes in accordance with said volume expiration dates, those records with indications of volume expiration dates close to an expiration date of said new data set being records for best fit ones of said storage volumes, ordering said best fit ones of said records wait status, a record indicating shortest wait being an indication of a best fit volume, and selecting a storage volume for said new data set that is identified by a record as a best fit storage volume upon completion of said ordering steps.

5. The method set forth in claim 3 wherein the steps of electronically ordering the storage records for the eligible storage volume in said given storage group from best to worst fit in accordance with said predetermined ones of said storage characteristics includes the steps of:

electronically ordering said records of said eligible volumes for said given storage group that may cause the request to fail if the storage volume is actually selected or which could cause a request to fail, such expected failure being based upon the available space before expiration date of each respective eligible storage volume of said given storage group, and electronically listing said records of said eligible volumes in said given storage group in an order according to whether a selected one of such eligible volumes could cause storage and retrieval of data to and from said selected volume to be delayed as a secondary factor.

6. The method set forth in claim 3 wherein said step of electronically ordering said records for said eligible storage volumes from best to worst fit for said new data set includes the steps of:

electronically ordering the records of said eligible storage volumes that may cause the request to fail if the volume is selected as a most important factor in the ordering process;

electronically placing said records for said eligible volumes in an order according to whether the respective storage volumes would cause storage of said new data set in such respective storage volume to wait if selected as a second most important factor in identifying a best fitting storage volume for said new data set;

electronically selecting the records for storage volumes that presently have fewer concurrent allocations for storage in said respective storage volumes than a desired maximum number of such concurrent allocations as a third most important factor in the ordering process for identifying a best fitting storage volume for said new data set;

selecting the record of a storage volume having an expiration date closest to an expiration date of said new data set as a fourth most important factor for the ordering process in identifying a best fitting storage volume for said new data set;

selecting a record for a storage volume that would not cause another storage volume to be allocated if it were selected as a shareability consideration as the fifth most important factor in the ordering process; and selecting record for a storage volume that is either mounted for access or scheduled to be allocated to the requestor as a sixth most important factor in the selection process and if more than one such storage volume exists, then selecting the first found record for such a storage volume.

7. In a central processing unit connected to a mass storage system having a plurality of storage volumes for storing data sets, the method of selecting a best one of said storage volumes for a data set to be stored in said mass storage system, said central processing unit having an electrical record for each one of said storage volumes which includes parameters of data set storage usage, allocation, expiration date and accessing delays, the method of:

identifying a data set to be stored and characterizing the data storage requirements of said data set by parameters including storage space requirements and expiration date;

activating a mass storage controller in said central processing unit for selecting a one of said storage volumes as a best fitting storage volume by comparing said data storage requirements with said storage volume parameters;

said mass storage controller selecting ones of said records for storage volumes for possible selections as eligible storage volumes from a predetermined group of said records which ones of records indicating storage volumes having storage allocations and expiration dates enabling a successful storage of said data set in said mass storage system, then ordering said selected ones of said records from a best fit to a worst fit for said data set in accordance with successive comparisons of said data storage requirements of said data set and said parameters of said selected ones of said predetermined storage volumes and minimal accessing, identifying and indicating a given selected one of said storage volumes as a best fitting storage volume, and supplying said indication of said best fitting storage volume and said storage requirements of said data set for allocating a storage space of said storage volume for said data set to said mass storage system for enabling storage of said data set in said best fitting volume of said mass storage system.

8. Apparatus for selecting a storage volume in a mass storage facility according to storage requirements of a new data set to be stored in a selected volume as requested by a central processing unit connected to said mass storage facility, said apparatus comprising:

first storage means for storing in a volume record an indication of the storage space status of each of said storage volumes in the mass storage facility as volume status indicators;

second storage means for storing storage requirement indications of said new data set;

means in said central processing unit connected to said first and second storage means for searching said volume records to find records having volume status indicators which indicate storage parameters capable of satisfying said new data set storage requirements by a comparison of each of said volume status indicators with said stored storage requirement indications, identifying such records as indicating eligible storage volumes for said new data set;

means in said central processing unit for ordering said volume records indicating eligible volumes from a best to a worst fit according to the data set storage requirements and accessibility of said storage volumes;

means in said central processing unit identifying a best fitting one of said storage volumes as a selected storage volume; and means connected to said identifying means for storing the new data set into a said selected storage volume.

9. Apparatus set forth in claim 8 wherein said means for searching said volume records for eligible storage volumes comprises:

means connected to said first and second storage means for comparing predetermined ones of said volume status indicators in each record for each respective storage volume with the storage requirement indications of the data set and generating comparison indications for each comparison for indicating which of said predetermined ones of volume status indicators signify a possible capability of the corresponding storage volume to successfully store said new data set;

means connected to said comparing means for storing the resultant indicators of the comparison in the volume records being searched, respectively, and identifying said volume records storing said comparison indicators signifying a possible capability of data set storage as records for an eligible volumes; and means connected to said comparing means for separating the volume records for eligible volumes including the eligible volume indicators from those volume records for storage volumes that do not meet such storage requirements.

10. Apparatus as defined in claim 9 further including a third storage means connected to said ordering means for storing the volume records for said eligible storage volumes and wherein said ordering means comprises:

a sorting means in said ordering means and connected to said third storage means for sequencing the volume records for eligible volumes from best fit to worst fit according to the comparison resultant indicators; and a fourth storage means connected to said sorting means for storing the eligible volume records including said status indicators as eligible volume status indicators from best fit to worst fit.

11. Apparatus as defined in claim 10 wherein said sorting means sorts on the comparison resultant indicators using the indicator representing a volume that may fail the request as the most important indicator for said sorting means, that may cause a request to wait as the next most important indicator for said sorting means, that has fewer concurrent allocations than a desired maximum as the next most important indicator, that has an expiration date closest to the data set expiration date as the next most important indicator, that would not cause another unit to be allocated as a shareability consideration as the next most important indicator, that identifies an already mounted volume or a volume schedule to be allocated to the central processing unit as the next most important indicator, and, if more than one such volume exists, a volume that indicates the number of jobs currently using the volume as the least important indicator for said sorting means.

12. Apparatus as defined in claim 10 wherein said ordering means further comprises first checking means connected to said fourth storage means for checking the present status indicators of the best fitting volume record for any change, said checking means including means for reactivating said sorting means for resequencing the volume records according to the status indicators from best fit to worst fit if the best fitting volume status has changed.

13. Apparatus as defined in claim 12 wherein said ordering means further comprises second checking means connected to said first checking means for checking the present status of the selected volume indicators for acceptance by the central processing unit, said second checking means including means for obtaining a next best fitting volume record if the selected volume is not acceptable to said central processing unit.

14. Apparatus as defined in claim 8 further including a third storage means connected to said searching means for storing the eligible volume status indicators obtained by said searching means.

15. Apparatus as defined in claim 14 wherein said means for ordering the eligible volume records comprises:

a sorting means connected to said third storage means for sequencing the records for the eligible volumes from best fit to worst fit according to the manner in which the volumes match the storage needs of the data set to be stored; and a fourth storage means connected to said sorting means for storing the volume records from best fit to worst fit.

16. In a data processing system, a machine method executed in a central processing unit for identifying a storage volume in a volume group of such storage volumes in a mass storage facility having a plurality of such volume groups for facilitating the storage of a data set in the mass storage facility, said data set having electrical indicators of its storage requirements, each of said storage volumes having an expiration date, a record in said data processing system for identifying each said storage volume and having electrical indications of such expiration date and data set storage parameters for each such storage volume, the method steps of:

a. identifying a group of storage volumes in which said data set could possibly be stored;
b. fetching records identifying storage volumes of said identified group of storage volumes;
c. comparing said fetched records electrical indications with said data set electrical indicators for determining capability of said identified storage volumes respectively corresponding to said fetched respective record to store said data set, identifying those records showing storage volume capability to store said data set as records representing and identifying eligible storage volumes,
d. separating said records representing and identifying eligible storage volumes from other records as a set of records of eligible storage volumes of said identified group,
e. ranking all of the separated records from a best to a worst fit;
f. ordering the ranked and separated records in accordance with said ranking from a best to a worst fit for said data set;
g. storing in an electrical digital memory the ranked and separated records as ordered from best fit to worst fit;
h. selecting a record from said electrical digital memory as a record representing and identifying a best fitting storage volume;
i. placing said selected record into a register;
j. going to step 1 if there are sufficient selected records in said register for storing said data set, otherwise going to step k;
k. getting a next record from said electrical digital memory according to best to worst fit and going to step h,
l. updating an inventory table for the records of said identified group of storage volume to reflect selection of a best fitting storage volume;
m. transmitting the records of said selected volume(s) for storage to a given memory means of said central processing unit; and
n. transferring the data set to the selected volume(s) in the mass storage facility according to the records stored in said given memory means.

17. In a data processing system, a process as set forth in claim 16 wherein step c for each fetched record, includes the steps of:

d1. comparing the expiration date of the storage volume represented by the fetched record with the expiration date of the data set for finding fetched records representing and identifying storage volumes having expiration dates later than the expiration date of said data set and indicating such storage volumes as eligible storage volumes;
d2. going to step 3 if said comparing indicates such represented and identified storage volume is not now eligible because such storage volume expires before the data set expires, otherwise going to step d4;
d3. returning to step d1 for comparing a next fetched record;
d4. inspecting volume data separation indicators in said fetched record for said eligible storage volume;
d5. going to step d1 if said volume data separation excludes said eligible storage volume from continuing as an eligible storage volume because data separation is shorter than data set length, otherwise going to step d6;
d6. calculating free space in said eligible storage volume;
d7. going to step d1 if the free space in said eligible storage volume is not usable for the data set, otherwise going to step d8;
d8. checking mount status of said eligible storage volume;
d9. going to step d1 if the mount status is not approved with respect to any data set requirements for mount status, otherwise going to step d10;
d10. determining the number of users of said eligible storage volume;
d11. checking wait status of said eligible storage volume;
d12. going to step d1 if not all of the fetched records for said identified volume group have been sorted, otherwise if no eligible volume has been identified and not all of said volume groups have been checked for eligible storage volumes, going to step a to identify another of said groups of storage volumes for repeating steps a to d12, otherwise going to step e.

18. In a data processing system, a process as described in claim 16 wherein step h includes the steps of:

h1. receiving and testing indications of any changes in storage volume status, storing said received indications in the appropriate fetched record;
h2. ordering the fetched records again by returning to step (f) if there has been a status change, otherwise going to step h3;
h3. checking on the data set storage use of the volume;
h4. going to step i if the data set storage in represented and identified storage volume is possible, otherwise going to step k.

19. The method of managing storage apparatus having a predetermined number of addressible storage registers connected to a data processing system, said data processing system having a given central processing unit managing said storage apparatus, in said given central processing unit performing the steps of:

(1) assigning a predetermined number of addresses capable of identifying a predetermined number of said addressible storage registers, assigning predetermined ones of said addressible storage registers to a plurality of storage volumes, respectively, assigning an address to each said storage volume to make each storage volume addressible as an entity;
(2) combining a predetermined number of said storage volumes into groups of said storage volumes so that said storage apparatus has a plurality of said groups and said groups having diverse numbers of said storage volumes,
(3) creating an electronic record for each of said storage volumes, each said record including status signals identifying which of said addressible registers are allegated to a data set and which are free to be allocated, expiration date of each said storage volume and usage status indications of said storage volume, keeping said respective created records current with the present actual status of said storage volumes,
(4) grouping said records in accordance with said combined storage volumes in said groups and storing said records in predetermined ones of said addressible registers,
(5) receiving a request to store a data set in said addressible storage registers, said request including attribute indications signifying storage requirements of said data set including an indication of the number of registers required, expiration date of said data set and desired usage attributes, (6) in response to said request, identifying a group of said storage volumes for receiving said data set, (7) fetching from said predetermined ones of said addressible registers said electronic records for storage volumes of said identified group of storage volumes, (8) comparing said record status signal indications for said storage volume expiration date and free registers in each of said fetched records with said attributes of expiration date and free registers, identifying those fetched records yielding a comparison result of a volume expiration date later than said data set expiration date and a number of storage volumes free for allocation addressible storage registers not less than said number of registers required for storing a predetermined portion of said data set, recording in ones of said identified ones of said fetched records that such identified records represent storage volumes eligible to receive said data set, (9) sorting said fetched records in accordance with said comparisons,

(10) selecting a one of said sorted fetched records that has an expiration date close to said expiration date of said data set as a record identifying a storage volume best fitting said data set,

(11) storing said data set in said best fitting volume, and

(12) repeating steps (1)–(11) for operating said storage apparatus over a predetermined period of time.

20. A data processing system having a host computer, mass storage means for storing received user data signals, connection to said host computer from said mass storage means for receiving signals to be stored and supplying stored signals from and to said host computer, said mass storage means having a multiplicity of addressable storage registers with addressing means capable of addressing said multiplicity of addressable storage registers in groups of such addressable storage registers as a storage volume, each said storage volume constituting a one of said groups of said addressable storage registers, the improvement comprising mass-storage controller program indicia in said host computer for enabling said host computer to manage said volumes for more efficiently using said multiplicity of addressable storage registers, including:

MSVI register means for storing MSVI records of characterizing data signals for characterizing said respective storage volumes, said stored characterizing data signals including signals indicating volume expiration dates, volume mount status, number of volume concurrent users, sharability of volume, general use of said volume, free space, data separation, wait status and a risk factor, means in said MSVI register means to store said MSVI records in groups of such records to correspond to respective groups of said storage volumes, request register means for storing a user request to get a user data set assigned to a one of said storage volumes together with data set characterizing data signals which are complementary to said storage volume characterizing data signals, best fit table, volume selection routine indicia for enabling said host computer for scanning and comparing contents of said MSVI register means of a given addressed group of said MSVI records with contents of said request register means for risk of failure by examining a group of said MSVI records for general use ones of said volumes, if no general use volumes are found indicate on error, upon finding indications of general use volume generate a list of eligible volumes and store some in said best bit table and cause said host computer to sense SELCTVOL and all other indicia set forth hereinafter as a portion of said volume selection routine indicia, SELSCREN indicia for enabling said host computer to determine if said data set request can be met on a basis of storage spare requirements on either a positioned or indexed basis, SELCTVOL indicia for enabling said host computer to sense other indicia of said mass storage controller computer program indicia, pass MSVI records to said best fit table for a data set identified and characterized in said data set request, send said MSVI records of said best fit table to select one or more of said volume records to identify a one of said storage volumes for storing said data set, VOLREF indicia for enabling said host computer to update said MSVI records relating to a one of said data set requests specifying a given volume for a data set identified by said one data set request, ELGIBLCK indicia for enabling said host computer to determine by examining said MSVI record if a volume represented thereby is eligible to be selected by comparing said MSVI record indicated free space with data set request indicated data set storage space requirements; verify operational status, if the indicated volume is sharable then such indicated storage volume can be eligible; and if not sharable such indicated storage volume is not eligible, EXPIRCK indicia for enabling said host computer to determine if a storage volume indicated by a one of said MSVI records expires prior to expiration of said data set indicated in said data set request stored in said request register means, SPACONV indicia for enabling said host computer to store a space indication of said volume record that indicates space indication of said volume record that indicates space allocated for usage within a storage volume indicated by said MSVI record, SPACECK indicia for enabling said host computer to compare free space of a storage volume indicated by a one of said MSVI records and indicate the storage volume indicated by such MSVI record is not eligible if said free space is less than said space requirements indicated in said data set request, VOLSEPCK indicia for enabling said host computer to compare data separation characterizing indications of said data set and free space indications of a given one of said storage volumes to determine if such given one of said storage volumes should be excluded from being an eligible one of said volumes because of said data separation indications being different from said free space indications, WAITCK indicia for enabling said host computer to further analyze a given one of said volume characterizing data signals for a mounted one of said volumes to sense from said volume characterizing data signals whether said given one of said mounted volumes has a wait indication including shareability indications to indicate a wait status for such volume to indicate a possible future delay in processing said data set due to said wait status, CONUSER indicia for enabling said host computer to sense said volume data characterizing signals for a given one of said storage volumes and to transfer a number of user indications to said best fit table; if said given one volume is indicated as being mounted, set said concurrent user indication to unity, FINSELCT indicia for enabling said host computer to sense SORT indicia to sort contents of said best bit table in accordance with said volume data characterizing signal stored in said best bit table, SORT indicia for enabling said host computer to sort volume characterizing indications to rearrange said best bit table signal contents into a sorted best bit table from a best to worst fit set of said volume data characterizing signal for storing said data set indicated in said data set request, UPDTMSVI indicia for enabling said host computer to read said MSVI records and to alter said MSVI records in accordance with operations of said host computer in accordance with operations of said host computer in accordance with said volume selection routine indicia including said SELSCREN, SELCTVOL, VOLREF, ELGIBLCK, EXPIRCK, SPACONV, SPACECK, VOLSEPCK, WAITCK, CONUSER, FINSELCT and SORT indicia whereby operations of said addressable storage registers for the storage of said user data signals by selection of a one of said storage volumes for storage of a said user data set, and means for storing said user data set in said mass storage means.

21. A data processing system having a host computer means, a plurality of data storage units connected to said host computer means for storing data signals for use by said host computer means, said plurality of data storage units having a multiplicity of addressable storage registers, said addressable storage registers being arranged to be addressed as volumes of predetermined numbers of said addressible storage registers, predetermined ones of said volumes being grouped into volume groups, respectively; means for transferring data signals between said host computer means and said multiplicity of addressable storage registers, the improvement being in said host computer and including in combination:

MSVI means for storing volume identifications with associated volume characterizing signals for each respective ones of said volumes and arranged in accordance with said volume groups as group sets of volume identification and characterizing signals, means for electrically manifesting a data set storage request with associated data set characterizing signals, all of said characterizing signals including electrical indications of respective expiration dates and a number of storage registers for indicating available and required storage space respectively for said volumes and said data set, scan start means coupled to said MSVI means and being responsive to said data set storage request to select a first one of said stored group sets of volume identification and characterizing signals, means for scanning said selected one of said group sets and having means receiving said data set characterizing signals for successively comparing said volume characterizing signals with said data set characterizing signals to produce a list of eligible volume identification signals for said data set request, said list including only those volume identification signals including said volume characterizing signals whose available number of storage registers is not less than the data set requirements number of storage registers, sorting means coupled to said scanning means for receiving said list of volume identification signals and associated volume characterizing signals and having mean for sorting said list in accordance with said data set characterizing signals according to a plurality of said indications in a priority related to a best fit relationship of said volumes represented by said list of volumes identification and characterizing signals to said data set as represented by said data set characterizing signals, selecting means coupled to said sorting means for selecting a subset of said list of volumes identification and characterizing signals as identifications of possible ones of said volumes to store said data set represented by said data set characterizing signals, and completion means responsive to said selecting means not selecting said subset to reinitiate said scan start means to start a scan of another stored group set o volume identification and characterizing signals and having means responsive to a subset being selected by said selecting means to indicate storage of said data set in a given one of said volumes identified by a respective given one of said volumes identification signals in said subset.

22. A mass storage volume controller for managing storage space a predetermined portion control of a mass storage apparatus by selecting a volume storage area for a data set to be stored, including in combination, a select volume register means for receiving data set characterizing data signals and a signal request to select a volume storage area in accordance with said data set characterizing data signals, a mass storage volume area inventory table memory for storing identification signals of all of said volume storage areas in said predetermined portion respectively together with volume storage area characterizing data signals, both said characterizing data signals including signal indications for each respective data set and volume storage area of number of concurrent users, shareability, expiration data, respectively indicating storage space requirements and storage space availability for said data set and said volume storage areas, an MSVI register connected to said mass storage volume area inventory table memory for receiving said identification signals with associated volume storage area characterizing data signals respectively representing said volume storage areas for possibly storing a data set represented by said signal request and associated data set characterizing data set signals, a temporary storage register connected to said MSVI register for sequentially receiving said identification signals with associated volume storage area characterizing data signals as successive sets of storage volume area qualifying signals, a data comparator connected to said select volume register means and to said temporary storage register to compare said storage volume area qualifying signals with said data set characterizing data signals, first means connected to said MSVI register and being responsive to said data comparator to transfer another identification signal and associated volume storage area characterizing data signals to said temporary storage register to constitute new storage volume are a qualifying signals such that said data comparator nonrecursively compares said volume storage area characterizing data signals as successive ones of said volume storage area qualifying signals with said data set characterizing data signals stored in said select volume register, second means connected to said data comparator and to said temporary storage register and being responsive to said data comparator indicating storability of said data set in a one of said volume storage areas indicated by said volume storage area qualifying signals to supply such volume storage area qualifying signals as eligible volume signals, eligible volume register means connected to said second means for receiving and storing all of said supplied eligible volume signals for said data set, third means for indicating said nonrecursive compares for said data set have been completed, sorter means coupled to said third means and coupled to said eligible volumes register for receiving said stored eligible volume signals whenever said third means indicates said completion, said sorter means being for sorting said eligible volume signals in accordance with a given priority of importance of said storage volume characterizing data signal indications in all of said stored and received eligible volume signals, a best fit register means coupled to said sorter means to receive and store said sorted eligible volume signals in an order in accordance with said storage volume characterizing data signal indications within said given priority of importance, a volume storage area selecter connected to said select volume register means for receiving said storage space requirements indication and a best fitting one of said sorted eligible volume signals for comparing same to indicate storability of said data set in a volume storage area indicated by said best fitting one of said stored eligible volume signals, cycling means coupled to said best fit register means and said volume storage area selecter to repeatedly receive ones of said sorted eligible volume signals as a successism of best fitting eligible volume signals in accordance with said storage volume characterizing data signal indications within said priority of importance, output means coupled to said volume storage area selector for receiving and storing ones of said best fitting ones of said sorted eligible volume signals as a list of storage volume areas suitable to store said data set, and an I/O controller coupled to said output means and being responsive to said list of storage volumes to store said data set in a one of said volume storage areas indicated by a one of said eligible volume signals in said list.

* * * * *